(12) United States Patent
Wang

(10) Patent No.: US 10,693,799 B2
(45) Date of Patent: Jun. 23, 2020

(54) CALLING METHOD AND DEVICE, COMPUTER STORAGE MEDIUM, AND TERMINAL

(71) Applicant: TENCENT TECHNOLOGY (SHENZHEN) COMPANY LIMITED, Shenzhen (CN)

(72) Inventor: Fengling Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 39 days.

(21) Appl. No.: 16/208,473

(22) Filed: Dec. 3, 2018

(65) Prior Publication Data

US 2019/0104079 A1  Apr. 4, 2019

Related U.S. Application Data

(63) Continuation of application No. PCT/CN2017/095309, filed on Jul. 31, 2017.

(30) Foreign Application Priority Data

| Sep. 22, 2016 | (CN) | 2016 1 0844042 |
| Oct. 25, 2016 | (CN) | 2016 1 0940605 |
| Nov. 2, 2016 | (CN) | 2016 1 0945642 |

(51) Int. Cl.
*G06F 15/16* (2006.01)
*H04L 12/823* (2013.01)
(Continued)

(52) U.S. Cl.
CPC ............... *H04L 47/32* (2013.01); *H04L 1/18* (2013.01); *H04L 1/1825* (2013.01);
(Continued)

(58) Field of Classification Search
CPC ....................................... H04L 47/32
See application file for complete search history.

(56) References Cited

U.S. PATENT DOCUMENTS

| 7,032,153 | B1 |   | 4/2006  | Zhang et al. |
| 8,300,620 | B1 | * | 10/2012 | Sarkar .................... H04L 1/188 |
|           |    |   |         | 370/230 |

(Continued)

FOREIGN PATENT DOCUMENTS

| CN | 101114982 | 1/2008 |
| CN | 101656747 | 2/2010 |

(Continued)

OTHER PUBLICATIONS

International Preliminary Report on Patentability dated Mar. 26, 2019 in PCT/CN2017/095309 filed Jul. 31, 2017. (With English Translation).

(Continued)

*Primary Examiner* — Hieu T Hoang
(74) *Attorney, Agent, or Firm* — Oblon, McClelland, Maier & Neustadt, L.L.P.

(57) ABSTRACT

Methods and terminal devices for making media calls via a network are provided. In some embodiments, a first terminal device includes interface circuitry and processing circuitry. The processing circuitry detects, in response to a success reception of a first data packet of first media that is send by a second terminal device during the media call, whether a packet loss occurs in the first media. When a packet loss is detected, the processing circuitry obtains network status information of the network. Further, the processing circuitry determines a probability threshold in association with a retransmission request to the second terminal device for retransmitting a second data packet. Based on the probability threshold, the processing circuitry determines a network requirement condition for the retransmission request. When (Continued)

the network status information satisfies the network requirement condition, the interface circuitry sends the retransmission request; otherwise the retransmission request is cancelled.

20 Claims, 19 Drawing Sheets

(51) Int. Cl.
| | |
|---|---|
| H04L 12/26 | (2006.01) |
| H04L 1/18 | (2006.01) |
| H04L 12/841 | (2013.01) |
| H04L 12/801 | (2013.01) |
| H04L 1/20 | (2006.01) |
| H04L 29/06 | (2006.01) |
| H04M 9/08 | (2006.01) |
| G10L 21/04 | (2013.01) |

(52) U.S. Cl.
CPC ............ *H04L 1/1854* (2013.01); *H04L 1/205* (2013.01); *H04L 43/087* (2013.01); *H04L 43/0829* (2013.01); *H04L 43/16* (2013.01); *H04L 47/283* (2013.01); *H04L 47/34* (2013.01); *H04L 65/80* (2013.01); *H04M 9/08* (2013.01); *G10L 21/04* (2013.01); *H04L 43/0852* (2013.01); *H04L 43/0894* (2013.01)

(56) References Cited

U.S. PATENT DOCUMENTS

| | | | | |
|---|---|---|---|---|
| 2004/0255203 | A1* | 12/2004 | Miyoshi | H04L 1/1845 714/48 |
| 2006/0168504 | A1* | 7/2006 | Meyer | H04L 1/0026 714/799 |
| 2009/0210765 | A1* | 8/2009 | Henocq | H04L 1/1806 714/748 |
| 2011/0154145 | A1* | 6/2011 | Lomnitz | H04L 1/0002 714/749 |
| 2012/0131408 | A1* | 5/2012 | Tada | H03M 13/05 714/752 |
| 2015/0215983 | A1* | 7/2015 | Huang | G06F 1/1698 455/41.1 |
| 2016/0127535 | A1 | 5/2016 | Theverapperuma et al. | |
| 2018/0270024 | A1* | 9/2018 | Neuhaus | H04L 1/1822 |
| 2018/0302172 | A1* | 10/2018 | Petrioli | H04L 1/188 |

FOREIGN PATENT DOCUMENTS

| | | |
|---|---|---|
| CN | 101895466 | 11/2010 |
| CN | 102075312 | 5/2011 |
| CN | 102710401 | 10/2012 |
| CN | 102790666 | 11/2012 |
| CN | 103338471 | 10/2013 |
| CN | 104579601 | 4/2015 |
| CN | 105280195 | 1/2016 |
| CN | 105847611 | 8/2016 |
| CN | 105872156 | 8/2016 |

OTHER PUBLICATIONS

Written Opinion of the International Searching Authority dated Oct. 19, 2017 in PCT/CN2017/095309 filed Jul. 31, 2017. (With English Translation).
Combined Office Action and Search Report dated Dec. 21, 2018 in Chinese Patent Application No. 201610945642.8 8 (with Concise English language translation).
Combined Office Action and Search Report dated Mar. 7, 2019 in Chinese Patent Application No. 201610844042.2 (with Concise English language translation).
International Search Report dated Oct. 19, 2017 in PCT/CN2017/095309 filed Jul. 31, 2017 (With English Translation) p. 1-5.
Written Opinion dated Oct. 19, 2017 in PCT/CN2017/095309 filed Jul. 31, 2017 p. 1-3.

\* cited by examiner

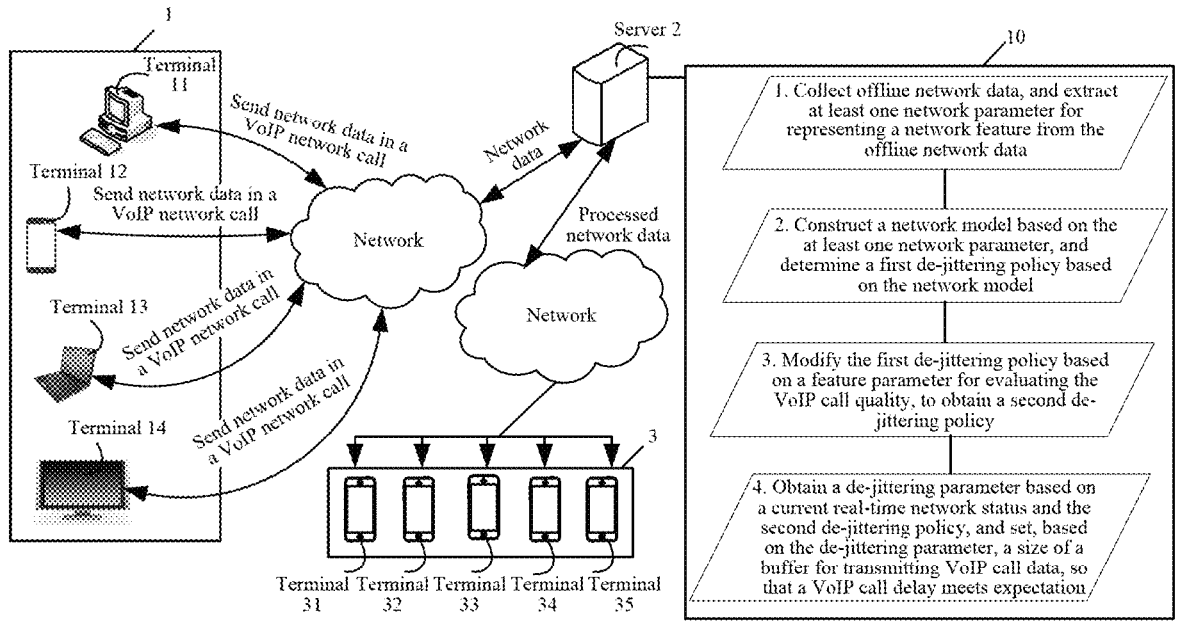

FIG. 9

Collect offline network data, extract at least one network parameter for representing a network feature from the offline network data, construct a network model based on the at least one network parameter, to measure or simulate VoIP call quality based on the network model, and determine a first de-jittering policy based on the network model — 101

Modify the first de-jittering policy based on a feature parameter for evaluating the VoIP call quality, to obtain a second de-jittering policy — 1021

Obtain a de-jittering parameter based on a current real-time network status and the second de-jittering policy, and set, based on the de-jittering parameter, a size of a buffer for transmitting VoIP call data, so that a VoIP call delay meets expectation, and tends to be proper — 103

FIG. 10

CALLING METHOD AND DEVICE, COMPUTER STORAGE MEDIUM, AND TERMINAL

RELATED APPLICATION

This application is a continuation of International Application No. PCT/CN2017/095309, filed on Jul. 31, 2017, which claims priority to Chinese Patent Applications No. 201610844042.2 filed on Sep. 22, 2016, 201610940605.8 filed on Oct. 25, 2016, and 201610945642.8 filed on Nov. 2, 2016. The entire disclosures of the prior applications are incorporated by reference herein in their entirety.

FIELD OF THE TECHNOLOGY

This application relates to the instant messaging field, and specifically to a call method and apparatus, a computer storage medium, and a terminal.

BACKGROUND OF THE DISCLOSURE

With the development of society, information exchange becomes increasingly important. To implement timely information exchange, varieties of instant messaging software, such as WeChat and QQ, are developed one after another. The instant messaging software is mainly used depending on the Internet. Therefore, quality of the network directly affects communication quality of the instant messaging software.

At present, with the widespread popularization of network devices, load pressure on the network also increases. When a large number of devices use the network at the same time, network congestion is caused, and affects network communication of network devices. For example, instant messaging of instant messaging software is affected, resulting in poor communication quality between users.

For the technical problem of poor instant messaging quality caused by network congestion in a related technology, no effective solution has been proposed at present.

SUMMARY

Embodiments of this application provide a call method and apparatus, to resolve at least a technical problem of poor instant messaging quality caused by network congestion in a related technology.

Aspects of the disclosure provide methods and terminal devices for making media calls via a network. In some embodiments, a first terminal device includes interface circuitry and processing circuitry. The interface circuitry transmits and receives signals carrying media data to/from a network during a media call with a second terminal device. In some embodiments, the processing circuitry detects, in response to a success reception of a first data packet of first media that is send by the second terminal device during the media call, whether a packet loss occurs in the first media. When a packet loss of a second data packet of the first media is detected, the processing circuitry obtains network status information of the network. Further, the processing circuitry determines a probability threshold in association with a retransmission request to the second terminal device for retransmitting the second data packet. Based on the probability threshold, the processing circuitry determines a network requirement condition for the retransmission request. When the network status information satisfies the network requirement condition, the interface circuitry sends the retransmission request to the second terminal device. When the network status information fails to satisfy the network requirement condition, the retransmission request is cancelled.

In some embodiments, the processing circuitry determines whether a first network state of the network that is indicated by the network status information matches a second network state that is required for retransmitting the second data packet. When the first network state matches the second network state, the processing circuitry determines that the network status information satisfies the network requirement condition; otherwise, the processing circuitry determines that the network status information fails to satisfy the network requirement condition.

To determine whether the first network state of the network that is indicated by the network status information matches the second network state that is required for retransmitting the second data packet, in an example, the processing circuitry determines whether a difference between a bandwidth threshold and a bandwidth in use is less than a first preset value. In another example, the processing circuitry determines whether a transmission delay is less than a transmission delay threshold. In another example, the processing circuitry determines whether a packet loss rate is less than a packet loss rate threshold. In another example, the processing circuitry determines whether a number of consecutive lost packets is less than a second preset value.

In some embodiments, the processing circuitry analyzes a signal feature of a media segment in the first data packet. When the network status information satisfies the network requirement condition and the signal feature is indicative of a semantic importance, the retransmission request is sent.

In an embodiment, the processing circuitry extracts a sequence number index in the first data packet, and determines whether the packet loss occurs in the first media based on the sequence number index.

In an example, the processing circuitry determines a first network requirement condition to ensure that a first probability for the retransmission request to arrive at the second terminal device within a buffer time is equal to or higher than the probability threshold. The buffer time is the time that the first media is allowed to be buffered at the second terminal device. In another example, the processing circuitry determines a second network requirement condition to ensure that a second probability to output the second data packet at the second terminal device is equal to or higher than the probability threshold.

According to some embodiments of the disclosure, offline network data is collected, and at least one network parameter for representing a network feature is extracted from the offline network data. The processing circuitry constructs a network model based on the at least one network parameter, and determines a first de-jittering policy based on the network model. Further, the processing circuitry modifies the first de-jittering policy based on a feature parameter for evaluating a call quality of the media call to obtain a second de-jittering policy. Then, the processing circuitry obtains a de-jittering parameter based on the network status information and the second de-jittering policy. Further, the processing circuitry sets a capacity of a buffer that is used to for buffering transmission data during the media call based on the de-jitter parameter to ensure a delay of the media call meet an expectation.

In some embodiments, the processing circuitry obtains at least one of a signal content and an auditory perception result of the media call. Then, the processing circuitry modifies the first de-jittering policy based on the at least one of the signal content and the auditory perception result of the media call.

According to some aspects of the disclosure, the processing circuitry is configured to detect a both-speaking state in the media call. For example, the processing circuitry obtains based on the first media, a far-end signal that is sent by the second terminal device during the media call, and superimposes an ultrasonic signal on the far-end signal to obtain a mixed signal. The mixed signal is played via a speaker. The processing circuitry obtains a near-end signal that is generated by a microphone, and determines a first signal segment in the mixed signal and a second signal segment in the near-end signal based on the ultrasonic signal. The processing circuitry calculates a correlation value between the first signal segment and the second signal segment, and determines that the media call is in a both-speaking state when the correlation value is less than a preset correlation value threshold.

In some embodiments, the processing circuitry superimposes the ultrasonic signal that is encoded with data on the far-end signal to obtain the mixed signal. Further, the processing circuitry determines, in the near-end signal, the second signal segment that carries specific data in a frequency range corresponding to the ultrasonic signal. Then, the processing circuitry determines, in the mixed signal, the first signal segment that is superimposed with the ultrasonic signal that is encoded with the specific data.

In some implementations, a computer executes software instructions stored in a non-transitory computer-readable medium to perform the method for making the call.

In the technical solutions provided in the embodiments of this application, it is determined, based on a first data packet that is sent by a second client (e.g., second terminal device) and received by a first client (e.g., first terminal device) over a preset network, whether a packet loss occurs in first media information that is sent by the second client to the first client over the preset network, the first media information including the first data packet, and the first media information being media information transmitted in a voice call or a video call between the second client and the first client. Network status information of the preset network is obtained when it is determined that a packet loss occurs in the first media information. A retransmission request is sent to the second client when the network status information satisfies a preset condition, the retransmission request being used to request the second client to retransmit a lost second data packet in the first media information, and the preset condition being used to indicate a network condition of the preset network that is required for retransmitting the second data packet. Sending of the retransmission request to the second client is canceled when the network status information does not satisfy the preset condition. The lost data packet is obtained by using the retransmission request when allowed in a network status, so that the media information is more complete. The embodiments of this application can reduce severer congestion of the preset network that is caused by retransmission requests still frequently sent when the network has been congested, and prevent media information transmission from being further blocked because congestion of the preset network is not relieved. Therefore, for the entire network, congestion is relieved, media information can be better transmitted for clients, and overall instant messaging quality is improved.

BRIEF DESCRIPTION OF THE DRAWINGS

The accompanying drawings described herein are used to provide a further understanding of this application, and form part of this application. Exemplary embodiments of this application and descriptions thereof are used to explain this application, and do not constitute any inappropriate limitation to this application. In the accompanying drawings:

FIG. 9 is a schematic diagram of hardware entities performing information exchange according to an embodiment of this application;

FIG. 10 is a schematic diagram of an implementation procedure of a method according to this application;

DESCRIPTION OF EMBODIMENTS

To make those skilled in the art to better understand the solutions of this application, the following clearly and completely describes the technical solutions in the embodiments of this application with reference to the accompanying drawings in the embodiments of this application. It is understood that the following described preferred embodiments are intended to illustrate and explain this application rather than to limit this application.

It is noted that, in the specification, claims, and accompanying drawings of this application, the terms such as "first" and "second" are intended to distinguish between similar objects rather than indicate a specific order. It is understood that, the data termed in such a manner are interchangeable in a proper circumstance, so that the embodiments of this application described herein can be implemented in other orders than those illustrated or described herein. Moreover, the terms "include", "contain" and any variants thereof are intended to cover non-exclusive inclusion, for example, a process, a method, a system, a product, or a device that includes a series of steps or parts is not necessarily limited to those steps or parts expressly listed, but may include other steps or parts not expressly listed or inherent to such a process, a method, a system, a product, or a device.

According to the embodiments of this application, a method embodiment of a call method is provided.

Figure 1:
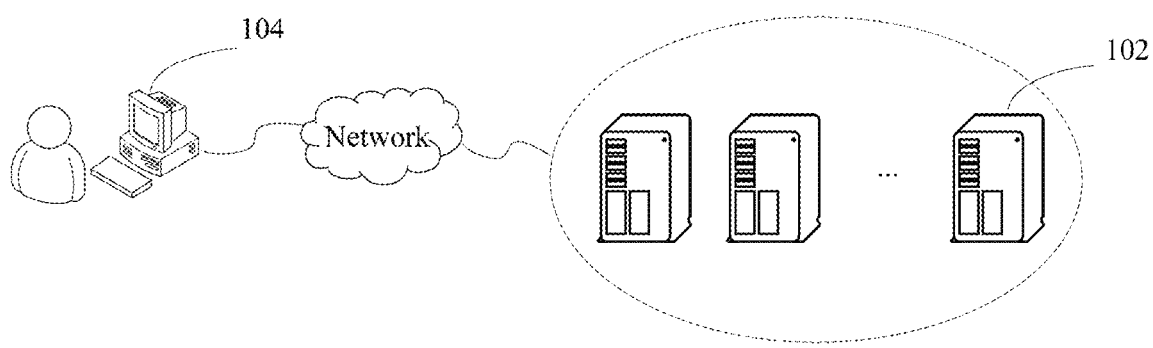
FIG. 1 is a schematic diagram of a hardware environment of a call method according to an embodiment of this application.

Optionally, in this embodiment, the method may be applied to a hardware environment including a server 102 and a terminal 104 in FIG. 1. As shown in FIG. 1, the server 102 is connected to the terminal 104 over a network. The network includes, but not limited to, a wide area network, a metropolitan area network, or a local area network. The terminal 104 is not limited to a PC, a mobile phone, a tablet computer, or the like. The method in this embodiment of this application may be performed by the server 102, or may be performed by the terminal 104, or may be jointly performed by the server 102 and the terminal 104. When being performed by the terminal 104, the method in this embodiment of this application may be performed by a client installed on the terminal.

Figure 2:
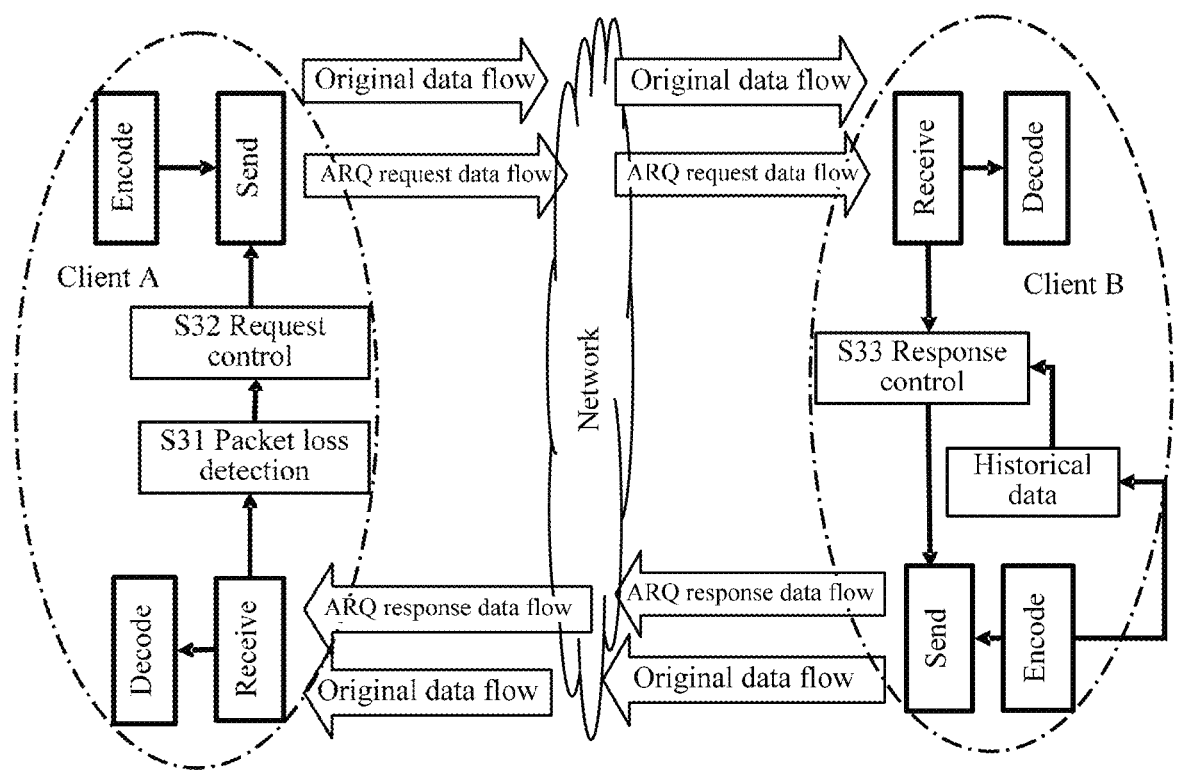
FIG. 2 is a schematic diagram of a communication message transmission system according to an embodiment of this application.

An overall block diagram of a real-time voice/video call is shown in FIG. 2. A client B encodes and sends received data collected by an audio adapter. The data is transmitted to a client A over a network (by using an original data flow). The client A receives and decodes the data (that is, data transmitted in the original data flow), and sends the decoded data to an audio adapter for playing. When the client A receives the data, if a packet loss is found (which is implemented through packet loss detection in step S31), the client A may send a retransmission request (that is, a request in a retransmission request data flow) to the client B. After receiving the retransmission request, the client B retransmits required data to the client A. The retransmitted data is response data in a retransmission response data flow.

In the foregoing transmission manner, impact of different network features on actual retransmission is not considered. In a network (for example, a network with a limited bandwidth) in which a packet loss is caused by congestion, if a retransmission request is sent and a peer end retransmits data in response to the retransmission request, network load is further increased, and congestion becomes severer. Retransmission in this case wastes a bandwidth, and may cause severer network congestion. Severer network congestion causes more packet losses, and deteriorates call quality. Consequently, a vicious circle is formed.

In addition, a real-time voice call feature is not considered in the transmission method, either. A real-time call has a strict requirement on an arrival time of data. However, in a case of retransmission, a retransmission request is sent after a packet loss is detected, to wait a peer end to retransmit response data. In this case, packet loss detection, sending of the retransmission request, and receiving of the response data need to consume a certain time. If the time is excessively long, even though the response data reaches a receive end through retransmission, the response data is useless to real-time communication. In such a network situation, a usage rate of retransmitted data is low, or the data is even useless.

Considering impact of a network feature and a real-time voice call feature on instant messaging, according to the embodiments of this application, a method embodiment of a call method is provided.

Figure 3A:
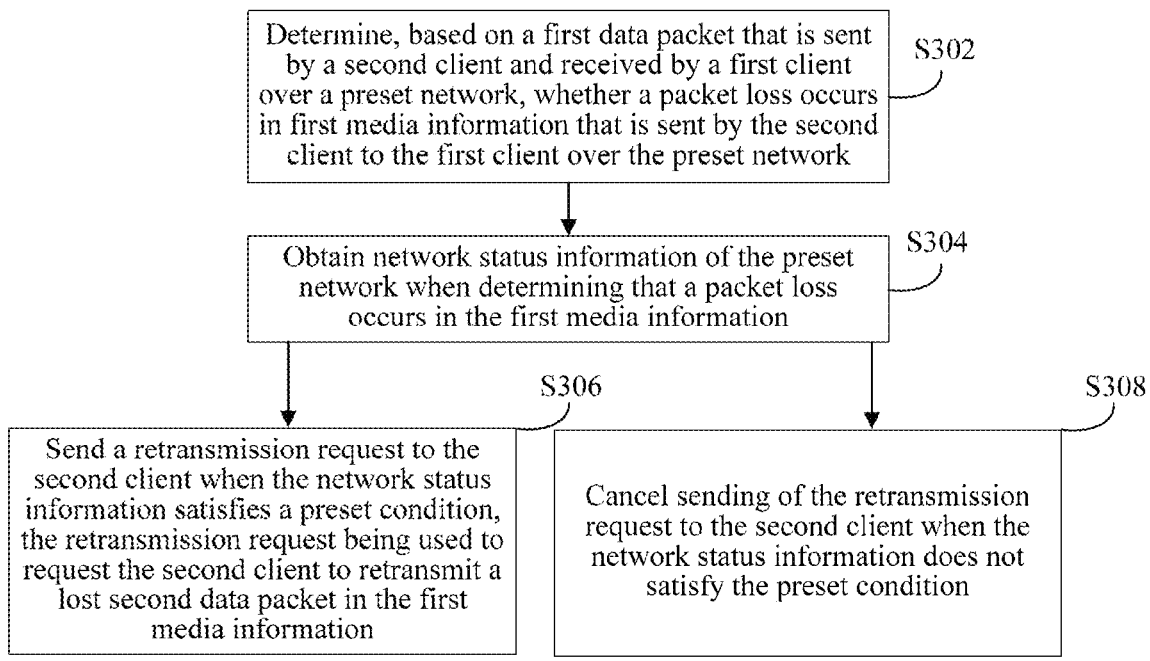
FIG. 3A is a flowchart of an optional call method according to an embodiment of this application.

FIG. 3A is a flowchart of an optional call method according to an embodiment of this application. As shown in FIG. 3A, the method may include the following steps:

Step S302. Determine, based on a first data packet that is sent by a second client and received by a first client over a preset network, whether a packet loss occurs in first media information that is sent by the second client to the first client over the preset network, the first media information including the first data packet, and the first media information being media information transmitted in a voice call or a video call between the second client and the first client. The first data packet herein is a data packet, initially transmitted successfully, in the first media information, and therefore is referred to as an initial-transmission-succeeded data packet.

Step S304. Obtain network status information of the preset network when determining that a packet loss occurs in the first media information.

Step S306. Send a retransmission request to the second client when the network status information satisfies a preset condition, the retransmission request being used to request the second client to retransmit a lost second data packet in the first media information, and the preset condition being used to indicate a network condition of the preset network that is required for retransmitting the second data packet.

Step S308. Cancel sending of the retransmission request to the second client when the network status information does not satisfy the preset condition.

Through steps S302 to step S308, when a packet loss occurs in first media information, whether to send a retransmission request is determined based on network status information. When a network is in a desired situation, the retransmission request is sent to obtain a lost data packet, so that media information is more complete. When the network is not in a desired situation, the retransmission request is not sent, to avoid aggravating network congestion. Therefore, a technical problem of poor instant messaging quality caused by network congestion in a related technology can be resolved, and instant messaging quality can be improved.

Figure 3B:
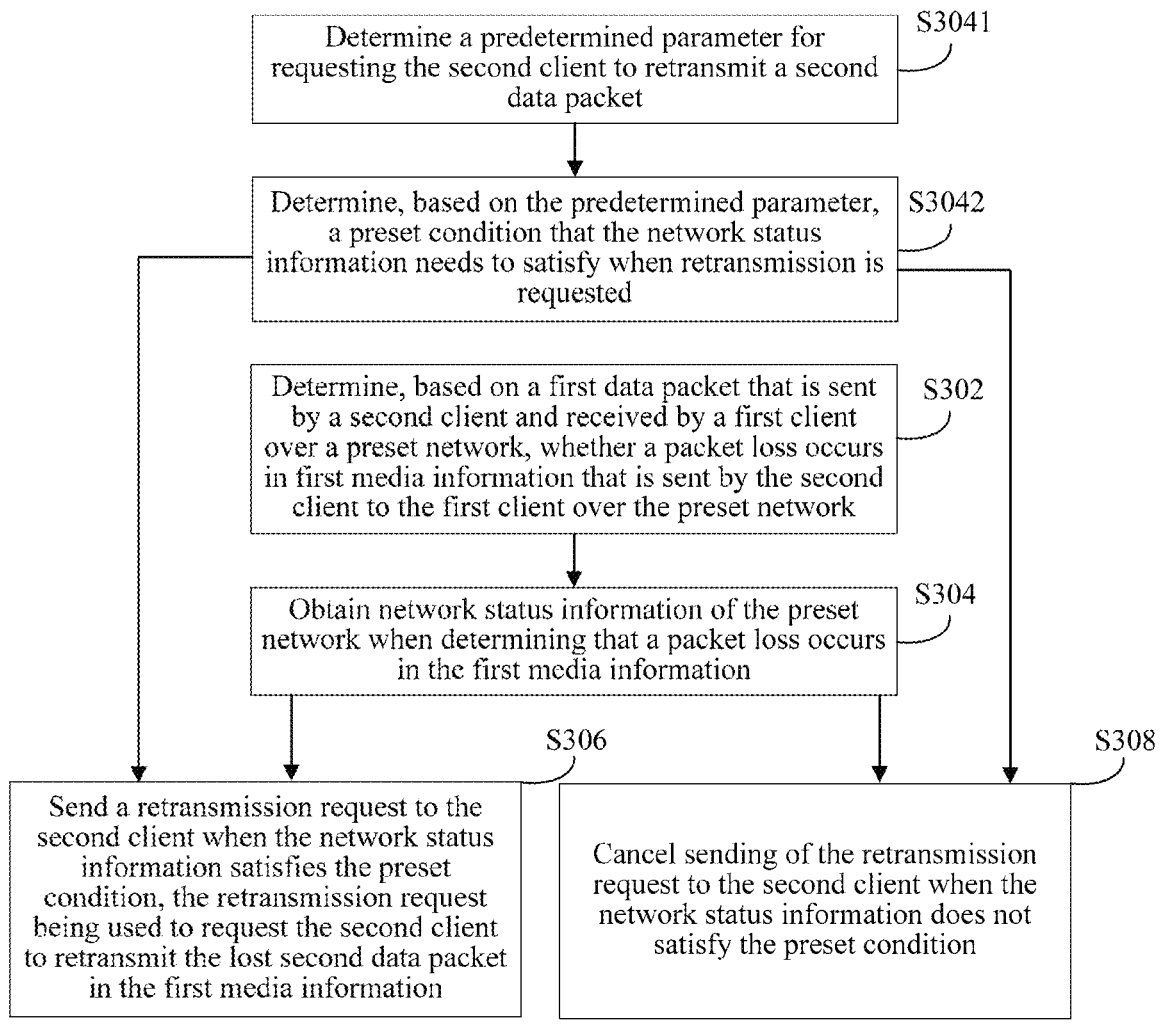
FIG. 3B is a flowchart of an optional call method according to an embodiment of this application.

Before step S306 is performed, the preset condition needs to be determined. As shown in FIG. 3B, determining the preset condition may include the following steps:

Step S3041: Determine a predetermined parameter for requesting the second client to retransmit the second data packet. The second data packet is a retransmitted data packet of an unsuccessfully transmitted data packet in the first media information. The predetermined parameter includes at least one of a first probability threshold of a retransmission success or a second probability threshold of an output success of the second data packet.

Step S3042: Determine, based on the predetermined parameter, a preset condition that the network status information needs to satisfy when retransmission is requested. The preset condition is used to indicate a network condition of the preset network that is required when a probability of successfully retransmitting the second data packet is not less than the first probability threshold, and/or used to indicate a network condition that is required when a probability that the successfully retransmitted second data packet can be successfully output is not less than the second probability threshold.

In a specific case, a length of time when a data packet sent to the first client is retained by the second client in a buffer is limited. Therefore, if the second client has discarded the first media information, even though the retransmission request reaches the second client, obviously, the second data packet cannot be successfully obtained. In some cases, if the network is currently in a poor situation, a packet loss may even occur in the retransmission request when the retransmission request is sent to the second client. Therefore, the requested retransmission fails due to the loss of the retransmission request. Therefore, in this embodiment, a parameter such as a probability about the requested retransmission is first determined based on transmission status information of current received first media information.

In this embodiment, the predetermined parameter may be a parameter agreed in advance, or may be dynamically determined based on a type of the first media information that is currently transmitted between the first client and the second client. For example, transmission of a voice data packet and a video data packet may correspond to different first probability thresholds and different second probability thresholds.

In this embodiment, statistics may be collected on a probability of successfully obtaining a retransmitted data packet by using the retransmission request. When the probability is higher than the first probability threshold, the retransmission request is sent to request the retransmitted data packet.

In some cases, although the retransmitted data packet is successfully obtained from the second client through requesting, an output time of the retransmitted second data packet has elapsed. Such a retransmitted data packet is unnecessarily requested. Therefore, in this embodiment, a network condition that is required when a probability that the successfully retransmitted second data packet is output is not less than the second probability threshold may be further determined.

The retransmission request is sent when a current network situation satisfies the first network condition or the second network condition. Obviously, compared with a manner in which the retransmission request is directly sent when a packet loss occurs without defining any network condition, such a manner can effectively reduce a frequency of sending the retransmission request, reduce severer congestion caused by retransmission requests still frequently sent when the network has been congested, and apply a valid bandwidth to transmission of useful media information as far as possible.

For example, the determining, based on the predetermined parameter, a preset condition that the network status information needs to satisfy when retransmission is requested includes at least one of the following:

determining, based on a buffer time when the second client buffers the first media information, a first network condition required when the retransmission request reaches the second client within the buffer time without being less than the first probability threshold; or determining, based on an output rate of media information in the first client, a second network condition required when the second data packet is output without being less than the second probability threshold after reaching the first client.

A length of time when the second client buffers the first media information may vary with different types of transmission scenarios. In this embodiment, based on the length of time when the second client buffers the first media information, the first network condition required for ensuring that a probability of successfully retransmitting the second data packet reaches at least the first probability threshold is calculated by using various retransmission models and the like.

In some cases, the requested retransmitted data packet is successfully retransmitted, but when the first client receives the data packet, a time at which the first client needs to output the data packet has actually elapsed, and the data packet is not output. Therefore, in this embodiment, network conditions required for ensuring that the requested retransmitted data packet can be successfully retransmitted and is actually used are determined.

Therefore, in this embodiment, a network condition that current network status information needs to satisfy is determined based on the predetermined parameter.

In a first optional manner, the determining, based on the predetermined parameter, a preset condition that the network status information needs to satisfy when retransmission is requested includes:

determining, based on a buffer time when the second client buffers the first media information, a first network condition required when the retransmission request reaches the second client within the buffer time without being less than the first probability threshold.

In a second optional manner, the determining, based on the predetermined parameter, a preset condition that the network status information needs to satisfy when retransmission is requested further includes:

determining, based on an output rate of media information in the first client, a second network condition required when the second data packet is output without being less than the second probability threshold after reaching the first client.

The media information output rate herein may be the number of voice data packets output in unit of time or an amount of voice data output in unit of time in a voice case, or may be the number of image frames output in unit of time, that is, corresponding to a frame rate or the like, in a video case.

The client may be a client for communication. The client may be installed on a computer or other fixed devices or mobile devices. Optionally, the client may be a client having a relatively high requirement on communication instantaneity, that is, an instant messaging client, for example, WeChat, QQ, or other applications that can be used to provide an instant messaging service. The fixed device may include: a desktop computer, a smart television (TV), or the like. The mobile device may include: a mobile phone, a tablet computer, a wearable device, or the like.

The preset network is a network for communication between clients, for example, the Internet connecting two clients. For example, a client A is located in Haidian District in Beijing, and a client B is located in Chaoyang District in Beijing; servers connecting the client A and the client B are also deployed in Haidian District and Chaoyang District. Then the preset network may include a network connecting Haidian District and Chaoyang District. In short, the preset network herein may be a network for transmitting the first media information. The first media information may be dynamic multi-media information such as a video, audio, or a GIF picture, or may be static information such as text information or a static picture.

The network status information is information for describing a network communication status, for example, information such as a network transmission speed or delay. The network condition refers to a least network resource that needs to be occupied for transmitting the second data packet and/or a worst network communication state that the network needs to provide, for example, a condition for defining a minimum network transmission speed or a minimum delay of the preset network that needs to be reached for retransmitting the second data packet.

It is noted that, in a related technology, the retransmission request is sent once a packet loss occurs. When the network is severely congested in this case, the sent retransmission request undoubtedly aggravates network congestion, resulting in more data packet losses. In addition, because the network is severely congested, even if a response data packet is received, the response data packet may be invalid. Consequently, communication quality cannot be improved; on the contrary, more data packet losses are caused due to severer network congestion. However, in the technical solution of this application, the retransmission request is not sent when the network is not in a desired situation, to avoid aggravating network congestion. Compared with the means used in the related technology, the technical solution of this application can reduce subsequent packet losses, and improve communication quality.

Step S302 to step S308 may be performed by a client receiving a data packet (that is, the first client). That is, the first client sends the retransmission request to the second client depending on a need of the first client. To reduce running load of the first client, step S302 to step S308 may alternatively be performed by an application server to which the client belongs. The server monitors a data packet receiving status of the first client, and requests a lost data packet from the second client depending on a network status after determining a packet loss. The server herein may be a client server. For example, when the client is an instant messaging application, the server is an instant messaging application server.

In this application, a current network feature is analyzed based on historical data, whether the retransmission request is sent is determined depending on the network feature and importance of received voice data, and a related retransmission control policy is adjusted in real time based on a utilization rate of retransmitted data, so that a utilization rate of a bandwidth and a usage rate of retransmission are both optimized in various network conditions. An optional implementation is shown in FIG. 3:

In the technical solution provided in step S302, the determining, based on a first data packet that is sent by a second client and received by a first client over a preset network, whether a packet loss occurs in first media information that is sent by the second client to the first client over the preset network may be implemented in the following manner: determining whether a packet loss occurs in the first media information based on sequence number index information in the first data packet.

Optionally, whether a packet loss occurs may be determined based on consecutiveness of sequence number indexes. For example, if data packets with indexes 7 and 9 are received, it may be determined that a data packet with an index 8 is lost. In addition, an index range of a plurality of data packets of a specific piece of media information are indicated in the data packets. For example, a piece of voice in an instant messaging application may be divided into 100 data packets for sending, and an index range 301 to 400 used for the voice may be indicated in the data packets. In this way, any lost data packet may be determined based on a received data packet.

In the technical solution provided in step S304, when it is determined that a packet loss occurs in the first media information, network status information of the preset network is obtained. The obtained information mainly includes a current used bandwidth, a current transmission delay, and a current packet loss rate that are used to represent a first network state, and a second preset value used to describe an allowed number of consecutive lost packets.

It is noted that, the current used bandwidth is used to indicate a current used bit rate. The used bit rate refers to a bit rate actually used in a current call, and includes a transmit bit rate and a receive bit rate. The transmit bit rate is obtained by dividing the total number of sent bytes by a call duration. The receive bit rate is obtained by dividing the total number of received bytes by the call duration. For example, if an estimated bandwidth (that is, a bandwidth threshold) is far greater than a current used transmit bit rate, it indicates that a bandwidth is sufficient, more packets can be retransmitted, and no pressure is caused to the network. The estimated bandwidth indicates a rough bandwidth status of a link in the current call, and is a real-time variable.

Before it is determined whether the first network state of the preset network indicated by the network status information matches a second network state required for retransmitting the second data packet, a bandwidth threshold is determined based on bandwidth information of the preset network, a transmission delay threshold is determined based on network jitter information of the preset network, and a packet loss rate threshold is determined based on a historical packet loss rate and a packet loss model.

A packet loss rate includes a long-time packet loss rate (that is, a packet loss rate from the beginning of a call to a current moment), a short-time packet loss rate (for example, a packet loss rate within five seconds, used to indicate whether a network packet loss rate has a burst change), and a cumulative histogram of the numbers of consecutive lost packets (used to represent a packet loss model, that is, whether a network type with uniform packet losses or a network type with large burst packet losses).

A transmission delay is a time required by a data block to enter a transmission medium from a node when the node sends data, that is, all time required by a station from the beginning to the end of sending a data frame (or all time required by a receive station to receive a data frame sent by another station).

In the technical solution provided in step S306 or S308, after the network status information of the preset network is obtained, and before the retransmission request is sent to the second client or sending of the retransmission request to the second client is canceled, it is determined whether a first network state of the preset network indicated by the network status information matches a second network state required for retransmitting the second data packet. It is determined that the network status information satisfies the preset condition when the first network state matches the second network state. It is determined that the network status information does not satisfy the preset condition when the first network state does not match the second network state.

Optionally, the determining whether a first network state of the preset network indicated by the network status information matches a second network state required for retransmitting the second data packet includes at least one of the following: determining whether a difference between a bandwidth threshold and a current used bandwidth is less than a first preset value; determining whether a current transmission delay is less than a transmission delay threshold; determining whether a current packet loss rate is less than a packet loss rate threshold; and determining whether the number of consecutive lost packets is less than a second preset value. A preset determining result is used to indicate that the first network state matches the second network state, and the preset determining result includes at least one of the following: determining that the difference between the bandwidth threshold and the current used bandwidth is less than the first preset value; determining that the current transmission delay is less than the transmission delay threshold; determining that the current packet loss rate is less than the packet loss rate threshold; or determining that the number of consecutive lost packets is less than the second preset value.

Optionally, before the retransmission request is sent to the second client, a voice feature of the lost second data packet is determined by performing signal feature analysis on a media information segment in the first data packet; and the sending a retransmission request to the second client when the network status information satisfies the preset condition includes: sending the retransmission request to the second client when the network status information satisfies the preset condition and the voice feature includes at least one of a voiced feature, the voice feature, or a semantic feature.

Optionally, a voice signal may be analyzed, for example, unvoiced and voiced analysis, voice activity analysis, or semantic importance analysis is performed, to adjust a network parameter threshold. For example, in a case of a sufficient bandwidth, the retransmission request may be sent once a packet loss is detected; in a case of an insufficient bandwidth, the retransmission request is sent for a lost important voice frame (that is, a voice frame satisfying one or more of the voiced feature, the voice feature, or the semantic feature). For example, a voice data packet including an important semantic meaning is retransmitted.

In some embodiments, the method further includes:

determining whether data content of the lost second data packet is of a predetermined type when determining that a packet loss occurs in the first media information; and correspondingly, in this case, step S304 includes:

obtaining network status information of the preset network when the data content is of the predetermined type.

When the first media information is video information, the video information includes: a key frame and a non-key frame. When the data content of the second data packet is a non-key frame, it does not matter much to playing of the first media information. In this embodiment, to simplify terminal operations and relieve congestion of the preset network, when the data content is not of the predetermined type, step S304 may be omitted.

After step S306 or S308 is completed, after the sending a retransmission request to the second client or canceling sending of the retransmission request to the second client, the method further includes at least one of the following: determining a current bandwidth threshold based on a previous determined bandwidth threshold and current bandwidth information of the preset network; increasing the packet loss rate threshold and decreasing the transmission delay threshold when a first proportion of the number of received second data packets to the number of sent retransmission requests is less than a third preset value; or decreasing the packet loss rate threshold and increasing the transmission delay threshold when a second proportion of received valid second data packets to all received second data packets is less than a fourth preset value.

The valid second data packet is a data packet satisfying a real-time requirement, that is, a data packet received within a preset time after being lost.

It is noted that, initial values may be empirically set for thresholds such as the bandwidth threshold, the packet loss rate threshold, and the transmission delay threshold. The initial values of the thresholds are used when step S302 to step S308 are performed at the first time, and may be automatically adjusted depending on a network status and an actual feedback status during running, to improve voice communication quality.

When the packet loss rate threshold and the transmission delay threshold are modified, the adjustment is not made once with an extremely large value, but instead, the thresholds may be gradually increased or decreased based on a specific percentage (for example, 10%) of current values of the parameters, to avoid an over-adjustment, and achieve smooth transition.

After step S306 or S308 is completed, after the retransmission request is sent to the second client, the second data packet sent by the second client is received, and second media information is generated based on the first data packet and the second data packet; or when the network status information does not satisfy the preset condition, third media information is generated based on the first data packet.

When all data packets of the first media information are received, that is, when each lost second data packet is received, the second media information is generated to recover the first media information, that is, a complete piece of voice can be obtained through recovery. Due to a voice loss, that is, a packet loss, the third media information has lower quality than the first media information.

In the foregoing embodiment, to describe a retransmission mechanism more clearly, as shown in FIG. 2, a retransmission control procedure mainly includes the following steps:

Step S31. Perform packet loss detection. Whether a packet loss occurs is determined based on sequence number index information in header information of a received data packet. For example, a current data packet has a sequence number index of 25, and a previous data packet has a sequence number index of 24. Because the two data packets have consecutive sequence number indexes, it can be learned based on the sequence number indexes that no packet loss occurs. If the previous data packet has a sequence number index of 22, because the two data packets do not have consecutive sequence number indexes, it can be learned based on the sequence number indexes that a packet loss occurs, and two packets are lost (that is, sequence number indexes of the lost data packets are 23 and 24).

Step S32. Perform request control. If a packet loss is detected in step S31, a retransmission request is sent to a peer end (for example, the client B).

Step S33. Perform response control. To-be-retransmitted data is determined from historical buffered data based on received retransmission request information. A determining basis includes: a length interval between the to-be-retransmitted data and already-transmitted data, and an importance level of the to-be-retransmitted data.

For retransmission control, request control of step S32 is sending a retransmission request once detecting a packet loss, but a bandwidth also needs to be consumed to send retransmission request information. In some networks, excess bandwidth consumption may aggravate network congestion, and deteriorate call quality, or a utilization rate of retransmitted data is low due to a real-time call feature. In this case, it is unnecessary to send the retransmission request information in step S32. In addition, in response control of step S33, a network feature, a utilization rate of retransmission, and the like are not considered, either. Therefore, in such a retransmission control method, neither a utilization rate of retransmitted data nor a utilization rate of a bandwidth is controlled depending on different network features.

Figure 4:
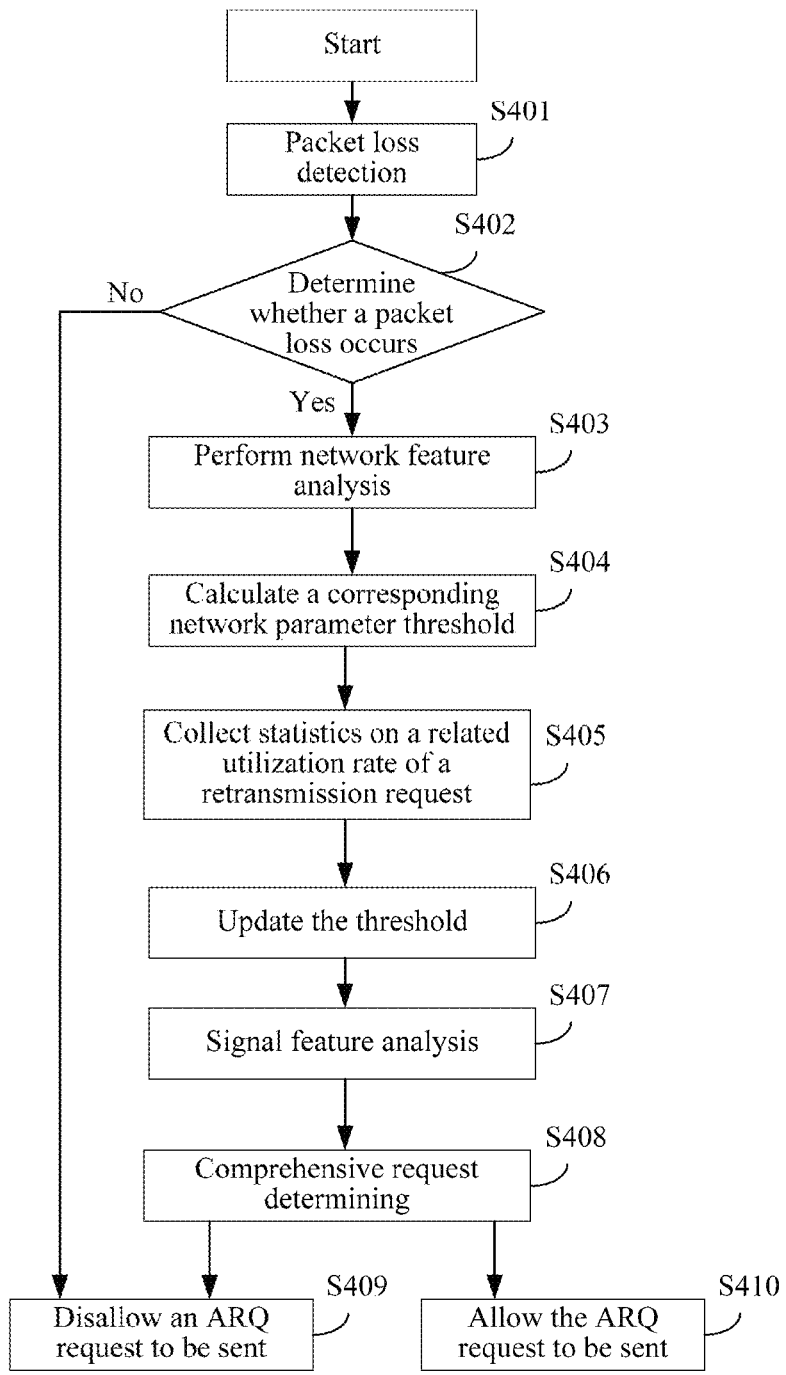
FIG. 4 is a flowchart of an optional call method according to an embodiment of this application.

The following further describes in detail the technical solution of this application with reference to FIG. 4, as shown in FIG. 4:

Step S401. Perform packet loss detection. Whether a packet loss occurs is determined based on sequence number index information in header information.

Step S402. Perform packet loss determining, that is, determine whether a packet loss occurs. If no packet loss is detected in step S401, step S409 is performed. If a packet loss is detected, step S403 is performed.

Step S403. Perform network feature analysis. A network feature includes, but not limited to, a used bit rate, an estimated bandwidth, a packet loss rate, a network jitter, an end-to-end transmission delay, or the like.

The used bit rate refers to a bit rate actually used in a current call, and includes a transmit bit rate and a receive bit rate. The transmit bit rate is obtained by dividing the total number of sent bytes by a call duration. The receive bit rate is obtained by dividing the total number of received bytes by the call duration. For example, if an estimated bandwidth is 512 kbps, and a current used transmit bit rate is 100 kbps, it indicates that a bandwidth is sufficient, more packets can be retransmitted, and no pressure is caused to a network.

The estimated bandwidth indicates a rough bandwidth status of a link in the current call, and is a real-time variable.

The packet loss rate includes a long-time packet loss rate (that is, a packet loss rate from the beginning of a call to a current moment), a short-time packet loss rate (for example, a packet loss rate within five seconds, used to indicate whether a network packet loss rate has a burst change), and a cumulative histogram of the numbers of consecutive lost packets (used to represent a packet loss model, that is, whether a network type with a uniform packet loss or a network type with large burst packet losses).

The network jitter is a conception in quality of service (QoS), and refers to a variation of a packet delay. If the network is congested, a queuing delay affects an end-to-end delay, and packet delays of transmissions over a same connection are different. The jitter is used to describe such a delay variation.

Step S404. Calculate a corresponding network parameter threshold based on an analysis result in step S403.

(1) Determine a bandwidth threshold. Based on the estimated bandwidth, when a used bit rate (that is, a current used bandwidth, for example, a receive bit rate or a transmit bit rate) is greater than a specific threshold, an ARQ request (that is, the retransmission request) is not allowed to be sent.

(2) Determine a transmission delay threshold. The transmission delay threshold is determined based on the network jitter. In a case of a specific jitter, when a transmission delay is greater than a specific threshold, the ARQ request is not allowed to be sent, because even though the ARQ request is sent in this case, retransmitted response data may be not used, resulting in a low utilization rate.

(3) Determine a packet loss rate threshold. A current packet loss rate threshold is determined based on analysis on a historical packet loss rate and a packet loss model. For example, in a network that does not have a sufficient bandwidth or a network that has a particularly large packet loss rate, sending more data means that more data will be lost. In this case, sending the ARQ request increases network load, that is, it is useless or adverse to send the ARQ request.

For example, assuming that the estimated bandwidth is 512 kbps, and the current used bit rate is 100 kbps, it indicates that a bandwidth is sufficient, and the retransmission request may be sent when a packet loss is detected. Assuming that the estimated bandwidth is 512 kbps, and the used bit rate is 450 kbps, it indicates that a remaining bandwidth is not quite sufficient. In this case, the retransmission request is sent when a packet loss rate is greater than 15% and a cumulative histogram of the numbers of consecutive lost packets shows that losses of a plurality of (for example, four) or more consecutive packets accounts for a relatively large proportion. Such a consideration is taken because a semantic understanding is not affected in a case of a relatively low packet loss rate though auditory call quality is lowered. However, semantic reception is affected when the packet loss rate is high to a certain extent. When the bandwidth is insufficient, to avoid impact caused by excess retransmitted packets on the network, the retransmission request is sent when the packet loss rate is high to a certain extent.

Step S405. Collect statistics on a related utilization rate of a retransmission request.

(1) Calculate a first proportion of the number of pieces of received response data and the number of ARQ requests. Historical data buffered by the client B has a specific length limitation. If a delay of transmission from the client A to the client B is excessively large, data information of a requested packet carried in an ARQ request received by the client B is no longer buffered data, and the client B does not respond to the ARQ request of the client A. In this case, a calculated value of the first proportion is particularly small. To prevent the client A from sending excess ARQ requests and causing a bandwidth waste, an ARQ request sending frequency needs to be lowered, that is, increasing a related threshold of the network parameter.

(2) Calculate an actual utilization rate of response data. After receiving an ARQ request, the client B finds corresponding data in the historical buffered data, uses the data as a response packet, and sends the response packet to the client A. In this case, if a delay of transmission from the client B to the client A is excessively large, the response data does not satisfy a data requirement of a real-time call when reaching the client A, and becomes a late packet and needs to be actively discarded. In this case, although the response data is received, a utilization rate of the response data is low. If the actual utilization rate keeps low within a period of time, the ARQ request frequency also needs to be lowered, that is, increasing the related threshold of the network parameter.

Step S406. Update the threshold.

Because the network bandwidth, the transmission delay, and the like are all estimated values, an actual effect may be still not desired even if proper control is performed based on parameters such as the estimated bandwidth, the used bit rate, the packet loss rate, and the transmission delay. For example, bandwidth estimation may be insufficiently accurate. After a packet is retransmitted, a transmission delay becomes larger due to network congestion. Many retransmission requests are sent, while few retransmission responses are received. In this case, a proportion of the number of pieces of received response data to the number of ARQ requests is low. For example, 1000 retransmission requests are sent, while one ARQ response packet is received. In this case, a retransmission request frequency needs to be decreased. The decrease is not made once by a large value, but implemented by gradually increasing a related network parameter. For example, the ARQ request is previously allowed to be sent when a packet loss rate is greater than 10% and a transmission delay is less than 200 ms, but now the thresholds are increased, and the ARQ request is allowed to be sent when a packet loss rate is greater than 20% and a transmission delay is less than 150 ms.

Step S407. Perform signal feature analysis.

A signal is analyzed. For example, unvoiced and voiced analysis, voice activity analysis, or semantic importance analysis is performed, to adjust the network parameter threshold in step S406. For example, in a case of a sufficient bandwidth, the retransmission request may be sent once a packet loss is detected; in a case of an insufficient bandwidth, the retransmission request is sent for a lost important voice frame.

For example, if the estimated bandwidth is 512 kbps, and the used bit rate is 100 kbps, it indicates that a bandwidth is sufficient, and the retransmission request may be sent once a packet is lost. Assuming that the estimated bandwidth is 512 kbps, and the used bit rate is 460 kbps, it indicates that a bandwidth is not quite sufficient, and the retransmission request is sent when a lost packet is important information.

Step S408. Perform comprehensive request determining.

During comprehensive determining, when the bandwidth is sufficient, more retransmission requests may be sent; when the bandwidth is insufficient, the retransmission request is sent when important information is lost.

Step S409. Disallow an ARQ request to be sent.

Step S410. Allow the ARQ request to be sent.

Through the foregoing embodiment, sending of the retransmission request is adapted to different network features, so that a utilization rate of a bandwidth and retransmission efficiency are both optimized in various network environments.

It is noted that, for brevity, the foregoing method embodiments are described as a series of actions, but those skilled in the art should understand that this application is not limited to the described order of the actions, because some steps may be performed in other orders or performed at the same time according to this application. In addition, those skilled in the art should also understand that all the embodiments described in this specification are preferred embodiments, and the related actions and subparts are not necessarily mandatory to this application.

Based on the foregoing descriptions of the implementations, those skilled in the art may clearly understand that the methods in the above embodiments may be implemented by software plus a necessary universal hardware platform or by hardware only. In most circumstances, the former is a preferred implementation. Based on such an understanding, the technical solutions of the embodiments of this application essentially, or the part contributing to the related technology may be implemented in a form of a software product. The computer software product may be stored in a storage medium (such as a read-only memory (ROM)/random-access memory (RAM), a magnetic disk, or an optical disc), and include several instructions for instructing a terminal device (which may be a mobile phone, a computer, a server, a network device, or the like) to perform the methods according to the embodiments of this application.

In another embodiment provided in this application, the call method further includes:

obtaining a de-jittering parameter based on current network status information and a second de-jittering policy, and setting, based on the de-jittering parameter, a capacity of a buffer for transmitting call data of the voice call or the video call, so that a delay of the voice call or the video call meets expectation.

In this embodiment of this application, the de-jittering parameter may be obtained by using the second de-jittering policy, and call quality can be improved by performing de-jittering processing in the voice call or the video call.

Optionally, the method further includes: collecting offline network data, and extracting at least one network parameter for representing a network feature from the offline network data; constructing a network model based on the at least one network parameter, and determining a first de-jittering policy based on the network model; and modifying the first de-jittering policy based on a feature parameter for evaluating call quality of the voice call or the video call, to obtain the second de-jittering policy.

There are a plurality of manners for modifying the first de-jittering policy, and the following provides several optional manners:

In a first optional manner, the modifying the first de-jittering policy based on a feature parameter for evaluating call quality of the voice call or the video call, to obtain the second de-jittering policy includes:

obtaining historical data of a current voice call or video call; and modifying the first de-jittering policy based on the historical data of the current voice call or video call.

In a second optional manner, the modifying the first de-jittering policy based on a feature parameter for evaluating call quality of the voice call or the video call, to obtain the second de-jittering policy includes:

obtaining signal content of a current voice call or video call; and modifying the first de-jittering policy based on the signal content of the current voice call or video call.

In a third optional manner, the modifying the first de-jittering policy based on a feature parameter for evaluating call quality of the voice call or the video call, to obtain the second de-jittering policy includes:

obtaining an auditory perception result of a current voice call or video call; and modifying the first de-jittering policy based on the auditory perception result.

In some embodiments, the method further includes:

obtaining, when collecting call data of a current voice call or video call, different processing capabilities of terminal devices and/or a scheduling feature of an application used as a call medium; and modifying the first de-jittering policy based on the different processing capabilities of the terminal devices and/or the scheduling feature of the application used as the call medium.

In addition, the method further includes:

obtaining, when playing call data of a current voice call or video call, different processing capabilities of terminal devices and/or a scheduling feature of an application used as a call medium; and modifying the first de-jittering policy based on the different processing capabilities of the terminal devices and/or the scheduling feature of the application used as the call medium.

The client in this embodiment of this application corresponds to a smart terminal (for example, a mobile terminal), and may be implemented in various forms. For example, the mobile terminal described in this embodiment of this application may include a mobile terminal such as a mobile phone, a smart phone, a notebook computer, a digital broadcast receiver, a personal digital assistant (PDA), a tablet computer (PAD), a portable media player (PMP), or a navigation apparatus, and a fixed terminal such as a digital TV or a desktop computer. In the following, it is assumed that a terminal is a mobile terminal. However, those skilled in the art understood that, the configuration according to this embodiment of this application can also be applied to a terminal of a fixed type, except for an element particularly used for a purpose of movement.

FIG. 9 is a schematic diagram of hardware entities performing information exchange according to an embodiment of this application. FIG. 9 includes: a terminal device 1, a server 2, and a terminal device 3. The terminal device 1 is referred to as a transmit-end device, and includes terminal devices 11 to 14. The terminal device 3 is referred to as a receive-end device, and includes terminal devices 31 to 35. The server 2 is configured to execute de-jittering processing logic. The terminal devices exchange information with the server over a wired network or a wireless network. The terminal device includes types such as a mobile phone, a desktop, a PC, and an all-in-one computer. In this embodiment of this application, the terminal device 1 performs information transmission and exchange with the terminal device 3 via the server 2. A call in this application may be a voice call or a video call. Optionally, using a Voice over Internet Protocol (VoIP) network call as an example, the terminal devices 11 to 14 send network data in a current VoIP network call, the server 2 performs de-jittering processing on the network data, and then the terminal devices 31 to 35 play the network data, to complete the current VoIP network call. In the related technology, a de-jittering policy constructed by using a single parameter is not accurate, and call quality of a VoIP network call is affected. In this embodiment of this application, offline network data of an existing network is used, at least one network parameter for representing a network feature is extracted from the offline network data, and a network model is constructed based on the at least one network parameter, so that a first de-jittering policy (or referred to as a de-jittering policy) determined based on the network model tends to be accurate. Optionally, processing logic 10 in the server 2 performing de-jittering processing includes: S1. Collect offline network data, and extract at least one network parameter for representing a network feature from the offline network data. S2. Construct a network model based on the at least one network parameter, and determine a first de-jittering policy based on the network model. S3. Modify the first de-jittering policy based on a feature parameter for evaluating quality of a voice call or a video call such as a VoIP call, to obtain a second de-jittering policy. S4. Obtain a de-jittering parameter based on a current real-time network status and the second de-jittering policy, and set, based on the de-jittering parameter, a size of a buffer for transmitting data of the voice call or the video call such as the VoIP call, so that a delay of the voice call or the video call such as the VoIP call meets expectation.

The example in FIG. 9 is merely a system architecture example for implementing this embodiment of this application. This embodiment of this application is not limited to the system structure in FIG. 9. Various method embodiments of this application are provided based on the system architecture in FIG. 9.

An embodiment of this application provides an information processing method. As shown in FIG. 10, the method includes the following steps: Collect offline network data, extract at least one network parameter for representing a network feature from the offline network data, construct a network model based on the at least one network parameter, to measure or simulate VoIP call quality based on the network model, and determine a first de-jittering policy based on the network model (101). Optionally, the first de-jittering policy may also be referred to as an initial de-jittering policy. During actual application, a large amount of existing-network-related network data is collected based on different network types, and the network model is constructed through offline training. The network model can be used to determine the initial de-jittering policy; besides, because a related parameter output based on the initial de-jittering policy includes a de-jittering parameter, a delay parameter, and the like, the initial de-jittering policy and the related parameter may be described as being determined based on the network model, where the related parameter includes the de-jittering parameter and the delay parameter. Modify the first de-jittering policy based on a feature parameter (for example, historical data of a current call, signal content of the current call, or an auditory perception result of the current call) for evaluating quality of a voice call or a video call such as a VoIP call, to obtain a second de-jittering policy (1021). The historical data of the current call can reflect a network feature of the current call. The signal content of the current call decides whether a current frame is an important frame. Voice data content is an important frame and requires attention, while silent data content does not require attention. Different content corresponds to different de-jittering processing. For the auditory perception result, different auditory perception results correspond to different de-jittering adjustment manners and amplitudes. Obtain a de-jittering parameter based on a current real-time network status and the second de-jittering policy, and set, based on the de-jittering parameter, a size of a buffer for transmitting data of the voice call or the video call such as the VoIP call, so that a delay of the voice call or the video call such as the VoIP call meets expectation, and tends to be proper (103). During actual application, a size of a de-jittering buffer is determined based on the de-jittering parameter obtained by using the second de-jittering policy, and finally data in the buffer is adjusted based on the size of the de-jittering buffer.

In this embodiment of this application, offline network data is collected, and at least one network parameter for representing a network feature is extracted from the offline network data. A network model is constructed based on the at least one network parameter. A first de-jittering policy is determined based on the network model. Because a de-jittering algorithm is constructed by using a plurality of parameters, full estimation is performed for various complex situations in a network call environment, the obtained first de-jittering policy (or referred to as an initial de-jittering policy) tends to be accurate, and a related parameter, for example, a de-jittering parameter, obtained based on this initial de-jittering policy also tends to be accurate. To further increase accuracy, the first de-jittering policy is further modified based on a feature parameter for evaluating quality of a voice call or a video call such as a VoIP call, to obtain a second de-jittering policy. A de-jittering parameter is obtained based on a current real-time network status and the second de-jittering policy, and a size of a buffer for transmitting data of the voice call or the video call such as the VoIP call is set based on the de-jittering parameter, so that a delay of the voice call or the video call such as the VoIP call meets expectation. Through a series of de-jittering policy optimization, the size of the buffer that is set accordingly tends to be proper. It is instructive to improve network call quality based on the size of the buffer, and the network call quality is improved.

It is noted herein that, collection, policy determining, policy modification, and other logic in processing logic of the method are not limited to being located on a transmit end, a receive end, or a server, and the logic may be all or partially located on the transmit end, the receive end, or the server.

Figure 11:
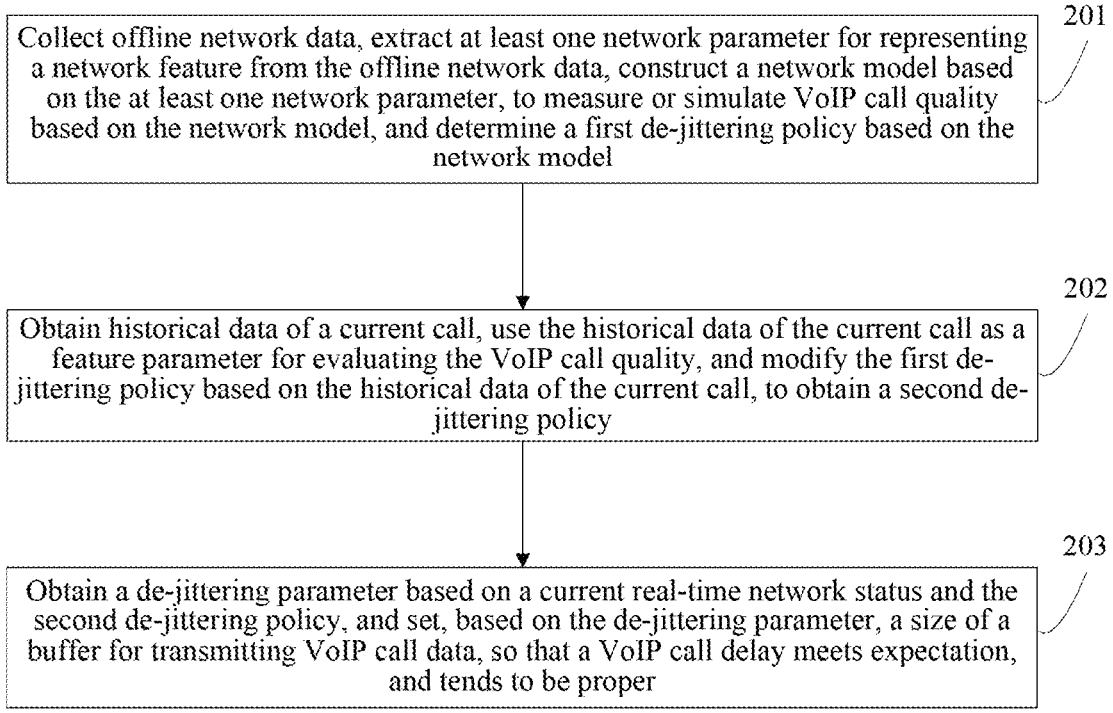
FIG. 11 is a schematic diagram of an implementation procedure of another method according to an embodiment of this application.

An embodiment of this application provides an information processing method. As shown in FIG. 11, the method includes the following steps: Collect offline network data, extract at least one network parameter for representing a network feature from the offline network data, construct a network model based on the at least one network parameter, to measure or simulate VoIP call quality based on the network model, and determine a first de-jittering policy based on the network model (201). Optionally, the first de-jittering policy may also be referred to as an initial de-jittering policy. During actual application, a large amount of existing-network-related network data is collected based on different network types, and the network model is constructed through offline training. The network model can be used to determine the initial de-jittering policy; besides, because a related parameter output based on the initial de-jittering policy includes a de-jittering parameter, a delay parameter, and the like, the initial de-jittering policy and the related parameter may be described as being determined based on the network model, where the related parameter includes the de-jittering parameter and the delay parameter. Obtain historical data of a current call, use the historical data of the current call as a feature parameter for evaluating quality of a voice call or a video call such as a VoIP call, and modify the first de-jittering policy based on the historical data of the current call, to obtain a second de-jittering policy (202). The historical data of the current call can reflect a network feature of the current call. In a single call, setting of a network parameter, for example, a de-jittering parameter and a delay processing parameter, in the first de-jittering policy may be adjusted based on the historical data of the current call. Obtain a de-jittering parameter based on a current real-time network status and the second de-jittering policy, and set, based on the de-jittering parameter, a size of a buffer for transmitting data of the voice call or the video call such as the VoIP call, so that a delay of the voice call or the video call such as the VoIP call meets expectation, and tends to be proper (203). During actual application, a size of a de-jittering buffer is determined based on the de-jittering parameter obtained by using the second de-jittering policy, and finally data in the buffer is adjusted based on the size of the de-jittering buffer.

Figure 12:
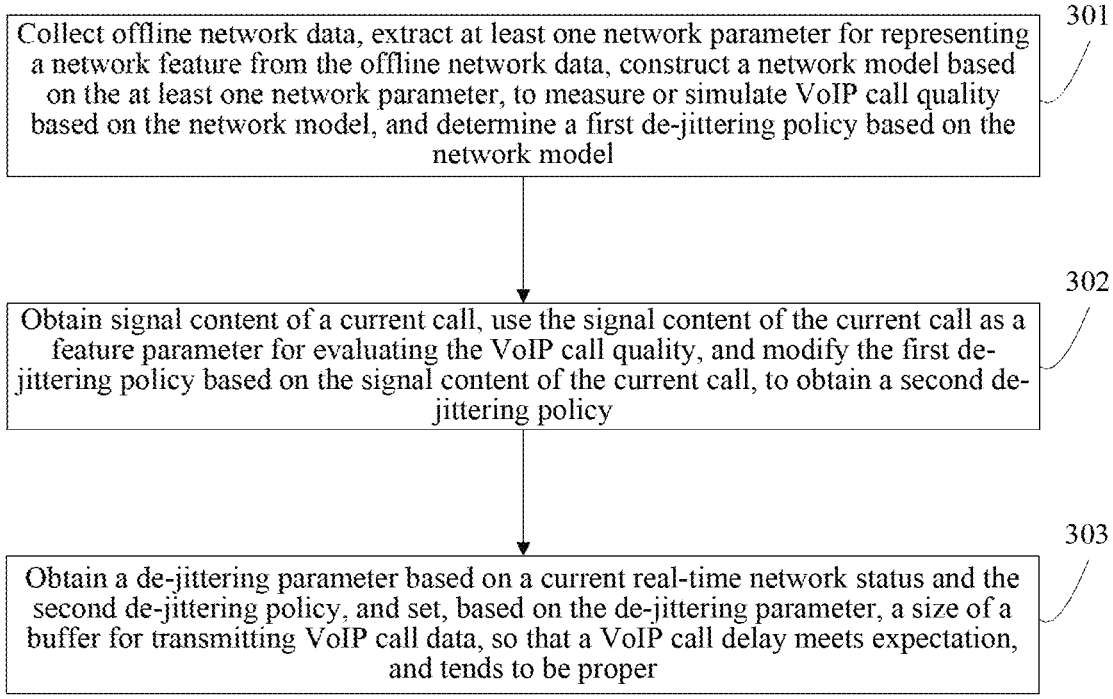
FIG. 12 is a schematic diagram of an implementation procedure of still another method according to an embodiment of this application.

An embodiment of this application provides an information processing method. As shown in FIG. 12, the method includes the following steps: Collect offline network data, extract at least one network parameter for representing a network feature from the offline network data, construct a network model based on the at least one network parameter, to measure or simulate VoIP call quality based on the network model, and determine a first de-jittering policy based on the network model (301). Optionally, the first de-jittering policy may also be referred to as an initial de-jittering policy. During actual application, a large amount of existing-network-related network data is collected based on different network types, and the network model is constructed through offline training. The network model can be used to determine the initial de-jittering policy; besides, because a related parameter output based on the initial de-jittering policy includes a de-jittering parameter, a delay parameter, and the like, the initial de-jittering policy and the related parameter may be described as being determined based on the network model, where the related parameter includes the de-jittering parameter and the delay parameter. Obtain signal content of a current call, use the signal content of the current call as a feature parameter for evaluating quality of a voice call or a video call such as a VoIP call, and modify the first de-jittering policy based on the signal content of the current call, to obtain a second de-jittering policy (302). The signal content of the current call decides whether a current frame is an important frame. Voice data content is an important frame and requires attention, while silent data content does not require attention. Different content corresponds to different de-jittering processing. In a single call, setting of a network parameter, for example, a de-jittering parameter and a delay processing parameter, in the first de-jittering policy may be adjusted. Certainly, after the first de-jittering policy is modified based on a feature parameter (for example, historical data of the current call or an auditory perception result of the current call) for evaluating quality of the voice call or the video call such as the VoIP call, the modified de-jittering policy may be further modified based on the signal content of the current call, to improve precision of the de-jittering policy. Obtain a de-jittering parameter based on a current real-time network status and the second de-jittering policy, and set, based on the de-jittering parameter, a size of a buffer for transmitting data of the voice call or the video call such as the VoIP call, so that a delay of the voice call or the video call such as the VoIP call meets expectation, and tends to be proper (303). During actual application, a size of a de-jittering buffer is determined based on the de-jittering parameter obtained by using the second de-jittering policy, and finally data in the buffer is adjusted based on the size of the de-jittering buffer.

Figure 13:
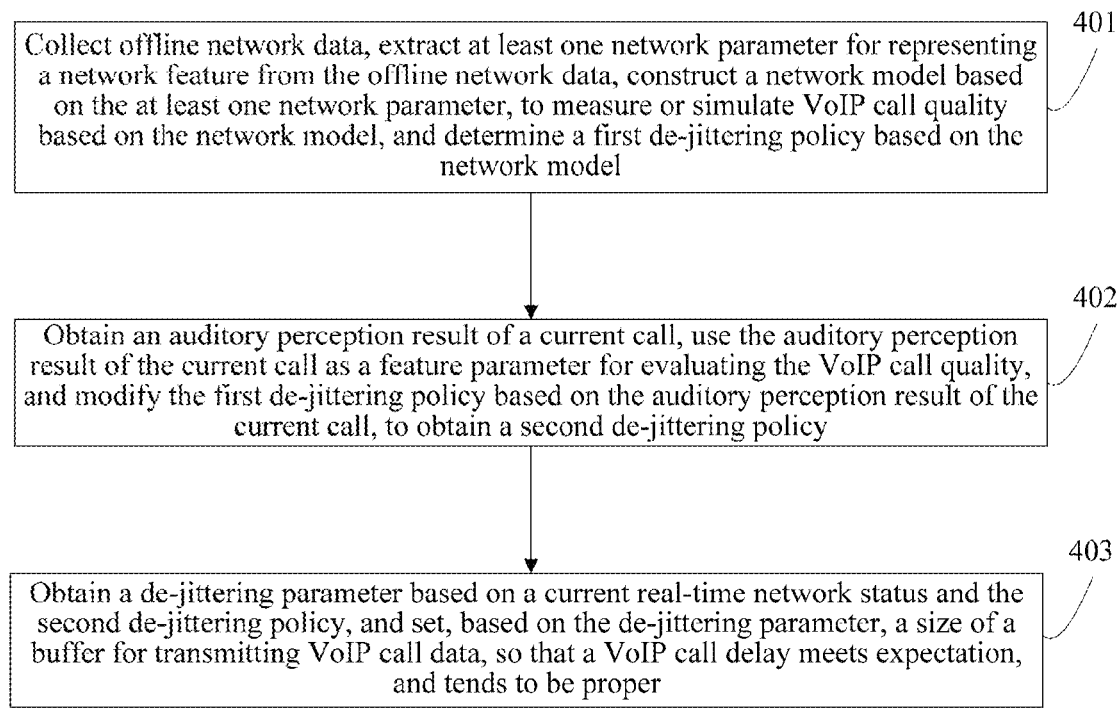
FIG. 13 is a schematic diagram of an implementation procedure of still another method according to an embodiment of this application.

An embodiment of this application provides an information processing method. As shown in FIG. 13, the method includes the following steps: Collect offline network data, extract at least one network parameter for representing a network feature from the offline network data, construct a network model based on the at least one network parameter, to measure or simulate VoIP call quality based on the network model, and determine a first de-jittering policy based on the network model (401). Optionally, the first de-jittering policy may also be referred to as an initial de-jittering policy. During actual application, a large amount of existing-network-related network data is collected based on different network types, and the network model is constructed through offline training. The network model can be used to determine the initial de-jittering policy; besides, because a related parameter output based on the initial de-jittering policy includes a de-jittering parameter, a delay parameter, and the like, the initial de-jittering policy and the related parameter may be described as being determined based on the network model, where the related parameter includes the de-jittering parameter and the delay parameter. Obtain an auditory perception result, which may also be referred to as an auditory perception evaluation parameter, of a current call, use the auditory perception result of the current call as a feature parameter for evaluating quality of a voice call or a video call such as a VoIP call, and modify the first de-jittering policy based on the auditory perception result of the current call, to obtain a second de-jittering policy (402). For the auditory perception result, different auditory perception results correspond to different de-jittering adjustment manners and amplitudes. In a single call, setting of a network parameter, for example, a de-jittering parameter and a delay processing parameter, in the first de-jittering policy may be adjusted. Certainly, after the first de-jittering policy is modified based on a feature parameter (for example, historical data of the current call or signal content of the current call) for evaluating quality of the voice call or the video call such as the VoIP call, the modified de-jittering policy may be further modified based on the auditory perception result of the current call, to improve precision of the de-jittering policy. Obtain a de-jittering parameter based on a current real-time network status and the second de-jittering policy, and set, based on the de-jittering parameter, a size of a buffer for transmitting data of the voice call or the video call such as the VoIP call, so that a delay of the voice call or the video call such as the VoIP call meets expectation, and tends to be proper (403). During actual application, a size of a de-jittering buffer is determined based on the de-jittering parameter obtained by using the second de-jittering policy, and finally data in the buffer is adjusted based on the size of the de-jittering buffer.

During actual application, in addition to processing on a de-jittering end, in an entire VoIP network call, different delay processing methods and parameters may be further set on a transmit end and a receive end (or referred to as a playing end) based on different processing capabilities of devices, scheduling features of application program threads, or the like, so that the first de-jittering policy is further modified, to improve precision of the de-jittering policy, as described in the following embodiment.

For the transmit end in the entire VoIP network call, in an information processing method according to an embodiment of this application, when data of a current call, for example, a voice call or a video call such as a VoIP call, is collected, different processing capabilities of terminal devices and/or a scheduling feature of an application used as a medium of the voice call or the video call such as the VoIP call are obtained, and the first de-jittering policy is modified based on the different processing capabilities of the terminal devices and/or the scheduling feature of the application used as the medium of the voice call or the video call such as the VoIP call.

For the receive end (or referred to as the playing end) in the entire VoIP network call, in an information processing method according to an embodiment of this application, when data of a current call, for example, a voice call or a video call such as a VoIP call, is played, different processing capabilities of terminal devices and/or a scheduling feature of an application used as a medium of the voice call or the video call such as the VoIP call are obtained, and the first de-jittering policy is modified based on the different processing capabilities of the terminal devices and/or the scheduling feature of the application used as the medium of the voice call or the video call such as the VoIP call.

Through the foregoing embodiments, during actual application, a corresponding parameter for representing a network feature may be first extracted through offline packet capturing, different network parameter models are established through lots of offline training, an initial de-jittering algorithm and a related parameter are determined based on the established network parameter models, and then the de-jittering policy and the related parameter are adjusted based on historical data of a current call. Because both an overall network feature in an entire call process and burstiness within a period of time are considered in network model establishment, a network feature can be estimated more accurately.

As for a de-jittering policy, using the system architecture shown in FIG. 1 as an example, when the server 2 performs de-jittering processing, a de-jittering policy of the server keeps working in an optimum state. In this specification, JB_len represents a size of a buffer, AD_up represents an upper limit of the buffer, AD_dw represents a lower limit of the buffer, F1 to F4 represent empirical values for parameter adjustment. Specific content is as follows:

1. JB_len>AD_up:

When JB_len>AD_up×F1, if current frame signal content is an important frame (for example, a voice segment), current data in the buffer is compressed. If a current frame is non-important data (for example, silent data), the current frame is directly discarded. When JB_len>AD_up×F2 F2), if current frame signal content is an important frame (for example, a voice segment), current data in the buffer is not processed. If a current frame is non-important data (for example, silent data), current data in the buffer is compressed.

Compression amplitudes are determined based on values of F1 and F2, and an amplitude of each compression is less than a data length of the current frame.

A basis of such processing is because: compressing and directly discarding a signal both cause impairment to call quality, but direct packet discarding causes greater impairment than compression. Based on a compression algorithm of a single packet, an amplitude of each compression is less than a data length of one frame. Therefore, compared with directly discarding a current frame, data compression reduces a length of data in the buffer at a lower speed, that is, an end-to-end delay is decreased at a lower speed. Therefore, the method in which a frame is directly discarded is used when the length of data in the buffer is very large and current data is non-important data. If the length of data in the buffer is very large but current data is important data, a manner causing less impairment, that is compression, is used to adjust the buffer length. If the length of data in the buffer is greater than a specific threshold, but a current frame is important data, a policy of performing nothing is used, so that call quality of a voice segment is maximally ensured. An excess delay may be rapidly processed when a non-silent segment appears, thereby reducing an end-to-end delay while maximally ensuring perceptual quality of a call.

2. JB_len<AD_dw:

When JB_len<AD_dw×F3, if a current frame is a non-important frame, the current frame is directly copied repeatedly, the number of copies is determined based on a value of F3. If a current frame is an important frame, current data in the buffer is expanded. When JB_len<AD_dw×F4 (F3<F4), the current buffer is expanded. An amplitude of each expansion is determined based on values of F3 and F4.

A basis of such processing is because: although expanding and directly copying data also cause impairment to sound, compared with a sound pause caused because data in the buffer is empty, such impairment causes much less impact on call experience. Therefore, when the length of data in the buffer is found to be less than a lower limit of adjustment, in principle, a fast response is made and a size of data in the buffer is adjusted as soon as possible.

3. AD_up>=JB_len>=AD_dw:

In this case, data in the buffer is directly decoded and sent to an audio adapter device without any de-jittering processing.

In de-jittering policy adjustment in the first and second parts of content, for both expansion and compression, signal content and a current adjustment algorithm further need to be considered. For example, expansion and compression algorithms are based on a pitch period, but such an expansion or compression algorithm is not suitable for a music signal. Therefore, if it is detected that a current signal is a music signal rather than a voice signal, a proper adjustment further needs to be made to an adjustment parameter (AD_up, AD_dw, or F1 to F4). In addition, if excessive consecutive expansions/compressions are performed, a fast playing or slow playing effect is caused to auditory perception. Therefore, for de-jittering policy adjustment in the first and second parts of content, a proper adjustment (for example, specifying maximum consecutive expansion or compression times) further needs to be made based on a historical adjustment policy, to ensure that no fast playing or slow playing effect is caused to final auditory perception.

In some embodiments, the method further includes:

determining whether the first client and the second client are in a both-speaking state in which the first client and the second client collect sound at the same time; and performing particular call quality improvement processing on the voice call or the video call when the first client and the second client are in the both-speaking state.

Optionally, the determining whether the first client and the second client are in a both-speaking state in which the first client and the second client collect sound at the same time includes:

obtaining, based on the first media information, a far-end signal provided by the first client, where the far-end signal is a signal obtained based on a sound signal sent by a peer end of the voice call;

superimposing an ultrasonic signal on the far-end signal to obtain a mixed signal in which the ultrasonic signal is superimposed, and playing the mixed signal by using a speaker part;

obtaining a near-end signal of the second client, where the near-end signal is a sound signal collected by the second client by using a microphone part;

determining a first signal segment in the mixed signal and a second signal segment in the near-end signal based on the ultrasonic signal;

calculating a correlation value between the first signal segment and the second signal segment; and determining that a call state when the microphone part collects the near-end signal is the both-speaking state when the correlation value is less than a preset correlation value threshold.

Optionally, before the superimposing an ultrasonic signal on the far-end signal, the method further includes:

detecting whether a power value of the far-end signal is greater than a preset power threshold; and performing the step of superimposing an ultrasonic signal on the far-end signal when a detection result is that the power value of the far-end signal is greater than the preset power threshold.

Optionally, the obtaining a far-end signal includes:

performing low-pass filtering on a received sound signal in the first media information to obtain the far-end signal;

where a cut-off frequency of the low-pass filtering is lower than a lowest frequency of the ultrasonic signal.

Optionally, the determining a first signal segment in the mixed signal and a second signal segment in the near-end signal based on the ultrasonic signal includes:

determining a time-domain signal in the near-end signal and corresponding to an ultrasonic signal carrying target data information as the second signal segment;

determining a playing time of a mixed signal that is played recently and in which the ultrasonic signal carrying the target data information is superimposed; and determining a signal, played at the playing time, in the mixed signal as the first signal segment.

Optionally, the determining a first signal segment in the mixed signal and a second signal segment in the near-end signal based on the ultrasonic signal includes:

determining a time-domain signal in the mixed signal and corresponding to an ultrasonic signal carrying target data information as the first signal segment;

querying the near-end signal collected after the first signal segment is played for a time-domain signal corresponding to the ultrasonic signal carrying the target data information; and determining an obtained signal as the second signal segment.

Optionally, data information carried in the ultrasonic signal superimposed on the far-end signal is not repetitive within a predetermined period; and the predetermined period is greater than or equal to a maximum value of an echo delay, and the echo delay is a delay between a time at which the speaker part plays the mixed signal and a time at which the microphone part collects an echo corresponding to the mixed signal.

Optionally, the data information carried in the ultrasonic signal includes ultrasonic codes, each of the ultrasonic codes includes at least two code parts, and each of the code parts is used to indicate whether a signal exists at each of at least two ultrasonic frequencies.

Optionally, the calculating a correlation value between the first signal segment and the second signal segment includes:

separately obtaining power spectrums respectively corresponding to the first signal segment and the second signal segment;

performing binarization processing on the power spectrums respectively corresponding to the first signal segment and the second signal segment, to obtain binary arrays respectively corresponding to the first signal segment and the second signal segment; and calculating a correlation value between the binary arrays respectively corresponding to the first signal segment and the second signal segment.

Optionally, the method further includes:

detecting, before superimposing the ultrasonic signal on the far-end signal, whether an amplitude value of a sound signal obtained after the ultrasonic signal is superimposed on the far-end signal exceeds a preset amplitude value range; and attenuating an amplitude value of the far-end signal based on a predetermined attenuation policy if a detection result is that the amplitude value of the sound signal exceeds the preset amplitude value range.

Figure 21:
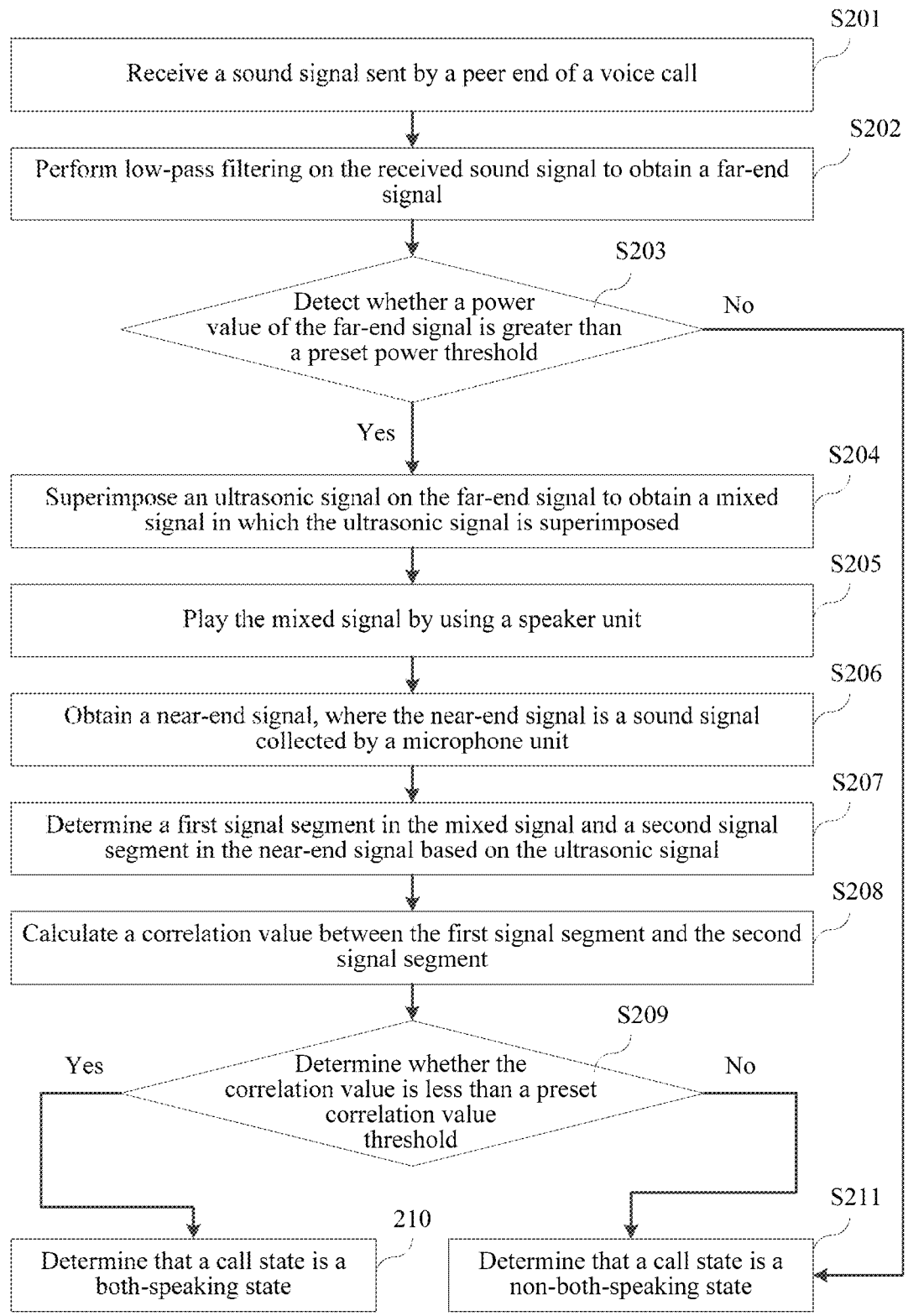
FIG. 21 is a flowchart of a call status detection method according to an exemplary embodiment.

FIG. 21 is a flowchart of a call status detection method according to an exemplary embodiment. The call status detection method may include the following steps:

Step S201. Receive a sound signal sent by a peer end of a voice call.

In a voice call process, a terminal may receive a sound signal sent by a peer end of a call. The sound signal may be a sound signal sent over a PSTN, or may be a sound signal sent over a data network.

Step S202. Perform low-pass filtering on the received sound signal to obtain a far-end signal.

The far-end signal is a signal carrying sound uttered by the peer end of the voice call. A cut-off frequency of the low-pass filtering is lower than a lowest frequency of an ultrasonic wave.

In the voice call process, a normal frequency of a voice signal is relatively low, and usually ranges from hundreds to thousands of Hertz, while the received sound signal may carry some high-frequency interference signals, and these high-frequency interference signals may include an ultrasonic signal. However, in a subsequent step of this application, signal detection and alignment need to be implemented through ultrasonic signal superimposition. If the sound signal sent by the peer end of the voice call carries an ultrasonic signal, interference may be caused to a subsequent superimposed ultrasonic signal, and signal alignment accuracy may be affected, thereby affecting accuracy of both-speaking state detection. Therefore, in this embodiment of this application, after receiving the sound signal sent by the peer end of the voice call, the terminal first perform low-pass filtering on the sound signal, to remove a high-frequency interference signal from the received sound signal. A cut-off frequency of the low-pass filtering is lower than a lowest frequency of an ultrasonic wave, to avoid causing interference to an ultrasonic signal superimposed on the far-end signal in a subsequent step.

Specifically, a lowest frequency of an ultrasonic signal is 20 KHz, and the cut-off frequency of the low-pass filtering may range from the normal frequency of the voice signal to the lowest frequency of the ultrasonic signal. For example, the cut-off frequency may be 12 KHz. Then the terminal obtains a signal below 12 KHz in the received sound signal as a far-end signal.

Step S203. Detect whether a power value of the far-end signal is greater than a preset power threshold. If yes, step S204 is performed, or otherwise, step S211 is performed.

In one aspect, because in this embodiment of this application, signal alignment and correlation calculation need to be performed by using an echo signal generated when the far-end signal is reflected to a microphone part, first, the far-end signal is required to generate an echo that can be collected by the microphone part. Therefore, in this embodiment of this application, after obtaining the far-end signal, the terminal first determines whether the power value of the far-end signal is greater than the preset power threshold. If yes, it indicates that power of the far-end signal is relatively high, and after the far-end signal is played by a speaker part, the microphone part can collect an echo signal. On the contrary, if the power value of the far-end signal is not greater than the preset power threshold, it indicates that power of the far-end signal is relatively low, and after the far-end signal is played by the speaker part, the microphone part may not collect an echo signal.

In another aspect, the power value of the far-end signal is also used to determine whether the peer end of the voice call is uttering sound. If the power value of the far-end signal is greater than the preset power threshold, it indicates that the peer end of the voice call is uttering sound, for example, a user on the peer end is speaking; in this case, step S204 is performed for subsequent detection. If the power value of the far-end signal is not greater than the preset power threshold, it indicates that the peer end of the voice call is not uttering sound, or the peer end of the voice call utters very small sound, for example, the user on the peer end is not speaking; in this case, step 205 is performed.

In this embodiment of this application, when calculating the power value of the far-end signal, the terminal may divide the far-end signal into frames based on a fixed time length (for example, 20 ms), and calculate a power value of each far-end signal frame. Specifically, for example, a power value of an $n^{th}$ frame is calculated, and a calculation formula for the power value of the $n^{th}$ frame may be as follows:

$$P_X(n) = \frac{1}{M}\sum_{i=0}^{M-1} x(nM+i)*x(nM+i).$$

$P_X(n)$ is the power value of the $n^{th}$ frame, M is a frame length, and numerically equal to a product of 20 ms and a sampling frequency of the far-end signal, and x is a sampling value of the far-end signal.

Step S204. Superimpose an ultrasonic signal on the far-end signal to obtain a mixed signal in which the ultrasonic signal is superimposed.

A microphone part uses a sampling frequency of 48 KHz. According to the Shannon sampling theorem, a maximum frequency of a signal collected by the microphone part is 24 KHz. To enable the microphone part to collect an echo signal in which an ultrasonic signal is superimposed, in this embodiment of this application, a frequency of the ultrasonic signal superimposed on the far-end signal needs to be lower than the maximum frequency of the signal collected by the microphone part. Specifically, for example, when a sampling frequency of the microphone part is 48 KHz, a frequency range of the ultrasonic signal superimposed on the far-end signal may be set to 20 KHz to 22 KHz.

Optionally, to facilitate subsequent near-end signal detection and collection and alignment between the mixed signal and a near-end signal collected by the microphone part, the terminal needs to encode the ultrasonic signal superimposed on the far-end signal, so that data information carried in the ultrasonic signal superimposed on the far-end voice signal is not repetitive within a predetermined period. The predetermined period is greater than or equal to a maximum value of an echo delay.

The echo delay is a delay between a time at which the speaker part plays the mixed signal and a time at which the microphone part collects an echo corresponding to the mixed signal.

Optionally, the data information carried in the ultrasonic signal is used to indicate a frequency corresponding to the ultrasonic signal. For example, the data information carried in the ultrasonic signal includes ultrasonic codes, each ultrasonic code includes at least two code parts, and each code part is used to indicate whether a signal exists at each of at least two ultrasonic frequencies.

Specifically, for example, each ultrasonic code includes three code parts, each code part is used to indicate whether a signal exists at each of three ultrasonic frequencies, and a code design for the ultrasonic signal may be as follows:

In this embodiment of this application, for example, each code part is constructed through assignment by using one of three ultrasonic frequencies: $f_0$ (a frequency is 20400 Hz), $f_1$ (a frequency is 21100 Hz), and $f_2$ (a frequency is 21800 Hz) (during actual application, code parts of more than three frequencies may be designed, the number of the code parts may be determined based on a maximum echo delay and a frame length, and three code parts are used as an example for description in this embodiment of this application), and a formula for an ultrasonic signal corresponding to each code part is as follows:

$$s=A*(b_0\sin(2\pi f_0*t)+b_1\sin(2\pi f_1*t)+b_2\sin(2\pi f_2*t)).$$

A is an amplitude value of the ultrasonic signal, a value range of t is [0, M−1], and $b_0$, $b_1$, and $b_2$ are assignment switches of three corresponding frequencies (that is, values of $b_0$, $b_1$, and $b_2$ are 0 or 1). Therefore, a code part may represent a value of 0 to 7. In an ultrasonic code, value ranges of first and second code parts are set to 1 to 7, while a third code part is set to 0. In this way, a maximum of 49 ultrasonic codes having different values can be constructed, and a code table having a size of 49 may be designed by using the 49 ultrasonic codes having different values. When an ultrasonic signal needs to be superimposed on a far-end signal, the code table is sequentially read to obtain corresponding ultrasonic codes, and after being constructed based on the ultrasonic signal formula, the ultrasonic signal is superimposed on the far-end signal (by adding up values of sampling points of the signals, that is, amplitude values of the signals). After the last piece of data in the code table is sequentially read, when data in the code table is read next time, reading starts from the first piece of data in the code table. The data in the code table is cyclically read in such a manner to construct an ultrasonic signal. The code part that is set to 0 is used to indicate a boundary between two adjacent ultrasonic codes superimposed on the far-end signal. Optionally, during actual application, in an ultrasonic code, the code part that is set to 0 may alternatively be the first code part or the second code part.

Figure 22:
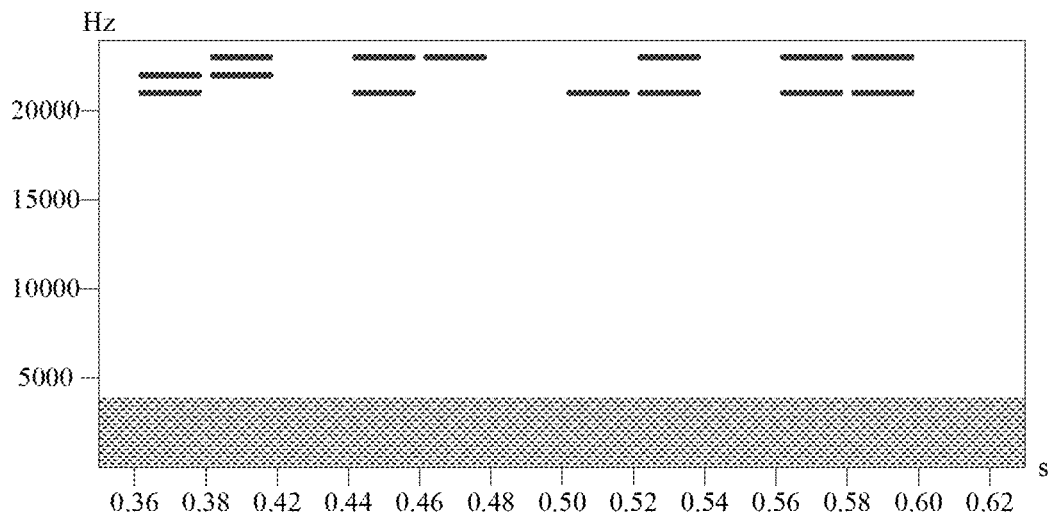
FIG. 22 is a spectrum graph of a mixed signal that is an example for the call status detection method in FIG. 21 according to an embodiment of this application.

In this embodiment of this application, when an ultrasonic signal is superimposed on the far-end signal, an ultrasonic signal corresponding to one code part is superimposed on each 20-ms far-end signal frame, that is, an ultrasonic signal corresponding to one ultrasonic code is superimposed on every three adjacent far-end signal frames. Specifically, for example, each code part indicates a corresponding code value by using a binary system. Referring to FIG. 22, FIG. 22 is a spectrum graph of a mixed signal according to an embodiment of this application. In FIG. 22, starting from a moment 0.36 s, the terminal superimposes an ultrasonic signal corresponding to a same code part on each 0.02-s time length, but the ultrasonic signal is not superimposed on the last 0.02-s time length in every 0.06 s, or in other words, a code value of a code part corresponding to an ultrasonic signal superimposed on the last 0.02-s time length is 0. The ultrasonic signal superimposed on each 0.06-s time length is used to indicate an ultrasonic code. Each ultrasonic code has a different code value within a predetermined period. Specifically, in FIG. 22, a code value of a code part is indicated by using values of $b_2$, $b_1$, and $b_0$, and a code value of an ultrasonic code is indicated by using code values of three code parts. Within 0.36 s to 0.38 s, no signal exists at the frequency $f_2$, and a signal exists at the frequencies $f_1$ and $f_0$, and then a code value of a code part is 011 (that is, 3). Within 0.38 s to 0.40 s, a signal exists at the frequencies $f_2$ and $f_1$, and no signal exists at the frequency $f_0$, and then a code value of a code part is 110 (that is, 6). Within 0.40 s to 0.42 s, no signal exists at the frequencies $f_2$, $f_1$, and $f_0$, and then a code value of a code part is 000 (that is, 0). That is, within 0.36 s to 0.42 s, a code value of an ultrasonic code corresponding to an ultrasonic signal superimposed on the far-end signal is "360". Similarly, within 0.42 s to 0.48 s, a code value of an ultrasonic code corresponding to an ultrasonic signal superimposed on the far-end signal is "540".

Optionally, before superimposing the ultrasonic signal on the far-end signal, the terminal may further detect whether an amplitude value of a sound signal obtained after the ultrasonic signal is superimposed on the far-end signal exceeds a preset amplitude value range, and attenuates an amplitude value of the far-end signal based on a predetermined attenuation policy if the amplitude value of the sound signal exceeds the preset amplitude value range.

Figure 23:
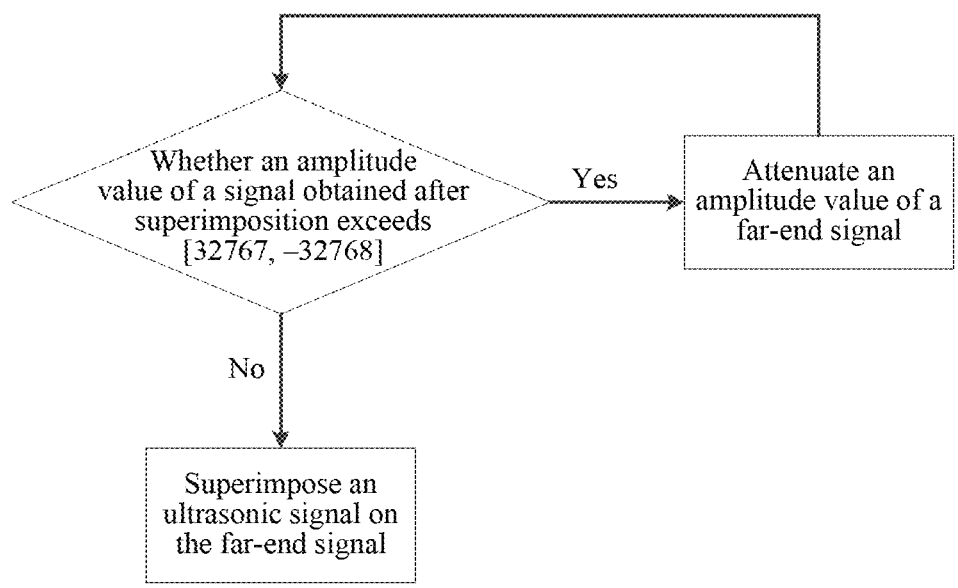
FIG. 23 is a schematic flowchart of far-end signal attenuation in FIG. 21 according to an embodiment of this application.

During voice signal processing, a value of a sampling point of a signal is represented by using 16-bit data, that is, a maximum of 216 different signal sampling values are represented. Each amplitude value in a voice signal corresponds to a signal sampling value, that is, a voice signal having an amplitude value within [32767, −32768] can be accurately indicated, but a voice signal beyond the amplitude value range cannot be accurately indicated, leading to cracking voice during voice playing. In this embodiment of this application, to avoid cracking voice when a mixed signal in which an ultrasonic signal is superimposed is played, amplitude value attenuation may be performed on a far-end signal having an excessively large amplitude value. Specifically, referring to FIG. 23, FIG. 23 is a schematic flowchart of far-end signal attenuation according to an embodiment of this application. As shown in FIG. 23, before an ultrasonic signal is superimposed on a far-end signal, it is first determined whether an amplitude value of a sound signal obtained after the ultrasonic signal is superimposed on the far-end signal exceeds [32767, −32768]. If yes, it indicates that cracking voice is produced when the sound signal is played by a speaker part. In this case, the far-end signal may be attenuated based on a predetermined attenuation policy, and it is detected whether an amplitude value of a sound signal obtained after the ultrasonic signal is superimposed on the attenuated far-end signal exceeds [32767, −32768]. If the amplitude value of the obtained sound signal is within [32767, −32768], the ultrasonic signal is superimposed on the far-end signal to obtain a mixed signal.

The attenuating the far-end signal based on a predetermined attenuation policy may be specifically attenuating the far-end signal at a predetermined attenuation proportion. For example, each time the far-end signal is attenuated, an amplitude value of the far-end signal may be multiplied by the attenuation proportion, to obtain the attenuated far-end signal. The attenuation proportion may be a positive number less than 1. For example, the attenuation proportion may be 0.9 or 0.8.

Optionally, in this embodiment of this application, an amplitude value of an ultrasonic signal (that is, A in the foregoing formula) needs to be an appropriate value, so that the terminal can accurately detect an ultrasonic signal in a near-end signal collected by the microphone part, and cracking voice is prevented from appearing in a mixed signal in which the ultrasonic signal is superimposed due to an excessively high amplitude value of the ultrasonic signal, and affecting a call effect. For example, the amplitude value of the ultrasonic signal may be set to 3000.

Step S205. Play the mixed signal by using a speaker part.

In this embodiment of this application, when playing the mixed signal by using the speaker part, the terminal also locally buffers the mixed signal for subsequent signal alignment.

Step 206. Obtain a near-end signal, where the near-end signal is a sound signal collected by a microphone part.

In the solution of this application, the near-end signal is a sound signal collected by the terminal by using the microphone part, and includes an echo signal collected by the microphone part after the sound signal played by the speaker part is reflected to the microphone part, and a sound signal locally generated by the terminal. That is, the near-end signal collected by the microphone part includes the far-end signal played by the speaker part, the ultrasonic signal superimposed on the far-end signal, and the sound signal locally generated by the terminal (for example, sound when a user of the terminal speaks).

Step 207. Determine a first signal segment in the mixed signal and a second signal segment in the near-end signal based on the ultrasonic signal.

The first signal segment is a time-domain signal segment in the mixed signal. The second signal segment is a time-domain signal segment in the near-end signal.

In a possible implementation, the terminal may first determine the second signal segment in the near-end signal, and then determine the first signal segment in the mixed signal based on an ultrasonic signal included in the second signal segment. For example, when determining the first signal segment and the second signal segment, the terminal may parse data information carried in an ultrasonic signal included in the near-end signal, determine a time-domain signal in the near-end signal and corresponding to an ultrasonic signal carrying target data information as the second signal segment, determine a playing time of a mixed signal that is played recently and in which the ultrasonic signal carrying the target data information is superimposed, and determine a signal, played at the playing time, in the mixed signal as the first signal segment.

Specifically, the terminal may analyze an ultrasonic frequency band of a signal collected by the microphone, and obtain code information of an ultrasonic signal based on the foregoing code rule. For example, the terminal analyzes the collected near-end signal by using a Fast Fourier Transformation (FFT) analysis method, determines power values at three ultrasonic frequencies: $f_0$, $f_1$, and $f_2$ in the collected near-end signal, and detects whether the power values at the three ultrasonic frequencies are greater than a specific threshold. If yes, it indicates that a signal exists at a corresponding frequency, or otherwise, it is considered that no signal exists at a corresponding frequency. In this way, three adjacent near-end signal frames Cap(i) that are currently collected and carry a complete ultrasonic code are parsed out. The complete ultrasonic code is the target data information. The three adjacent near-end signal frames Cap(i) are the second signal segment. At the same time, a played mixed signal is searched for three adjacent mixed signal frames Play(i) that carry the same ultrasonic code and are played recently, and the mixed signal Play(i) and the current collected near-end signal Cap(i) are aligned. That is, the current collected near-end signal Cap(i) includes an echo signal corresponding to Play(i), and the mixed signal Play(i) is the first signal segment corresponding to the near-end signal Cap(i). A time length of each near-end signal frame and a time length of each mixed signal frame are the same as the time length of each far-end signal frame in the foregoing step, for example, 20 ms. When searching for the mixed signal Play(i), the terminal may first determine a playing time of a mixed signal that is played recently and in which an ultrasonic signal carrying the complete ultrasonic code is superimposed, and determine a signal played at the playing time as the mixed signal Play(i).

Specifically, for example, it is assumed that starting from a time point 0.37 s, the terminal detects that a signal exists at the frequencies $f_2$, $f_1$, and $f_0$ in the near-end signal, and within 0.37 s to 0.43 s, a code value of an ultrasonic code corresponding to an ultrasonic signal at the frequencies $f_2$, $f_1$, and $f_0$ in the near-end signal is "360", and the terminal determines through query that in the mixed signal corresponding to FIG. 22, a code value of an ultrasonic code corresponding to an ultrasonic signal carried in the mixed signal within 0.36 s to 0.42 s is also "360". Then it is determined that the near-end signal collected within 0.37 s to 0.43 s and the mixed signal within 0.36 s to 0.42 s in FIG. 22 includes the same ultrasonic signal. That is, the mixed signal played within 0.36 s to 0.42 s in FIG. 22 is the first signal segment, and the near-end signal collected within 0.37 s to 0.43 s is the second signal segment.

Alternatively, in another possible implementation, the terminal may first determine the first signal segment in the mixed signal, and then determine the second signal segment in the near-end signal based on an ultrasonic signal included in the first signal segment. For example, when determining the first signal segment and the second signal segment, the terminal may determine a time-domain signal in the mixed signal and corresponding to an ultrasonic signal carrying target data information as the first signal segment, query the near-end signal collected after the first signal segment is played for a time-domain signal corresponding to the ultrasonic signal carrying the target data information, and determine an obtained signal as the second signal segment.

Specifically, the terminal may determine three adjacent mixed signal frames Play(ii) in the mixed signal and carrying an ultrasonic code as a first signal segment, analyze a near-end signal collected by the microphone part after the first signal segment is played, and query the near-end signal collected after the first signal segment is played for three adjacent near-end signal frames Cap(ii) including the same ultrasonic code as the mixed signal Play(ii). The near-end signal Cap(ii) is a second signal segment corresponding to the mixed signal Play(ii).

Step S208. Calculate a correlation value between the first signal segment and the second signal segment.

Optionally, when calculating the correlation value between the first signal segment and the second signal segment, the terminal may separately calculate power spectrums respectively corresponding to the first signal segment and the second signal segment by means of FFT, perform binarization processing on the power spectrums respectively corresponding to the first signal segment and the second signal segment, to obtain binary arrays respectively corresponding to the first signal segment and the second signal segment, and calculate a correlation value between the binary arrays respectively corresponding to the first signal segment and the second signal segment.

Optionally, to reduce complexity of correlation value calculation, increase a calculation speed, and reduce power consumption of the terminal, in this embodiment of this application, when calculating power spectrums respectively corresponding to the first signal segment and the second signal segment, the terminal may calculate power spectrums respectively corresponding to the first signal segment and the second signal segment on a specified frequency band. The specified frequency band may be a frequency band on which most sound is located in the voice call process. For example, the specified frequency band may be 500 Hz to 1200 Hz.

When binarization processing is performed on a power spectrum of a signal (for example, the first signal segment or the second signal segment), smooth filtering may be performed on the power spectrum of the signal, to obtain a power smoothed value at each frequency in the power spectrum of the signal, and binarization processing is performed on the power spectrum of the signal based on the power spectrum of the signal and the power smoothed value at each frequency in the power spectrum of the signal, to obtain a binary array corresponding to the signal.

Figure 24:
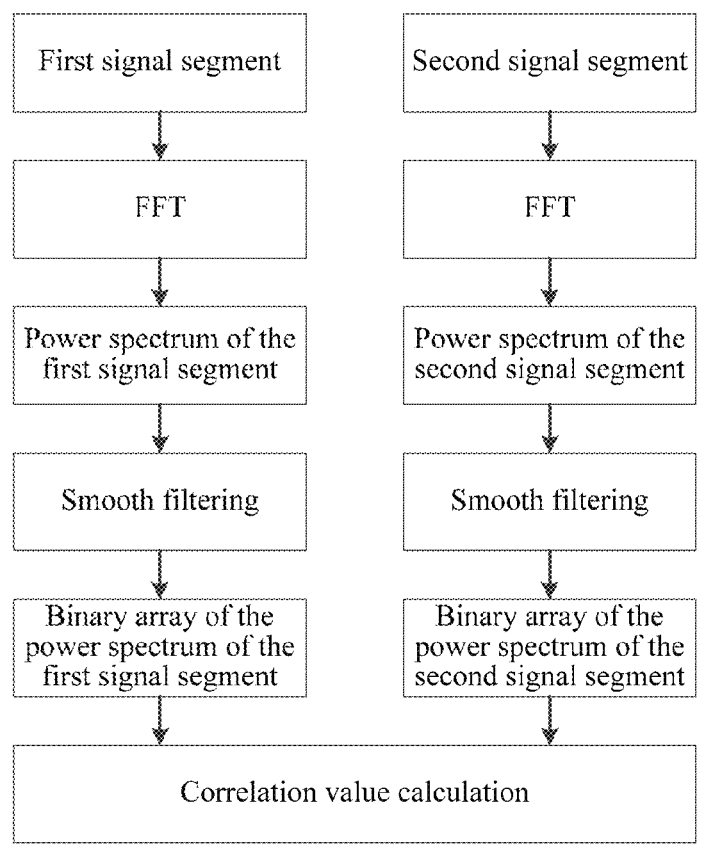
FIG. 24 is a schematic flowchart of correlation value calculation in FIG. 21 according to an embodiment of this application.

Specifically, referring to FIG. 24, FIG. 24 is a schematic flowchart of correlation value calculation according to an embodiment of this application. The terminal performs FFT on the first signal segment to obtain a power spectrum $P_p(j)$ of the first signal segment on 500 Hz to 1200 Hz. The power spectrum $P_p(j)$ represents power of the first signal segment at each frequency in 500 Hz to 1200 Hz, and a value range of j is [m1, m2], where $$m1 = \frac{\text{int}(M*500)}{f_s}*2, \text{ and } m2 = \frac{\text{int}(M*1200)}{f_s}*2.$$

M is a half of the number of FFT points, and $f_s$ is a sampling frequency of the first signal segment.

The terminal performs smooth filtering on $P_p(j)$ to obtain $P_{psm}(j)$, where $P_{psm}(j)$ represents a power smoothed value of $P_p(j)$ at each frequency. The terminal performs binarization on $P_p(j)$ based on $P_{psm}(j)$. Specifically, for each frequency in $P_p(j)$, a power value of the frequency is compared with a power smoothed value corresponding to the frequency in $P_{psm}(j)$. If the power value of the frequency is greater than the power smoothed value corresponding to the frequency in $P_{psm}(j)$, a value of the frequency is set to 1, or otherwise, a value of the frequency is set to 0, to finally obtain a binary array $P_{pb}(j)$ of $P_p(j)$.

Correspondingly, the terminal also performs FFT on the second signal segment to obtain a power spectrum $P_c(j)$ of the second signal segment on 500 Hz to 1200 Hz, performs smooth filtering on $P_c(j)$ to obtain $P_{csm}(j)$, where $P_{csm}(j)$ represents a power smoothed value at each frequency in $P_c(j)$. The terminal performs binarization on $P_c(j)$ based on $P_{csm}(j)$ to obtain a binary array $P_{cb}(j)$ of $P_c(j)$.

Finally, the terminal calculates a correlation value between $P_{pb}(j)$ and $P_{cb}(j)$. The calculated correlation value may be used as a correlation value between the first signal segment and the second signal segment on the specified frequency band. A specific correlation value calculation formula may be as follows:

$$PC_{xor} = \Sigma_{k \in [m1,m2]}(P_{pb}(k) \text{ Xor } P_{cb}(k))/(m2-m1+1).$$

Xor is an exclusive OR operator.

Step S209. Determine whether the correlation value is less than a preset correlation value threshold. If yes, step 210 is performed, or otherwise, step S211 is performed.

The correlation value threshold may be a threshold preset by a developer.

Step S210. Determine that a call state is a both-speaking state.

It may be determined that a call state when the microphone part collects the near-end signal is the both-speaking state when it is determined in step S209 that the correlation value is less than the preset correlation value threshold.

Step S211. Determine that a call state is a non-both-speaking state.

It may be determined that a call state when the far-end signal is obtained is the non-both-speaking state when it is determined in step S203 that the power value of the far-end signal is not greater than preset power threshold. Alternatively, it may be determined that a call state when the microphone part collects the near-end signal is the non-both-speaking state when it is determined in step S209 that the correlation value is not less than the preset correlation value threshold.

In this embodiment of this application, when the speaker part in the terminal plays a mixed signal, a near-end signal collected by the microphone part of the terminal includes a locally generated sound signal (for example, speaking voice of the user of the terminal) and an echo signal that reaches the microphone part after the mixed signal is transmitted. A larger correlation value calculated in step S208 means that the echo signal has a larger percentage in the near-end signal, and the locally generated sound signal has a smaller percentage in the near-end signal. On the contrary, if the calculated correlation value is smaller, it indicates that the echo signal has a smaller percentage in the near-end signal, and the locally generated sound signal has a larger percentage in the near-end signal. When the calculated correlation value is less than the preset correlation value threshold, it may be considered that signal strength of the locally generated sound signal is relatively high, and it is very likely that the user of the terminal is speaking; further, when it is determined in step S203 that the power value of the far-end signal is greater than the preset power threshold, it may be determined that a call state corresponding to the near-end signal is a both-speaking state. On the contrary, when the calculated correlation value is not less than the preset correlation value threshold, it may be considered that signal strength of the locally generated sound signal is relatively low, and the user of the terminal may be not speaking; therefore, it may be determined that a call state corresponding to the near-end signal is a non-both-speaking state.

Figure 25:
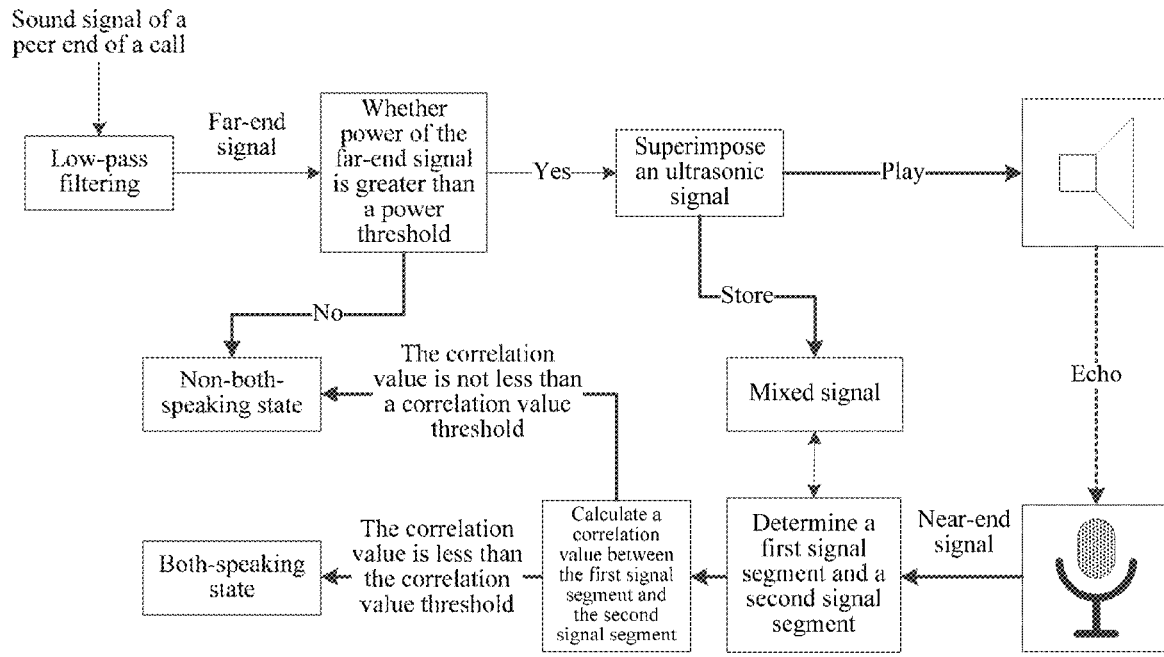
FIG. 25 is a schematic diagram of a call status detection procedure in FIG. 21 according to an embodiment of this application.

Specifically, referring to FIG. 25, FIG. 25 is a schematic diagram of a call status detection procedure according to an embodiment of this application. As shown in FIG. 25, when receiving a sound signal sent by a peer end of a call, a terminal performs low-pass filtering on the received sound signal to obtain a far-end signal, determines whether power of the far-end signal is greater than a preset power threshold, and if the power of the far-end signal is not greater than the power threshold, determines that a current call state is a non-both-speaking state. If the power of the far-end signal is greater than the power threshold, the terminal superimposes an ultrasonic signal on the far-end signal to obtain a mixed signal, and stores the mixed signal. The terminal plays the mixed signal by using a speaker part, obtains a sound signal collected by a microphone part as a near-end signal, aligns the mixed signal and the near-end signal by parsing out codes carried in an ultrasonic signal in the near-end signal, determines a first signal segment in the mixed signal and a second signal segment in the near-end signal that include the same ultrasonic signal, calculates a correlation value between the first signal segment and the second signal segment, and if the calculated correlation value is less than a correlation value threshold, determines that a current call state is a both-speaking state, or otherwise, determines that a current call state is the non-both-speaking state.

In conclusion, in the call status detection method provided in this embodiment of this application, the terminal aligns the mixed signal and the near-end signal by using the ultrasonic signal superimposed on the far-end signal and the ultrasonic signal included in the near-end signal collected by the microphone part, and determines whether the call state is the both-speaking state based on the correlation value between the aligned near-end signal and mixed signal. Compared with the solution of estimating an attenuated amplitude when the far-end signal is reflected to the microphone part, the solution in this application can improve accuracy of both-speaking state detection.

In addition, in the method provided in this embodiment of this application, the terminal aligns the mixed signal and the near-end signal by using the ultrasonic signal inaudible to human, avoiding causing interference to a normal call of a user.

Figure 26:
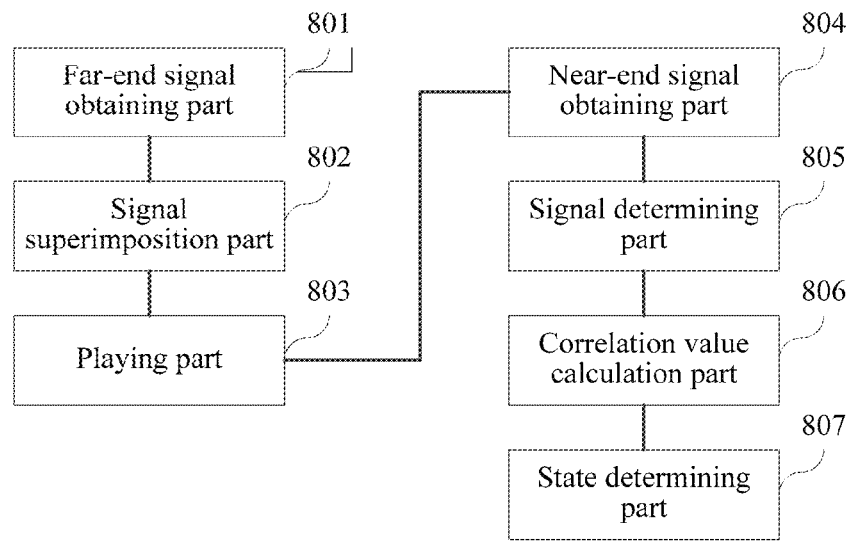
FIG. 26 is a structural block diagram of a call status detection apparatus according to an embodiment of this application.

FIG. 26 is a structural block diagram of a call status detection apparatus according to an exemplary embodiment. The call status detection apparatus can perform all or some steps in the embodiment shown in FIG. 21. The call status detection apparatus may include:

a far-end signal obtaining part 801, configured to obtain a far-end signal, where the far-end signal is a signal obtained based on a sound signal sent by a peer end of a voice call;

a signal superimposition part 802, configured to superimpose an ultrasonic signal on the far-end signal to obtain a mixed signal in which the ultrasonic signal is superimposed;

a playing part 803, configured to play the mixed signal by using a speaker part;

a near-end signal obtaining part 804, configured to obtain a near-end signal, where the near-end signal is a sound signal collected by using a microphone part;

a signal determining part 805, configured to determine a first signal segment in the mixed signal and a second signal segment in the near-end signal based on the ultrasonic signal;

a correlation value calculation part 806, configured to calculate a correlation value between the first signal segment and the second signal segment; and a state determining part 807, configured to determine that a call state when the microphone part collects the near-end signal is a both-speaking state when the correlation value is less than a preset correlation value threshold.

Optionally, the apparatus further includes:

a power detection part, configured to: before the ultrasonic signal is superimposed on the far-end signal, detect whether a power value of the far-end signal is greater than a preset power threshold; and the signal superimposition part is configured to perform the step of superimposing an ultrasonic signal on the far-end signal when a detection result is that the power value of the far-end signal is greater than the preset power threshold.

Optionally, the signal obtaining part includes:

a signal receiving part, configured to receive the sound signal sent by the peer end; and a filtering part, configured to perform low-pass filtering on the received sound signal to obtain the far-end signal;

where a cut-off frequency of the low-pass filtering is lower than a lowest frequency of the ultrasonic signal.

Optionally, data information carried in the ultrasonic signal superimposed on the far-end voice signal is not repetitive within a predetermined period; and the predetermined period is greater than or equal to a maximum value of an echo delay, and the echo delay is a delay between a time at which the speaker part plays the mixed signal and a time at which the microphone part collects an echo corresponding to the mixed signal.

Optionally, the signal determining part includes:

a first signal determining part, configured to determine a time-domain signal in the near-end signal and corresponding to an ultrasonic signal carrying target data information as the second signal segment;

a playing time determining part, configured to determine a playing time of a mixed signal that is played recently and in which the ultrasonic signal carrying the target data information is superimposed; and a second signal determining part, configured to determine a signal, played at the playing time, in the mixed signal as the first signal segment.

Optionally, the signal determining part includes:

a first signal determining part, configured to determine a time-domain signal in the mixed signal and corresponding to an ultrasonic signal carrying target data information as the first signal segment;

a query part, configured to query the near-end signal collected after the first signal segment is played for a time-domain signal corresponding to the ultrasonic signal carrying the target data information; and a fourth signal determining part, configured to determine a signal obtained by the query part as the second signal segment.

Optionally, the data information carried in the ultrasonic signal is used to indicate a frequency corresponding to the ultrasonic signal.

Optionally, the data information carried in the ultrasonic signal includes ultrasonic codes, each of the ultrasonic codes includes at least two code parts, and each of the code part is used to indicate whether a signal exists at each of at least two ultrasonic frequencies.

Optionally, the correlation value calculation part includes:

a power spectrum obtaining part, configured to separately obtain power spectrums respectively corresponding to the first signal segment and the second signal segment;

a binarization processing part, configured to perform binarization processing on the power spectrums respectively corresponding to the first signal segment and the second signal segment, to obtain binary arrays respectively corresponding to the first signal segment and the second signal segment; and a correlation value calculation part, configured to calculate a correlation value between the binary arrays respectively corresponding to the first signal segment and the second signal segment.

Optionally, the apparatus further includes:

an amplitude value detection part, configured to: before the ultrasonic signal is superimposed on the far-end signal, detect whether an amplitude value of a sound signal obtained after the ultrasonic signal is superimposed on the far-end signal exceeds a preset amplitude value range; and an attenuation part, configured to attenuate an amplitude value of the far-end signal based on a predetermined attenuation policy if a detection result of the amplitude value detection part is that the amplitude value of the sound signal exceeds the preset amplitude value range.

In conclusion, in the call status detection apparatus provided in this embodiment of this application, the mixed signal and the near-end signal are aligned by using the ultrasonic signal superimposed on the far-end signal and the ultrasonic signal included in the near-end signal collected by the microphone part, and whether the call state is the both-speaking state is determined based on the correlation value between the aligned near-end signal and mixed signal. Compared with the solution of estimating an attenuated amplitude when the far-end signal is reflected to the microphone part, the solution in this application can improve accuracy of both-speaking state detection.

In addition, in the apparatus provided in this embodiment of this application, the terminal aligns the mixed signal and the near-end signal by using the ultrasonic signal inaudible to human, avoiding causing interference to a normal call of a user.

Figure 5:
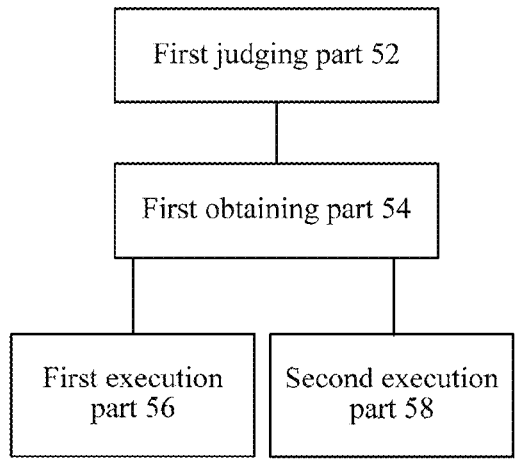
FIG. 5 is a schematic diagram of an optional call apparatus according to an embodiment of this application.

An embodiment of this application further provides a call apparatus for implementing the call method. FIG. 5 is a schematic diagram of an optional call apparatus according to an embodiment of this application. As shown in FIG. 5, the apparatus may include: a first judging part 52, a first obtaining part 54, a first execution part 56, and a second execution part 58.

The first judging part 52 is configured to determine, based on a first data packet that is sent by a second client and received by a first client over a preset network, whether a packet loss occurs in first media information that is sent by the second client to the first client over the preset network, the first media information including the first data packet, and the first media information being media information transmitted in a voice call or a video call between the second client and the first client.

The first obtaining part 54 is configured to obtain network status information of the preset network when it is determined that a packet loss occurs in the first media information.

The first execution part 56 is configured to send a retransmission request to the second client when the network status information satisfies a preset condition, the retransmission request being used to request the second client to retransmit a lost second data packet in the first media information, and the preset condition being used to indicate a network condition of the preset network that is required for retransmitting the second data packet.

The second execution part 58 is configured to cancel sending of the retransmission request to the second client when the network status information does not satisfy the preset condition.

In this embodiment, the transmission apparatus further includes:

a parameter determining part, configured to determine a predetermined parameter for requesting the second client to retransmit the second data packet, the second data packet being a retransmitted data packet of an unsuccessfully transmitted data packet in the first media information; and the predetermined parameter including at least one of a first probability threshold of a retransmission success or a second probability threshold of an output success of the second data packet; and a condition determining part, configured to determine, based on the predetermined parameter, the preset condition that the network status information needs to satisfy when retransmission is requested, the preset condition being used to indicate a network condition of the preset network that is required when a probability of successfully retransmitting the second data packet is not less than the first probability threshold, and/or used to indicate a network condition that is required when a probability that the successfully retransmitted second data packet can be successfully output is not less than the second probability threshold.

The parameter determining part and the condition determining part correspond to a processor or a processing circuit, and may be configured to determine a current preset condition about whether to send a retransmission request.

It is noted that, the first judging part 52 in this embodiment may be configured to perform step S302 in Embodiment 1 of this application, the first obtaining part 54 in this embodiment may be configured to perform step S304 in Embodiment 1 of this application, the first execution part 56 in this embodiment may be configured to perform step S306 in Embodiment 1 of this application, and the second execution part 58 in this embodiment may be configured to perform step S308 in Embodiment 1 of this application.

It is noted herein that, the parts have the same implementation example and application scenario as corresponding steps, but are not limited to the content disclosed in Embodiment 1. It is noted that, as a portion of the apparatus, the parts may run in the hardware environment shown in FIG. 1, and may be implemented by software, or may be implemented by hardware.

Through the foregoing parts, when a packet loss occurs in first media information, whether to send a retransmission request is determined based on network status information. When a network is in a desired situation, the retransmission request is sent to obtain a lost data packet, so that media information is more complete. When the network is not in a desired situation, the retransmission request is not sent, to avoid aggravating network congestion. Therefore, a technical problem of poor instant messaging quality caused by network congestion in a related technology can be resolved, and instant messaging quality can be improved.

The client may be a client for communication. The client may be installed on a computer or a mobile device. Preferably, the client may be a client having a relatively high requirement on communication instantaneity, that is, an instant messaging client, for example, WeChat or QQ. The preset network is a network for communication between clients. The media information may be dynamic multi-media information, such as a video, audio, or a GIF picture, or may be static information, such as text information or a static picture. The network status information is information for describing a network feature, for example, information such as a network transmission speed or delay.

It is noted that, in a related technology, the retransmission request is sent once a packet loss occurs. When the network is severely congested in this case, the sent retransmission request undoubtedly aggravates network congestion, resulting in more data packet losses. In addition, because the network is severely congested, even if a response data packet is received, the response data packet may be invalid. Consequently, communication quality cannot be improved; on the contrary, more data packet losses are caused due to severer network congestion. However, in the technical solution of this application, the retransmission request is not sent when the network is not in a desired situation, to avoid aggravating network congestion. Compared with the means used in the related technology, the technical solution of this application can reduce subsequent packet losses, and improve communication quality.

The first judging part 52, the first obtaining part 54, the first execution part 56, and the second execution part 58 may be disposed on a first client. That is, the first client sends a retransmission request to a second client depending on a need of the first client. To reduce running load of the first client, the first judging part 52, the first obtaining part 54, the first execution part 56, and the second execution part 58 may alternatively be disposed on an application server. The server monitors a data packet receiving status of the first client, and requests a lost data packet from the second client depending on a network status after determining a packet loss. The server herein may be a client server. For example, when the client is an instant messaging application, the server is an instant messaging application server.

In this application, a current network feature is analyzed based on historical data, whether the retransmission request is sent is determined depending on the network feature and importance of received voice data, and a related retransmission control policy is adjusted in real time based on a utilization rate of retransmitted data, so that a utilization rate of a bandwidth and a usage rate of retransmission are both optimized in various network conditions. For an optional implementation, refer to FIG. 3.

Optionally, the first judging part is further configured to determine whether a packet loss occurs in the first media information based on sequence number index information in the first data packet.

Optionally, whether a packet loss occurs may be determined based on consecutiveness of sequence number indexes. For example, if data packets with indexes 7 and 9 are received, it may be determined that a data packet with an index 8 is lost. In addition, an index range of a plurality of data packets of a specific piece of media information are indicated in the data packets. For example, a piece of voice in an instant messaging application may be divided into 100 data packets for sending, and an index range 301 to 400 used for the voice may be indicated in the data packets. In this way, any lost data packet may be determined based on a received data packet.

Optionally, the apparatus further includes: a second obtaining part, configured to: before it is determined whether the first network state of the preset network indicated by the network status information matches the second network state required for retransmitting the second data packet, obtain the current used bandwidth, the current transmission delay, and the current packet loss rate that are used to represent the first network state, and the second preset value used to describe an allowed number of consecutive lost packets; a third determining part, configured to determine the bandwidth threshold based on bandwidth information of the preset network; a fourth determining part, configured to determine the transmission delay threshold based on network jitter information of the preset network; and a fifth determining part, configured to determine the packet loss rate threshold based on a historical packet loss rate and a packet loss model.

Optionally, the apparatus further includes: a second judging part, configured to: after the network status information of the preset network is obtained, and before the retransmission request is sent to the second client or sending of the retransmission request to the second client is canceled, determine whether a first network state of the preset network indicated by the network status information matches a second network state required for retransmitting the second data packet; a first determining part, configured to determine that the network status information satisfies the preset condition when the first network state matches the second network state; and a second determining part, configured to determine that the network status information does not satisfy the preset condition when the first network state does not match the second network state.

Optionally, the second judging part includes: a first judging subpart, configured to determine whether a difference between a bandwidth threshold and a current used bandwidth is less than a first preset value; a second judging subpart, configured to determine whether a current transmission delay is less than a transmission delay threshold; a third judging subpart, configured to determine whether a current packet loss rate is less than a packet loss rate threshold; and a fourth judging subpart, configured to determine whether the number of consecutive lost packets is less than a second preset value; where a preset determining result is used to indicate that the first network state matches the second network state, and the preset determining result includes at least one of the following: determining that the difference between the bandwidth threshold and the current used bandwidth is less than the first preset value; determining that the current transmission delay is less than the transmission delay threshold; determining that the current packet loss rate is less than the packet loss rate threshold; or determining that the number of consecutive lost packets is less than the second preset value.

In an optional embodiment, the apparatus further includes: a first update part, configured to: after the retransmission request is sent to the second client or sending of the retransmission request to the second client is canceled, determine a current bandwidth threshold based on a previous determined bandwidth threshold and current bandwidth information of the preset network; a second update part, configured to increase the packet loss rate threshold and decrease the transmission delay threshold when a first proportion of the number of received second data packets to the number of sent retransmission requests is less than a third preset value; and a third update part, configured to decrease the packet loss rate threshold and increase the transmission delay threshold when a second proportion of received valid second data packets to all received second data packets is less than a fourth preset value.

It is noted that, when the packet loss rate threshold and the transmission delay threshold are modified, the adjustment is not made once with an extremely large value, but instead, the thresholds may be gradually increased or decreased based on a specific percentage (for example, 10%) of current values of the parameters, to avoid an over-adjustment, and achieve smooth transition.

Optionally, the apparatus further includes: a sixth determining part, configured to: before the retransmission request is sent to the second client, determine a voice feature of the lost second data packet by performing signal feature analysis on a media information segment in the first data packet; and the first execution part is further configured to send the retransmission request to the second client when the network status information satisfies the preset condition and the voice feature includes at least one of a voiced feature, the voice feature, or a semantic feature.

Optionally, a voice signal may be analyzed, for example, unvoiced and voiced analysis, voice activity analysis, or semantic importance analysis is performed, to adjust the network parameter threshold. For example, in a case of a sufficient bandwidth, the retransmission request may be sent once a packet loss is detected; in a case of an insufficient bandwidth, the retransmission request is sent for a lost important voice frame. For example, a voice data packet including an important semantic meaning is retransmitted.

Figure 6:
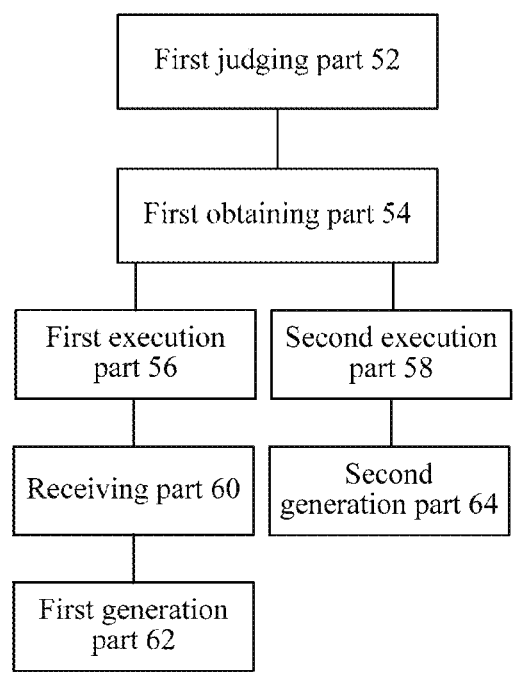
FIG. 6 is a schematic diagram of an optional call apparatus according to an embodiment of this application.

Optionally, as shown in FIG. 6, the apparatus further includes: a receiving part 60, configured to: after the retransmission request is sent to the second client, receive the second data packet sent by the second client; a first generation part 62, configured to generate second media information based on the first data packet and the second data packet; and a second generation part 64, configured to: when the network status information does not satisfy the preset condition, generate third media information based on the first data packet.

When all data packets of the first media information are received, that is, when each lost second data packet is received, the second media information is generated to recover the first media information, that is, a complete piece of voice can be obtained through recovery. Due to a voice loss, that is, a packet loss, the third media information has lower quality than the first media information.

An embodiment of this application provides an information processing apparatus. The apparatus includes the following parts: A collection part is configured to collect offline network data, and extract at least one network parameter for representing a network feature from the offline network data. A policy determining part is configured to construct a network model based on the at least one network parameter, and determine a first de-jittering policy based on the network model, to measure or simulate VoIP call quality based on the network model. Optionally, the first de-jittering policy may also be referred to as an initial de-jittering policy. During actual application, a large amount of existing-network-related network data is collected based on different network types, and the network model is constructed through offline training. The network model can be used to determine the initial de-jittering policy; besides, because a related parameter output based on the initial de-jittering policy includes a de-jittering parameter, a delay parameter, and the like, the initial de-jittering policy and the related parameter may be described as being determined based on the network model, where the related parameter includes the de-jittering parameter and the delay parameter. A policy modification part is configured to modify the first de-jittering policy based on a feature parameter (for example, historical data of a current call, signal content of the current call, or an auditory perception result of the current call) for evaluating quality of a voice call or a video call such as a VoIP call, to obtain a second de-jittering policy. The historical data of the current call can reflect a network feature of the current call. The signal content of the current call decides whether a current frame is an important frame. Voice data content is an important frame and requires attention, while silent data content does not require attention. Different content corresponds to different de-jittering processing. For the auditory perception result, different auditory perception results correspond to different de-jittering adjustment manners and amplitudes. A buffer adjustment part is configured to obtain a de-jittering parameter based on a current real-time network status and the second de-jittering policy, and set, based on the de-jittering parameter, a size of a buffer for transmitting data of the voice call or the video call such as the VoIP call, so that a delay of the voice call or the video call such as the VoIP call meets expectation, and tends to be proper. During actual application, a size of a de-jittering buffer is determined based on the de-jittering parameter obtained by using the second de-jittering policy, and finally data in the buffer is adjusted based on the size of the de-jittering buffer.

In this embodiment of this application, offline network data is collected, and at least one network parameter for representing a network feature is extracted from the offline network data. A network model is constructed based on the at least one network parameter. A first de-jittering policy is determined based on the network model. Because a de-jittering algorithm is constructed by using a plurality of parameters, full estimation is performed for various complex situations in a network call environment, the obtained first de-jittering policy (or referred to as an initial de-jittering policy) tends to be accurate, and a related parameter, for example, a de-jittering parameter, obtained based on this initial de-jittering policy also tends to be accurate. To further increase accuracy, the first de-jittering policy is further modified based on a feature parameter for evaluating quality of a voice call or a video call such as a VoIP call, to obtain a second de-jittering policy. A de-jittering parameter is obtained based on a current real-time network status and the second de-jittering policy, and a size of a buffer for transmitting data of the voice call or the video call such as the VoIP call is set based on the de-jittering parameter, so that a delay of the voice call or the video call such as the VoIP call meets expectation. Through a series of de-jittering policy optimization, the size of the buffer that is set accordingly tends to be proper. It is instructive to improve network call quality based on the size of the buffer, and the network call quality is improved.

It is noted herein that, the collection part, the policy determining part, and the policy modification part in the apparatus are not limited to being located on a transmit end, a receive end, or a server, and these parts may be all or partially located on the transmit end, the receive end, or the server.

In an implementation of this application, the policy modification part is configured to: obtain historical data of a current call, and modify the first de-jittering policy based on the historical data of the current call.

In an implementation of this application, the policy modification part is configured to: obtain signal content of a current call, and modify the first de-jittering policy based on the signal content of the current call.

In an implementation of this application, the policy modification part is configured to: obtain an auditory perception result of a current call, and modify the first de-jittering policy based on the auditory perception result.

In an implementation of this application, the apparatus further includes: a call collection part, configured to collect data of a current call, for example, a voice call or a video call such as a VoIP call. The policy modification part is configured to: when collection of the data of the current call, for example, the voice call or the video call such as the VoIP call, is triggered, obtain different processing capabilities of terminal devices and/or a scheduling feature of an application used as a medium of the voice call or the video call such as the VoIP call, and modify the first de-jittering policy based on the different processing capabilities of the terminal devices and/or the scheduling feature of the application used as the medium of the voice call or the video call such as the VoIP call.

In an implementation of this application, the apparatus further includes: a call playing part, configured to play data of a current call, for example, a voice call or a video call such as a VoIP call. The policy modification part is configured to: when playing of the data of the current call, for example, the voice call or the video call such as the VoIP call, is triggered, obtain different processing capabilities of terminal devices and/or a scheduling feature of an application used as a medium of the voice call or the video call such as the VoIP call, and modify the first de-jittering policy based on the different processing capabilities of the terminal devices and/or the scheduling feature of the application used as the medium of the voice call or the video call such as the VoIP call.

An embodiment of this application provides an information processing system, including a transmit end (or referred to as a collection end) 41, a de-jittering end 42, and a receive end (or referred to as a playing end) 43. Processing logic of the transmit end (or referred to as the collection end) includes: collecting offline network data, and extracting at least one network parameter for representing a network feature from the offline network data, where the at least one network parameter is used to construct a network model, and the network model is used to determine a first de-jittering policy when data of a voice call or a video call such as a VoIP call is transmitted; obtaining different processing capabilities of terminal devices and/or a scheduling feature of an application used as a medium of the voice call or the video call such as the VoIP call when collecting the data of the current call, for example, the voice call or the video call such as the VoIP call; and modifying the first de-jittering policy based on the different processing capabilities of the terminal devices and/or the scheduling feature of the application used as the medium of the voice call or the video call such as the VoIP call.

Processing logic of the de-jittering end includes: constructing the network model based on the at least one network parameter, and determining the first de-jittering policy based on the network model, where the at least one network parameter comes from the parameter extracted from the collected offline network data and used to represent a network feature; modifying the first de-jittering policy based on a feature parameter for evaluating quality of the voice call or the video call such as the VoIP call, to obtain a second de-jittering policy; and obtaining a de-jittering parameter based on a current real-time network status and the second de-jittering policy, and setting, based on the de-jittering parameter, a size of a buffer for transmitting data of the voice call or the video call such as the VoIP call, so that a delay of the voice call or the video call such as the VoIP call meets expectation, and tends to be proper.

During actual application, the modifying the first de-jittering policy based on a feature parameter for evaluating quality of the voice call or the video call such as the VoIP call includes: obtaining historical data of a current call, and modifying the first de-jittering policy based on the historical data of the current call.

During actual application, the modifying the first de-jittering policy based on a feature parameter for evaluating quality of the voice call or the video call such as the VoIP call includes: obtaining signal content of a current call, and modifying the first de-jittering policy based on the signal content of the current call.

During actual application, the modifying the first de-jittering policy based on a feature parameter for evaluating quality of the voice call or the video call such as the VoIP call includes: obtaining an auditory perception result of a current call, and modifying the first de-jittering policy based on the auditory perception result.

Processing logic of the receive end (or referred to as the playing end) includes: obtaining the first de-jittering policy determined when the data of the voice call or the video call such as the VoIP call, is transmitted, where the first de-jittering policy is obtained based on the network model constructed by using the at least one network parameter, and the at least one network parameter comes from the parameter extracted from the collected offline network data and used to represent a network feature; obtaining different processing capabilities of terminal devices and/or a scheduling feature of an application used as a medium of the voice call or the video call such as the VoIP call when playing the data of the current call, for example, the voice call or the video call such as the VoIP call; and modifying the first de-jittering policy based on the different processing capabilities of the terminal devices and/or the scheduling feature of the application used as the medium of the voice call or the video call such as the VoIP call.

Figure 14:
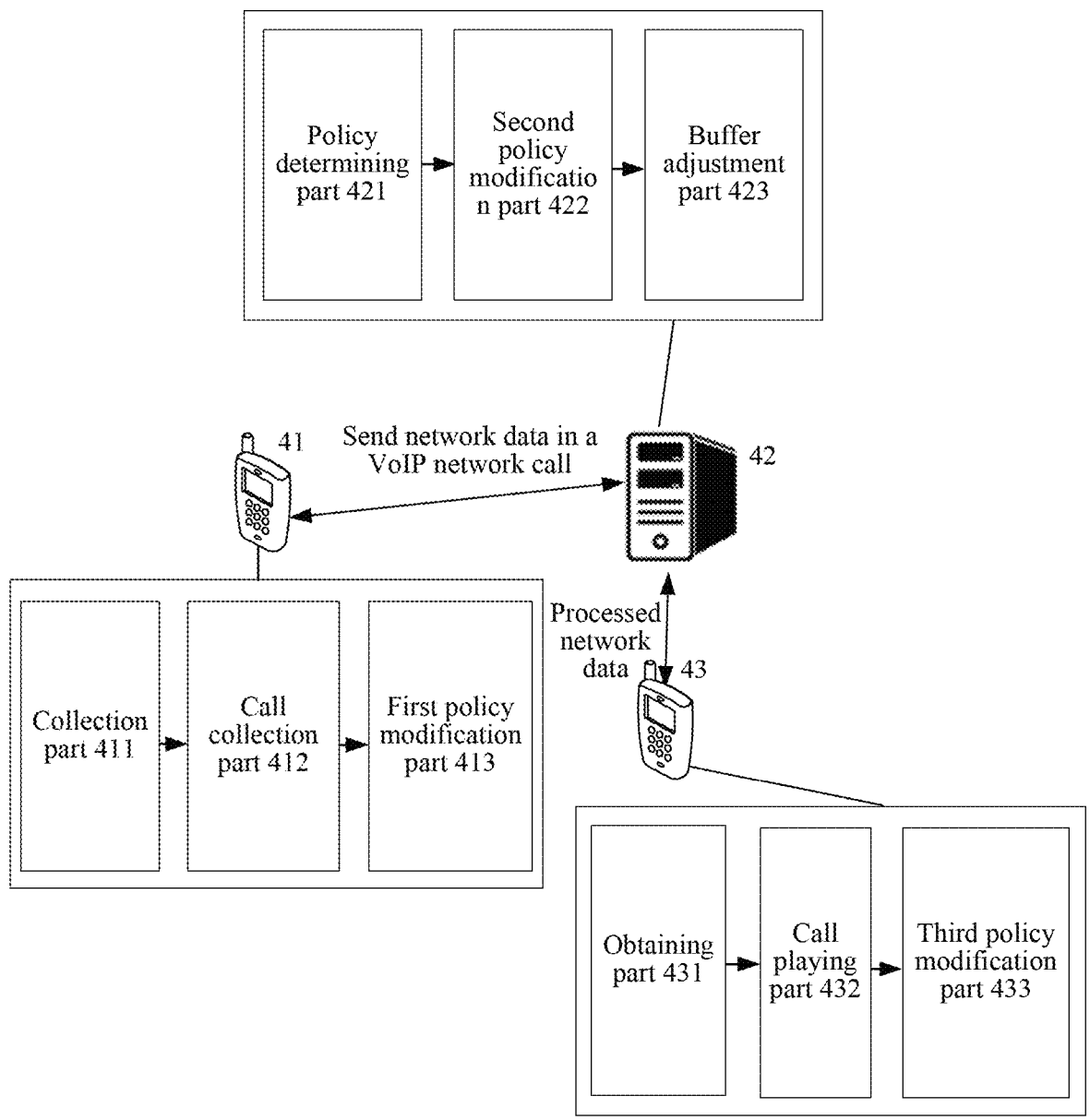
FIG. 14 is a schematic composition diagram of a system architecture according to this application.

As shown in FIG. 14, the information processing system includes a transmit end (or referred to as a collection end) 41, a de-jittering end 42, and a receive end (or referred to as a playing end) 43. The transmit end (or referred to as the collection end) 41 includes: a collection part 411, configured to collect offline network data, and extract at least one network parameter for representing a network feature from the offline network data, where the at least one network parameter is used to construct a network model, and the network model is used to determine a first de-jittering policy when data of a voice call or a video call such as a VoIP call, is transmitted; a call collection part 412, configured to obtain different processing capabilities of terminal devices and/or a scheduling feature of an application used as a medium of the voice call or the video call such as the VoIP call when collecting the data of the current call, for example, the voice call or the video call such as the VoIP call; and a first policy modification part 413, configured to modify the first de-jittering policy based on the different processing capabilities of the terminal devices and/or the scheduling feature of the application used as the medium of the voice call or the video call such as the VoIP call. The de-jittering end 42 includes: a policy determining part 421, configured to construct the network model based on the at least one network parameter, and determine the first de-jittering policy based on the network model, where the at least one network parameter comes from the parameter extracted from the collected offline network data and used to represent a network feature; a second policy modification part 422, configured to modify the first de-jittering policy based on a feature parameter for evaluating quality of the voice call or the video call such as the VoIP call, to obtain a second de-jittering policy; and a buffer adjustment part 423, configured to obtain a de-jittering parameter based on a current real-time network status and the second de-jittering policy, and set, based on the de-jittering parameter, a size of a buffer for transmitting data of the voice call or the video call such as the VoIP call, so that a delay of the voice call or the video call such as the VoIP call meets expectation, and tends to be proper. The receive end (or referred to as the playing end) 43 includes: an obtaining part 431, configured to obtain the first de-jittering policy determined when the data of the voice call or the video call such as the VoIP call, is transmitted, where the first de-jittering policy is obtained based on the network model constructed by using the at least one network parameter, and the at least one network parameter comes from the parameter extracted from the collected offline network data and used to represent a network feature; a call playing part 432, configured to obtain different processing capabilities of terminal devices and/or a scheduling feature of an application used as a medium of the voice call or the video call such as the VoIP call when playing the data of the current call, for example, the voice call or the video call such as the VoIP call; and a third policy modification part 433, configured to modify the first de-jittering policy based on the different processing capabilities of the terminal devices and/or the scheduling feature of the application used as the medium of the voice call or the video call such as the VoIP call.

A processor for data processing may be implemented by using a microprocessor, a central processing unit (CPU), a digital signal processor (DSP), or a field-programmable gate array (FPGA) during processing. A storage medium includes an operation instruction. The operation instruction may be computer-executable code, and steps in the procedure of the information processing method in the foregoing embodiment of this application are implemented by using the operation instruction.

It is noted herein that, the foregoing terminal and server descriptions are similar to the method description above, beneficial effects thereof are the same, and details are not described again. For technical details not disclosed in the terminal and server embodiments of this application, refer to the content described in the embodiments in which the procedures of the methods in this application are described.

Figure 15:
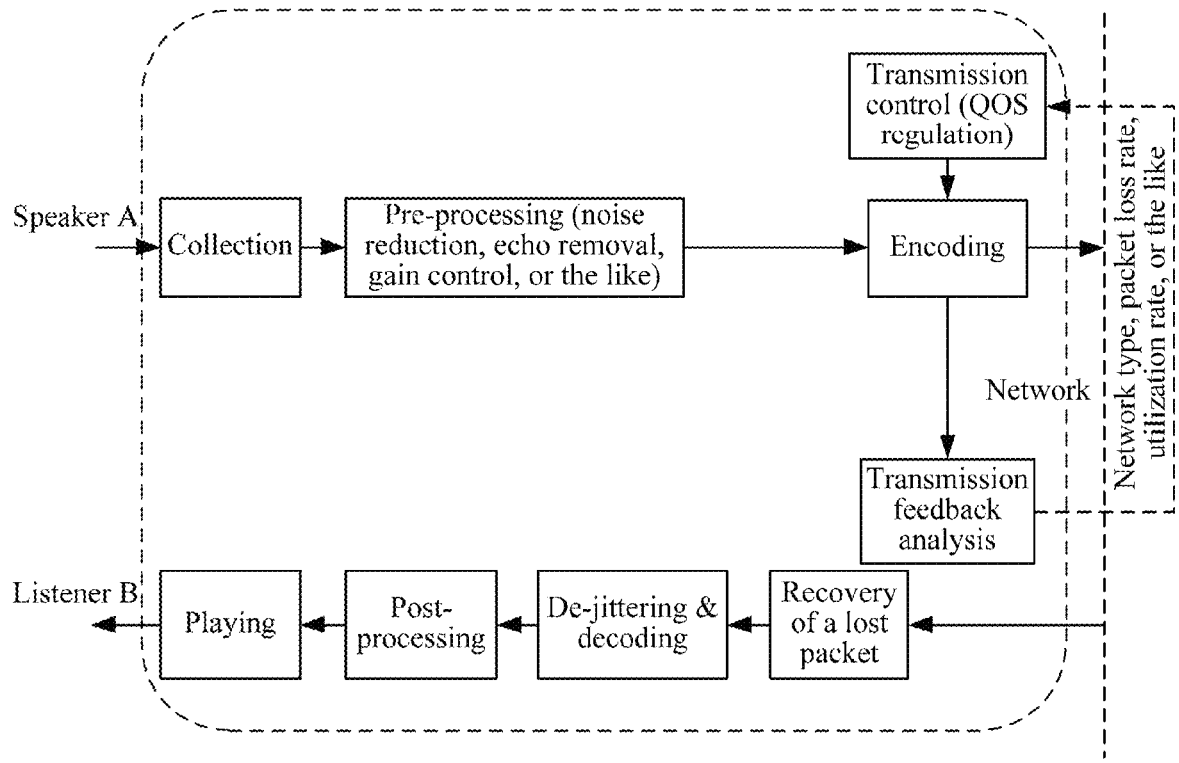
FIG. 15 is a schematic diagram of an end-to-end module of a call in the related technology.

An embodiment of this application is illustrated as follows by using an actual application scenario as an example:

In a VoIP network call scenario, a solution of end-to-end delay processing in a voice call or a video call such as a VoIP call according to an embodiment of this application may be used. Generally, modules included in the voice call or the video call such as the VoIP call from one end to the other end is shown in FIG. 15. An end-to-end delay refers to a time difference starting from when a speaker A speaks to when a listener B hears sound. For the voice call or the video call such as the VoIP call, packet transmission is performed on data in a packet form over an IP network. Due to an inherent feature of the IP network, a time consumed to transmit each packet over the network is indeterminate. Such a transmission time difference is referred to as a jitter. A link with a small jitter may be selected for transmission by means of proper route scheduling. For the selected link, the jitter may be processed by increasing a buffer delay. However, if the buffer delay is excessively large, an overall end-to-end delay is increased, and an experience effect of a real-time call is affected; if the buffer delay is excessively small, a sound pause is caused, and call quality is affected. A main module for processing the jitter is a "de-jittering & decoding" module in FIG. 15.

It can be learned from FIG. 15 that, end-to-end delays mainly include: a device buffer delay (mainly a buffer delay of collection by an audio adapter, and a buffer delay of playing by the audio adapter), a data buffer delay of processing by modules of a VoIP application program (mainly a delay produced by a de-jittering module), and a network transmission delay (uncontrollable). In this embodiment of this application, end-to-end delays in a real-time call can be reduced, and aspects from collection to playing are considered, including the following content:

1. In terms of a de-jittering module of an application program:

a) Collect a large amount of existing-network-related network data based on different network types, perform offline training, establish a network model, and set a delay processing method and parameter based on different big-data network models.

b) In a single call, adjust network parameter setting and the delay processing parameter in a) based on historical data of the current call.

c) In a single call, adjust the delay processing parameter in b) based on an auditory perception result.

d) In a single call, adjust the delay processing parameter in b) based on signal content.

2. In terms of a device:

Different delay processing methods and parameters are set based on different processing capabilities of devices, scheduling features of application program threads, or the like.

For the foregoing application scenario, most solutions in the related technology are de-jittering solutions on network transmission, and specifically implemented by using the "de-jittering & decoding" module shown in FIG. 15. Implementation block diagrams are separately shown in FIG. 16 and FIG. 17.

Figure 16:
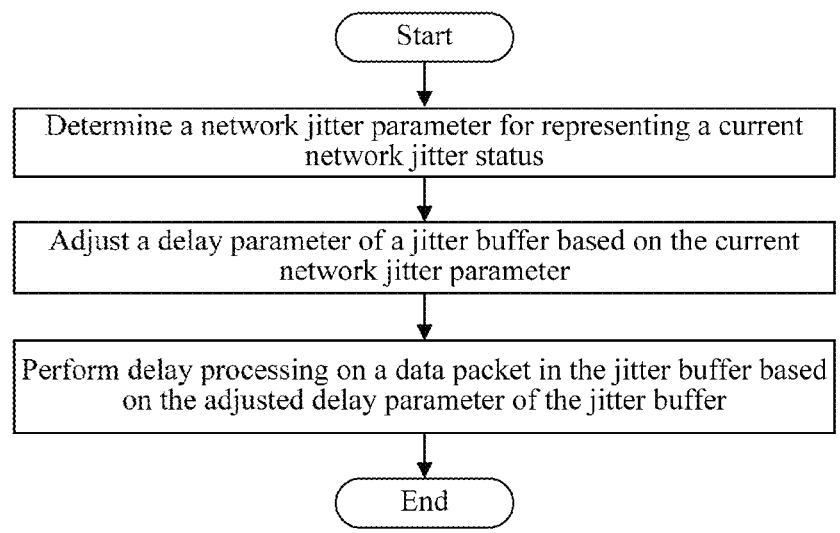
FIG. 16 and FIG. 17 are both schematic diagrams of call implementation.

As shown in FIG. 16, an implementation procedure of a first solution includes: determining a network jitter parameter for representing a current network jitter status; adjusting a delay parameter of a jitter buffer (for reducing/removing jitter) based on the current network jitter parameter; and performing delay processing on a data packet in the jitter buffer based on the adjusted delay parameter of the jitter buffer. Optionally, a parameter for representing a current network jitter is first determined, including: recording, by using PktComeThisTime, the number of 10-ms packets that reach the jitter buffer each time, recording a plurality of PktComeThisTime, determining a maximum value in the plurality of PktComeThisTime, and recording the maximum value as Pm; and performing a series of weighted averaging on Pm to obtain a parameter for representing a network jitter J, and adjusting a size of the jitter buffer based on J.

Figure 17:
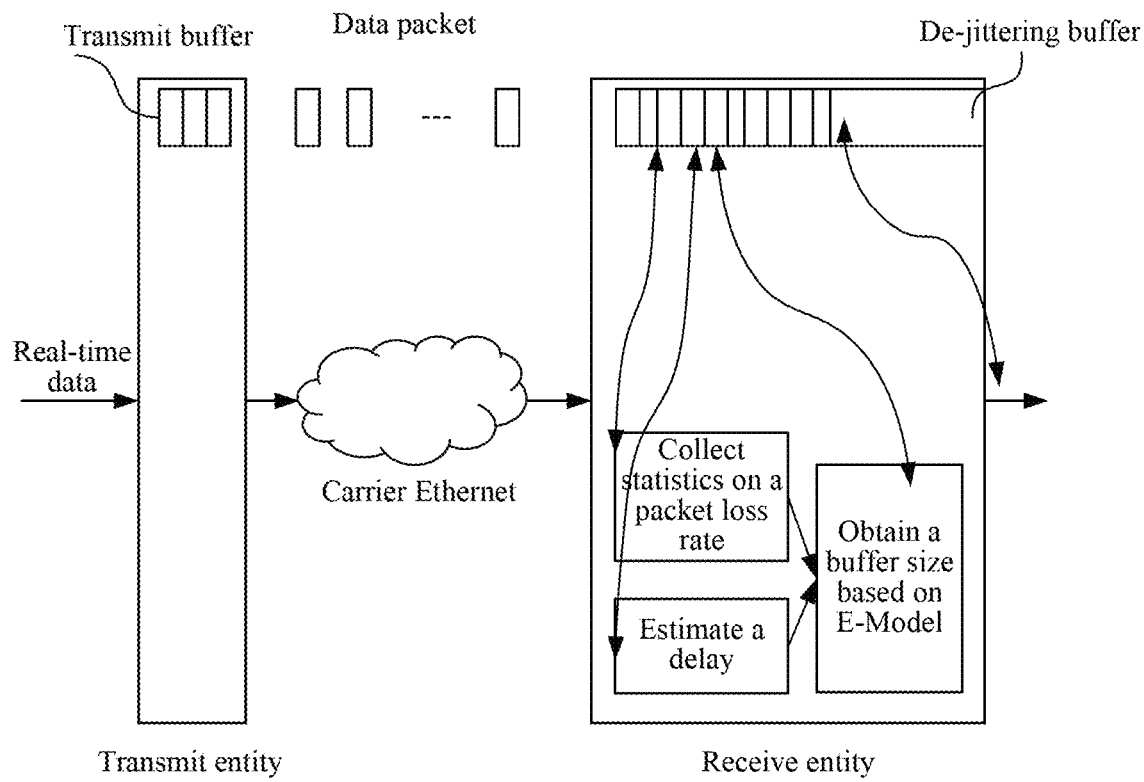

As shown in FIG. 17, in an implementation procedure of a second solution, first, a network delay dn is predicted or estimated on a receive end based on historical data, and statistics are collected on a packet loss rate of the receive end; then, a current desired size of a de-jittering buffer is obtained based on E-Model by using the estimated network delay and the obtained packet loss rate; and finally, data in the buffer is adjusted based on the buffer size.

Problems of the foregoing two solutions include as follows:

1) In terms of network estimation: Network feature estimation is important to a de-jittering algorithm. In both of the two solutions in the related technology, the size of the de-jittering buffer is determined based on a network feature estimated based on historical data of a current call. Although different network feature estimation methods are used, they have common disadvantages that few parameters are used, and network complexity is insufficiently simulated.

However, in this embodiment of this application, a corresponding parameter for representing a network feature is first extracted through offline packet capturing, different network parameter models are established through lots of offline training, an initial de-jittering algorithm and a related parameter are determined based on the established network parameter models, and then the de-jittering algorithm and the related parameter are adjusted based on historical data of a current call. In addition, both an overall network feature in an entire call process and burstiness within a period of time are considered in network model establishment. In this way, a network feature can be estimated more accurately.

2) In terms of a de-jittering algorithm: For adjustment on data in the buffer, in the first solution, the buffer is adjusted based on an estimated value of a network, without considering impact of different data content on auditory perception of human ears. For example, as mentioned in the solution, in some cases, to ensure a delay, data in the buffer needs to be discarded, where a current signal type is not considered, and the data is directly discarded regardless of whether it is a voice message or silent data. The solution is oversimplified, and does not have a desired call experience effect. In the second solution, although E-model is used for guidance, E-model is excessively complex to a single call, which is limited in practicality. In addition, in both of the two solutions, the de-jittering algorithm is adjusted in "packets", which is also limited in flexibility.

However, in this embodiment of this application, a de-jittering algorithm is selected based on signal content at an adjustment moment and an auditory perception evaluation parameter, so that processing is more flexible, and a final auditory perception effect is better.

3) In terms of collection and playing: In both of the two technical solutions, impact of different collection and playing policies and thread scheduling on de-jittering is not considered. However, in this embodiment of this application, impact of different collection and playing policies and thread scheduling on de-jittering is fully considered.

Figure 18:
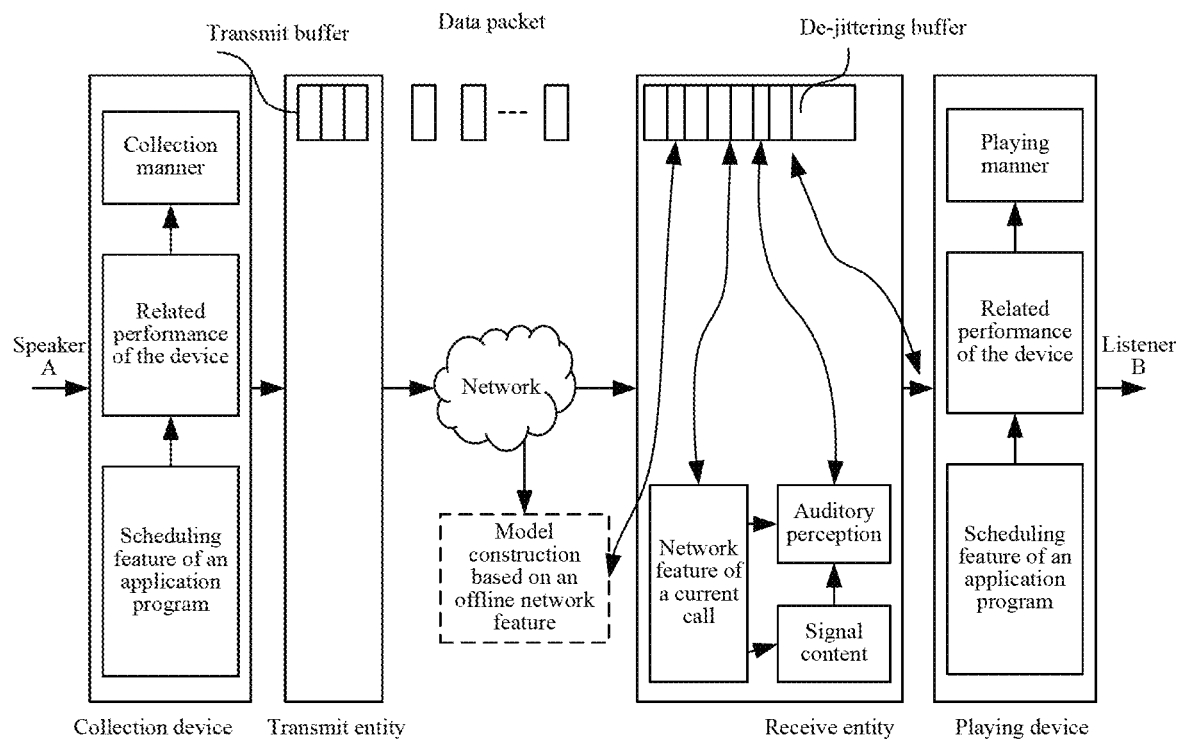
FIG. 18 is a schematic diagram of a scenario to which this application is applied.

For the foregoing application scenario, in this embodiment of this application, an overall schematic diagram is shown in FIG. 18, including: determining a lower adjustment limit value AD_dw and an upper adjustment limit value AD_up for a current buffer size based on a current estimated network status; and determining an adjustment manner and an adjustment amplitude for current data in the buffer based on a current buffer data size JB_len, a value of AD_up/AD_dw, current signal content, and an auditory perception model of human ears. In addition, during collection and playing, collection and playing policies are adjusted based on device performance, so that a data sending speed is more uniform, a speed of obtaining data from the buffer is also more uniform, and a de-jittering module works in an optimum state. A specific implementation is as follows:

1) JB_len>AD_up:

When JB_len>AD_up×F1, if current frame signal content is an important frame (for example, a voice segment), current data in the buffer is compressed. If a current frame is non-important data (for example, silent data), the current frame is directly discarded. When JB_len>AD_up×F2 F2), if current frame signal content is an important frame (for example, a voice segment), current data in the buffer is not processed. If a current frame is non-important data (for example, silent data), current data in the buffer is compressed.

Compression amplitudes are determined based on values of F1 and F2, and an amplitude of each compression is less than a data length of the current frame.

A basis of such processing is because compressing and directly discarding a signal are both impairment in call quality, but direct packet discarding causes greater impairment than compression. Based on a compression algorithm of a single packet, an amplitude of each compression is less than a data length of one frame. Therefore, compared with directly discarding a current frame, data compression reduces a length of data in the buffer at a lower speed, that is, an end-to-end delay is decreased at a lower speed. Therefore, the method in which a frame is directly discarded is used when the length of data in the buffer is very large and current data is non-important data. If the length of data in the buffer is very large but current data is important data, a manner causing less impairment, that is compression, is used to adjust the buffer length. If the length of data in the buffer is greater than a specific threshold, but a current frame is important data, a policy of performing nothing is used, so that call quality of a voice segment is maximally ensured. An excess delay may be rapidly processed when a non-silent segment appears, thereby reducing an end-to-end delay while maximally ensuring perceptual quality of a call.

2) JB_len<AD_dw:

When JB_len<AD_dw×F3, if a current frame is a non-important frame, the current frame is directly copied repeatedly, the number of copies is determined based on a value of F3. If a current frame is an important frame, current data in the buffer is expanded. When JB_len<AD_dw×F4 (F3<F4), the current buffer is expanded. An amplitude of each expansion is determined based on values of F3 and F4.

A basis of such processing is because: although expanding and directly copying data also cause impairment to sound, compared with a sound pause caused because data in the buffer is empty, such impairment causes much less impact on call experience. Therefore, when the length of data in the buffer is found to be less than a lower limit of adjustment, in principle, a fast response is made and a size of data in the buffer is adjusted as soon as possible.

3) AD_up>=JB_len>=AD_dw:

In this case, data in the buffer is directly decoded and sent to an audio adapter device without any de-jittering processing.

In adjustment algorithms of 1) and 2), for both expansion and compression, signal content and a current adjustment algorithm further need to be considered. For example, expansion and compression algorithms are based on a pitch period, but such an expansion or compression algorithm is not suitable for a music signal. Therefore, if it is detected that a current signal is a music signal rather than a voice signal, a proper adjustment further needs to be made to an adjustment parameter (AD_up, AD_dw, or F1 to F4).

In addition, if excessive consecutive expansions/compressions are performed, a fast playing or slow playing effect is caused to auditory perception. Therefore, for the adjustment algorithms of 1) and 2), a proper adjustment (for example, specifying maximum consecutive expansion or compression times) further needs to be made based on a historical adjustment policy, to ensure that no fast playing or slow playing effect is caused to final auditory perception.

In this solution, a model is established based on an offline network feature. Different network models are established through offline packet capturing, analysis of a large amount of existing network data, and parameter extraction.

Figure 19:
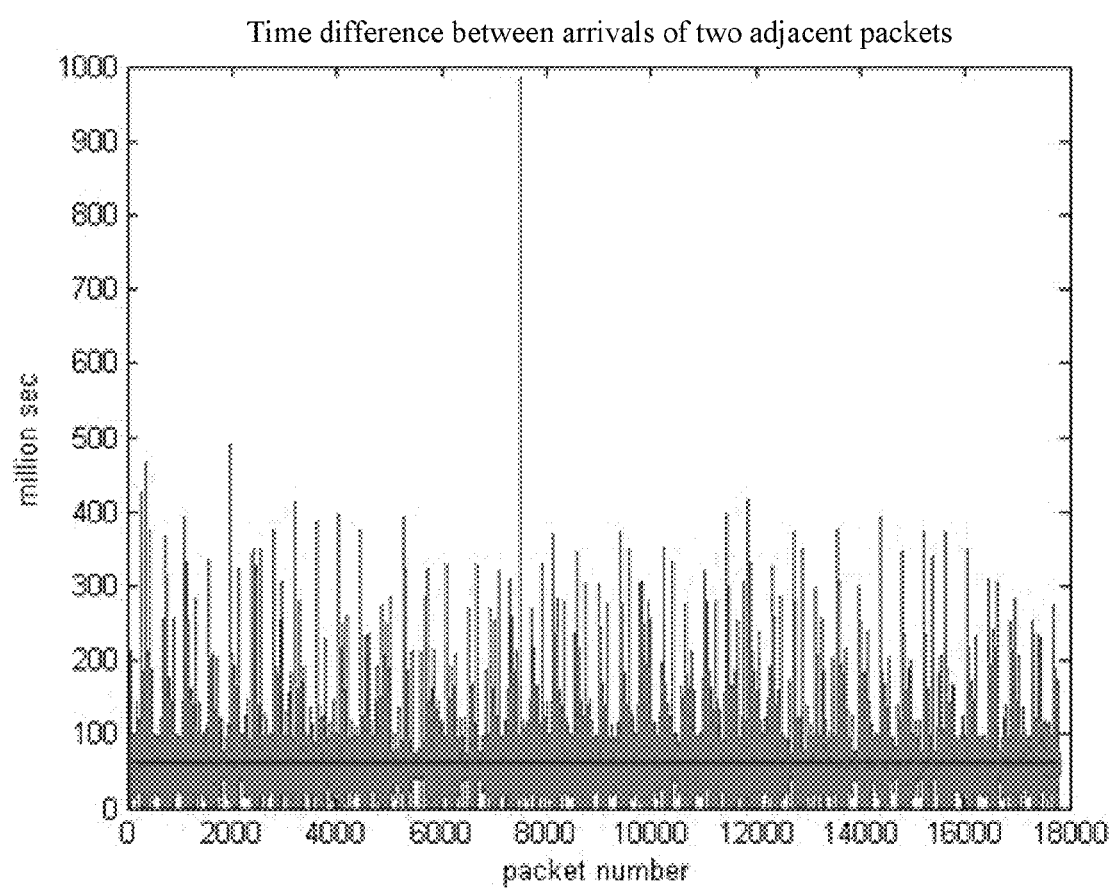
FIG. 19 and FIG. 20 are schematic diagrams of comparison between de-jittering processing results after an embodiment of this application is applied.
Figure 20:
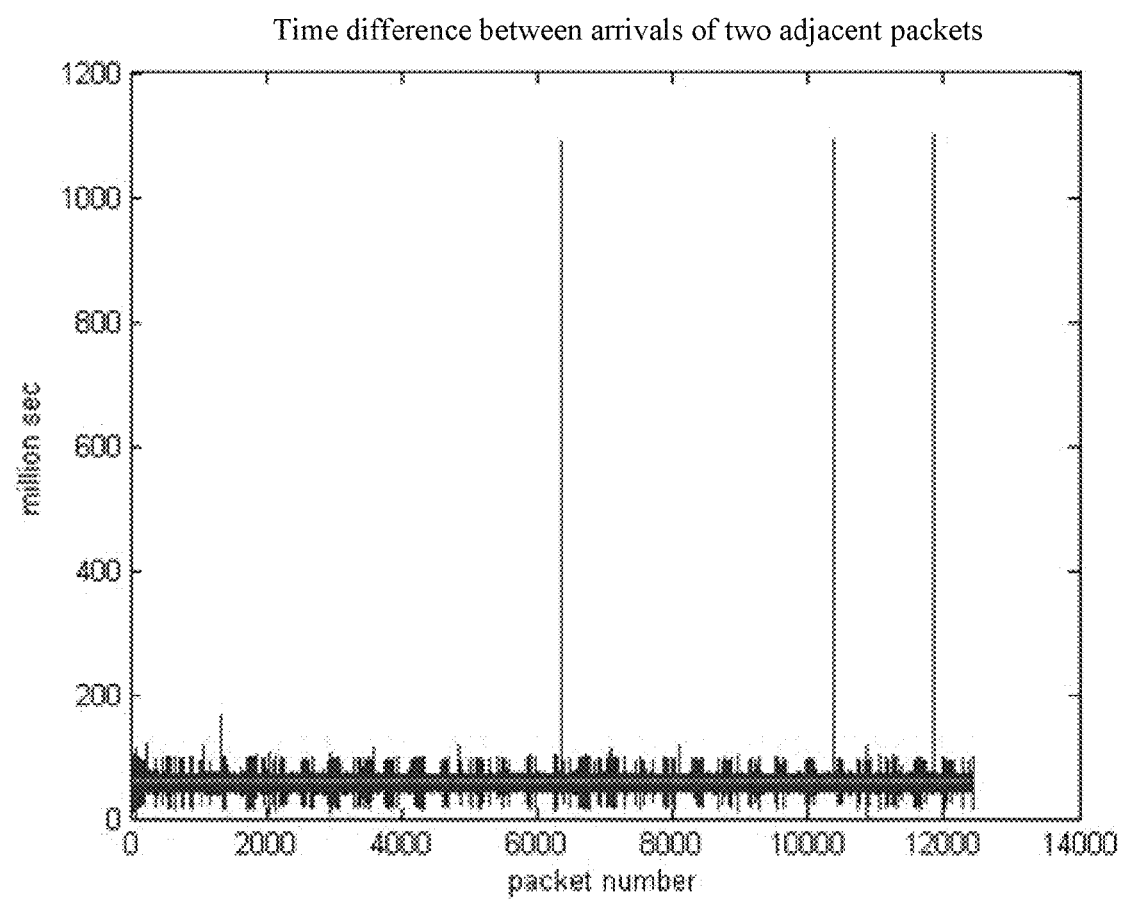

For example, in FIG. 19 and FIG. 20, a "time difference between arrivals of two adjacent packets" is extracted from offline data as one of model feature parameters. Compared with FIG. 20, FIG. 19 shows a value range with larger fluctuation, indicating a larger network jitter. In FIG. 19, for time differences between arrivals of two adjacent packets in a case of a larger jitter, there are fewer burst large jitters. In FIG. 20, for time differences between arrivals of two adjacent packets in a case of a smaller jitter, there are more burst large jitters. FIG. 20 shows more burst large jitters (a relatively large number of time differences between arrivals of two adjacent packets in the figure are greater than 1000 ms). For example, a method in RFC 3550 may be used to calculate a jitter value, indicating a network jitter at a current "moment". However, it is usually insufficient, because there are more burst large jitters though an overall jitter is smaller in FIG. 20. Network models in FIG. 19 and FIG. 20 may be distinguished based on "time differences between arrivals of two adjacent packets" through accumulated histogram statistics collection, variance statistics collection, and calculation of smooth envelope values in an entire call process, the number of bursts, and the like.

In addition to the "time differences between arrivals of two adjacent packets", the number of consecutive lost packets, an overall packet loss rate, an out-of-order rate, an out-of-order length, and the like may be analyzed as model establishment parameters.

A de-jittering parameter is adjusted based on a historical network parameter of a current call: De-jittering parameters AD_up and AD_dw are preliminarily determined based on a result of step 1). Then AD_up and AD_dw are adjusted based on historical data of the current call.

For example, it is found by analyzing a large amount of offline data that, different network types such as 2G, 3G, 4G, and WiFi generally represent different network feature trends. For example, compared with 4G, a 2G network more easily encounters a large jitter due to network congestion. In this case, during initialization, larger AD_up and AD_dw may be set for 2G than 4G. Then values of AD_up and AD_dw and parameters F1 to F4 are adjusted based on historical data of a current call, a network parameter obtained through analysis in 1), and different network models. WiFi networks of same type still have different features. For example, for a network type similar to FIG. 20, that is, a network type having a small overall jitter and a relatively large number of burst large jitters, AD_up and AD_dw may be set to be small, to ensure that an overall end-to-end delay is small. However, when JB_len<AD_dw, F3 and F4 may be adjusted, so that an expansion policy becomes more aggressive (an expansion service is broader or more data is copied once), and a response is faster, to achieve better and faster resistance to a burst large jitter.

A de-jittering parameter is adjusted based on signal content: The de-jittering parameter is adjusted (that is, AD_up, AD_dw, or F1 to F4 are adjusted) based on content (music or voice) and an importance level (silent or non-silent) of a current signal. For example, for a music signal, used AD_up and AD_dw need to be as large as possible in a same network status. An overall rule is as follows: De-jittering processing is performed on an important frame as less as possible. When a buffer length is greater than AD_up, an adjustment policy may be not processed until a non-important frame appears. When the buffer length is less than AD_dw, an adjustment needs to be made as soon as possible to avoid a pause. Auditory perception quality is ensured to be as desired as possible, and de-jittering processing is performed when necessary.

A de-jittering parameter is adjusted based on auditory perception: During expansion, compression, or time length adjustment on a signal, an adjustment frequency needs to be controlled, so that no fast playing or slow playing effect is caused to auditory perception.

Adaptation of a collection/playing device: In FIG. 18, due to different processing capabilities of devices and different scheduling features of application programs, a packet sending speed is insufficiently uniform or is irregular. However, the de-jittering module is designed based on a uniform or regular packet sending speed. A uniform sending speed is mainly determined by a collection manner of an audio adapter and a thread scheduling feature. For example, if an audio adapter callback manner is used to drive the application program to perform encoding/sending, compared with an iOS device, an Android device has more non-uniform time intervals between two audio adapter callbacks. Moreover, a machine with poorer performance encounters more such situations. In this case, an audio adapter callback or timer callback method may be used based on different device performance to drive the application program to perform encoding/sending, to achieve a more uniform packet sending interval. Similarly, on the playing end, a speed at which the application program obtains data from the buffer needs to be as uniform as possible, so that the de-jittering module can work in an optimum state, to achieve a lowest end-to-end delay. For a thread scheduling difference, for example, for a pure-voice call and a voice and video call on a same device, because video capture, codec, and the like are required, and a handheld device has a limited processing capacity, thread scheduling in the voice and video call is less uniform than that in the pure-voice call. In this case, after a thread scheduling method is fully optimized, in a same network status, the parameter of the de-jitter algorithm may be properly increased to reduce pauses.

It is noted herein that, the subparts have the same implementation example and application scenario as corresponding steps, but are not limited to the content disclosed in Embodiment 1. It is noted that, as a portion of the apparatus, the subparts may run in the hardware environment shown in FIG. 1, and may be implemented by software, or may be implemented by hardware. The hardware environment includes a network environment.

An embodiment of this application further provides a server or a terminal for implementing the foregoing method.

Figure 7:
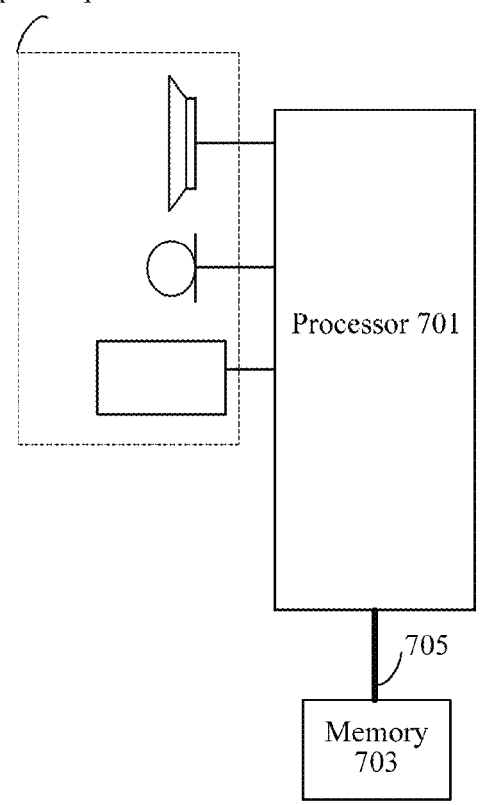
FIG. 7 is a structural block diagram of a terminal according to an embodiment of this application.

FIG. 7 is a structural block diagram of a terminal according to an embodiment of this application. As shown in FIG. 7, the terminal may include: one or more processors 701 (one is shown in the figure), a memory 703, and a transmission apparatus 705 (for example, a transmit apparatus in the foregoing embodiment). As shown in FIG. 7, the terminal may further include an input/output device 707.

The memory 703 may be configured to store a software program and a subpart, for example, program instructions/subparts corresponding to the method and the apparatus in the embodiments of this application. The processor 701 performs various function application and data processing, that is, implements the foregoing method, by running the software program and the subpart stored in the memory 703. The memory 703 may include a high-speed RAM, and may also include a non-volatile memory, for example, one or more magnetic storage apparatuses, a flash memory, or another non-volatile solid-state memory. In some embodiments, the memory 703 may further include a memory disposed remote to the processor 701, and the memory may be connected to the terminal over a network. Examples of the network include but are not limited to: the Internet, an intranet, a local area network, a mobile communications network, and a combination thereof.

The processor 701 may be a central processing unit, a micro-processor, a digital signal processor, an application processor, a programmable array, or the like.

The processor 701 may be connected to the memory 703 by using an integrated circuit bus.

The transmission apparatus 705 is configured to receive or send data over a network, and may be further configured to transmit data between the processor and the memory. Specific examples of the network may include a wired network and a wireless network. In an embodiment, the transmission apparatus 705 includes a network interface controller (NIC), which may be connected to another network device and a router by using a cable, to communicate with the Internet or the local area network. In an embodiment, the transmission apparatus 705 is a radio frequency (RF) subpart, configured to wirelessly communicate with the Internet.

Optionally, the memory 703 is configured to store an application program.

The processor 701 may invoke, by using the transmission apparatus 705, the application program stored in the memory 703, to perform the following steps: determining, based on a first data packet that is sent by a second client and received by a first client over a preset network, whether a packet loss occurs in first media information that is sent by the second client to the first client over the preset network, the first media information including the first data packet, and the first media information being media information transmitted in a voice call or a video call between the second client and the first client; obtaining network status information of the preset network when determining that a packet loss occurs in the first media information; sending a retransmission request to the second client when the network status information satisfies a preset condition, the retransmission request being used to request the second client to retransmit a lost second data packet in the first media information, and the preset condition being used to indicate a network condition of the preset network that is required for retransmitting the second data packet; and canceling sending of the retransmission request to the second client when the network status information does not satisfy the preset condition.

The processor 701 is further configured to perform the following steps: after the sending a retransmission request to the second client, receiving the second data packet sent by the second client; generating second media information based on the first data packet and the second data packet; and when the network status information does not satisfy the preset condition, generating third media information based on the first data packet.

The processor 701 is further configured to perform the following steps: after the obtaining network status information of the preset network, and before the sending a retransmission request to the second client or canceling sending of the retransmission request to the second client, determining whether a first network state of the preset network indicated by the network status information matches a second network state required for retransmitting the second data packet; and determining that the network status information satisfies the preset condition when the first network state matches the second network state; or determining that the network status information does not satisfy the preset condition when the first network state does not match the second network state.

The processor 701 is further configured to perform the following steps: determining whether a difference between a bandwidth threshold and a current used bandwidth is less than a first preset value; determining whether a current transmission delay is less than a transmission delay threshold; determining whether a current packet loss rate is less than a packet loss rate threshold; and determining whether the number of consecutive lost packets is less than a second preset value; where a preset determining result is used to indicate that the first network state matches the second network state, and the preset determining result includes at least one of the following: determining that the difference between the bandwidth threshold and the current used bandwidth is less than the first preset value; determining that the current transmission delay is less than the transmission delay threshold; determining that the current packet loss rate is less than the packet loss rate threshold; or determining that the number of consecutive lost packets is less than the second preset value.

In this embodiment of this application, a solution of a call method is provided. It is determined, based on a first data packet that is sent by a second client and received by a first client over a preset network, whether a packet loss occurs in first media information that is sent by the second client to the first client over the preset network, the first media information including the first data packet. Network status information of the preset network is obtained when it is determined that a packet loss occurs in the first media information. A retransmission request is sent to the second client when the network status information satisfies a preset condition, the retransmission request being used to request the second client to retransmit a lost second data packet. Sending of the retransmission request to the second client is canceled when the network status information does not satisfy the preset condition. The lost data packet is obtained by using the retransmission request when allowed in a network situation, so that the media information is more complete. Therefore, instant messaging quality is improved, and a technical problem of poor instant messaging quality caused by network congestion in a related technology is resolved.

Optionally, for specific examples in this embodiment, refer to the examples described in the foregoing Embodiment 1 and Embodiment 2, and details are not described herein again in this embodiment.

Those of ordinary skill in the art may understand that, the structure shown in FIG. 7 is merely exemplary, and the terminal may be a terminal device such as a smartphone (such as an Android mobile phone or an iOS mobile phone), a tablet computer, a palmtop computer, a mobile Internet device (MID), and a PAD. FIG. 7 imposes no limitation to the structure of the terminal. For example, the terminal may further include more or few components (for example, a network interface and a display apparatus) that those shown in FIG. 7, or has a configuration different from that shown in FIG. 7.

Those of ordinary skill in the art may understand that all or some of the steps of the methods in the embodiments may be implemented by a program instructing relevant hardware of the terminal device. The program may be stored in a computer-readable storage medium. The storage medium may include: a flash drive, a ROM, a RAM, a magnetic disk, or an optical disc.

An embodiment of this application further provides a computer storage medium. Optionally, in this embodiment, the storage medium may be configured to store a computer-executable instruction, such as program code, for performing the call method.

Optionally, in this embodiment, the storage medium may be located in at least one of a plurality of network devices in the network described in the foregoing embodiments.

The computer storage medium may be a non-transitory storage medium.

Optionally, in this embodiment, the storage medium is configured to store program code for performing the following steps:

S1. determining, based on a first data packet that is sent by a second client and received by a first client over a preset network, whether a packet loss occurs in first media information that is sent by the second client to the first client over the preset network, the first media information including the first data packet, and the first media information being media information transmitted in a voice call or a video call between the second client and the first client;

S2. obtaining network status information of the preset network when determining that a packet loss occurs in the first media information;

S3. sending a retransmission request to the second client when the network status information satisfies a preset condition, the retransmission request being used to request the second client to retransmit a lost second data packet in the first media information, and the preset condition being used to indicate a network condition of the preset network that is required for retransmitting the second data packet; and S4. canceling sending of the retransmission request to the second client when the network status information does not satisfy the preset condition.

Optionally, the storage medium is configured to store program code for performing the following steps: after the sending a retransmission request to the second client, receiving the second data packet sent by the second client; and generating second media information based on the first data packet and the second data packet; and when the network status information does not satisfy the preset condition, generating third media information based on the first data packet.

Optionally, the storage medium is configured to store program code for performing the following steps: after the obtaining network status information of the preset network, and before the sending a retransmission request to the second client or canceling sending of the retransmission request to the second client, determining whether a first network state of the preset network indicated by the network status information matches a second network state required for retransmitting the second data packet; and determining that the network status information satisfies the preset condition when the first network state matches the second network state; or determining that the network status information does not satisfy the preset condition when the first network state does not match the second network state.

Optionally, the storage medium is configured to store program code for performing the following steps: determining whether a difference between a bandwidth threshold and a current used bandwidth is less than a first preset value; determining whether a current transmission delay is less than a transmission delay threshold; determining whether a current packet loss rate is less than a packet loss rate threshold; and determining whether the number of consecutive lost packets is less than a second preset value; where a preset determining result is used to indicate that the first network state matches the second network state, and the preset determining result includes at least one of the following: determining that the difference between the bandwidth threshold and the current used bandwidth is less than the first preset value; determining that the current transmission delay is less than the transmission delay threshold; determining that the current packet loss rate is less than the packet loss rate threshold; or determining that the number of consecutive lost packets is less than the second preset value.

Optionally, for specific examples in this embodiment, refer to the examples described in the foregoing Embodiment 1 and Embodiment 2, and details are not described herein again in this embodiment.

Optionally, in this embodiment, the storage medium may include, but not limited to, various media that can store program code, such as a USB flash drive, a ROM, a RAM, a removable hard disk, a magnetic disk, or an optical disc.

Figure 8:
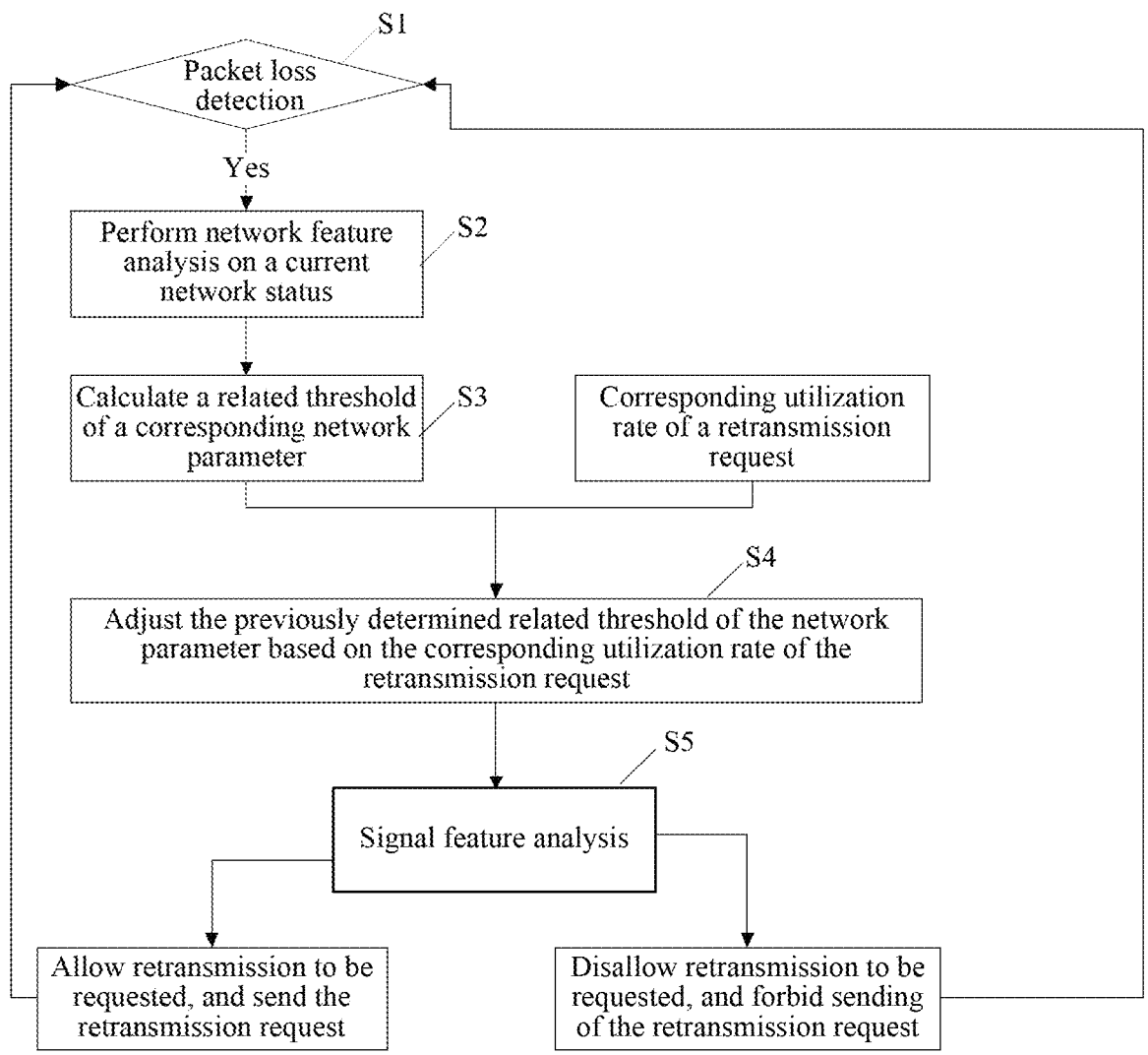
FIG. 8 is a schematic diagram of a hardware environment of a call method according to embodiment of this application.

The following further provides an embodiment of a call method with reference to FIG. 8, including the following steps:

Step S1: Perform packet loss detection, which, for example, may include: determining whether a packet loss occurs based on sequence number index information in header information. If it is detected in step S1 that no packet loss occurs, no retransmission request is sent and a subsequent procedure is continued. Otherwise, step S2 is performed.

Step S2: Perform network feature analysis on a current network status. A network feature includes, but not limited to, a used bit rate, an estimated bandwidth, a packet loss rate, a jitter, an end-to-end transmission delay, or the like.

Step S3: Calculate a related threshold of a corresponding network parameter based on an analysis result in step S2. The calculating a related threshold includes, but not limited to, determining a bandwidth threshold and estimating a bandwidth. In a specific case, when a used bit rate is greater than a specific threshold, a retransmission request is not allowed to be sent.

For example, when a transmission delay threshold is determined, the transmission delay threshold is determined based on a network jitter. In a case of a specific jitter, when a transmission delay is greater than a specific threshold, a retransmission request is not allowed to be sent, because even though the retransmission request is sent in this case, retransmitted response data may be not used, resulting in a low utilization rate.

For another example, when a packet loss rate threshold is determined, a current packet loss rate threshold is determined based on a historical packet loss rate and packet loss model analysis. In a network that does not have a sufficient bandwidth or a network that has a particularly large packet loss rate, sending more data means that more data will be lost. In this case, sending the retransmission request increases network load, which is useless or adverse.

Step S4: Adjust the previously determined related threshold of the network parameter based on a corresponding utilization rate of a retransmission request. The corresponding utilization rate herein is one of the foregoing predetermined parameters.

For example, a proportion of retransmission requests to received response data is calculated. Historical data buffered by a client B has a specific length limitation. If a delay of transmission from a client A to the client B is excessively large, data information of a requested packet carried in a retransmission request received by the client B is no longer buffered data, and the client B does not respond to the retransmission request of the client A. In this case, the proportion of retransmission requests/received response data is particularly small. Therefore, a related threshold, which makes the proportion greater than a specific value, of the network parameter may be obtained based on the proportion.

For another example, to prevent the client A from sending excess retransmission requests and causing a bandwidth waste, a retransmission request sending frequency needs to be lowered, that is, increasing the related threshold of the network parameter, and calculating an actual utilization rate of response data. After receiving a retransmission request, the client B finds corresponding data in historical buffered data, uses the data as a response packet, and sends the response packet to the client A. In this case, if a delay of transmission from the client B to the client A is excessively large, response data may not satisfy a data requirement of a real-time call when reaching the client A, and becomes a late packet and needs to be actively discarded. In this case, although the response data is received, a utilization rate of the response data is low. If the actual utilization rate keeps low within a period of time, the retransmission request frequency also needs to be lowered, that is, increasing the related threshold of the network parameter.

The related threshold describes the foregoing network condition.

Step S5: Perform signal feature analysis corresponding to a transmitted data packet. A signal is analyzed. For example, unvoiced and voiced analysis, voice activity analysis, or semantic importance analysis is performed. Then the related threshold of the network parameter adjusted in step S4 is used. For example, in a case of a sufficient bandwidth, the retransmission request may be sent once a packet loss is detected; in a case of an insufficient bandwidth, the retransmission request is sent for a lost important voice frame.

Step S6: Perform request determining. Whether the retransmission request is allowed to be sent when a packet loss occurs is comprehensively determined based on the related threshold of the network parameter, the current network status, and a signal feature. If retransmission is allowed, the retransmission request is sent. If retransmission is not allowed, sending of the retransmission request is forbidden, and step S1 is performed again.

The sequence numbers of the foregoing embodiments of this application are merely for description, and do not imply the preference among the embodiments.

When the integrated part in the foregoing embodiments is implemented in the form of a software functional part and sold or used as an independent product, the integrated part may be stored in a computer-readable storage medium. Based on such an understanding, the technical solutions of this application essentially, or the part contributing to the related technology, or all or some of the technical solutions may be implemented in the form of a software product. The software product is stored in a storage medium and includes several instructions for instructing one or more computer devices (which may be a personal computer, a server, a network device, or the like) to perform all or some of the steps of the methods according to the embodiments of this application.

In the foregoing embodiments of this application, the description of each embodiment has respective focuses, and for the part that is not detailed in an embodiment, reference may be made to the relevant description of other embodiments.

In the several embodiments provided in this application, it is understood that the disclosed client may be implemented in other manners. For example, the described apparatus embodiment is merely exemplary. For example, the part division is merely logical function division and may be other division in actual implementation. For example, a plurality of parts or components may be combined or integrated into another system, or some features may be ignored or not performed. In addition, the displayed or discussed mutual couplings or direct couplings or communication connections may be implemented through some interfaces. The indirect couplings or communication connections between the parts or subparts may be implemented in electronic or other forms.

The parts described as separate parts may or may not be physically separate, and parts displayed as parts may or may not be physical parts, may be located in one position, or may be distributed on a plurality of network parts. Some or all of the parts may be selected according to actual needs to achieve the objectives of the solutions of the embodiments.

In addition, functional parts in the embodiments of this application may be integrated into one processing part, or each of the parts may exist alone physically, or two or more parts are integrated into one part. The integrated part may be implemented in a form of hardware, or may be implemented in a form of a software functional part.

The foregoing descriptions are merely preferred embodiments of this application. It is noted that, modifications made by those of ordinary skill in the art according to the principle of this application shall fall within the protection scope of this application.

INDUSTRIAL APPLICABILITY

In the embodiments of this application, before a request data packet is sent, a network status of a preset network over which a retransmitted data packet is received is obtained, to determine, based on the network status, whether to request retransmission. In this way, severer congestion of the preset network that is caused by a large number of retransmission requests still sent when the network has been congested can be reduced, so that more resources in the preset network are retained for transmitting new data, thereby improving transmission efficiency, and achieving a positive industrial effect. In addition, a computer-executable instruction such as a corresponding computer program can be run in a terminal device, thereby achieving high industrial feasibility.

What is claimed is:

1. A method for making a call, comprising:
   detecting, by processing circuitry of a first terminal device that conducts a media call with a second terminal device via a network and in response to a success reception of a first data packet of first media that is send by the second terminal device during the media call, whether a packet loss occurs in the first media;
   obtaining, by the processing circuitry, network status information of the network when a packet loss of a second data packet of the first media is detected;
   determining, by the processing circuitry, a probability threshold in association with a retransmission request to the second terminal device for retransmitting the second data packet;
   determining, by the processing circuitry, based on the probability threshold, a network requirement condition for the retransmission request;
   sending, via interface circuitry of the first terminal device, the retransmission request to the second terminal device when the network status information satisfies the network requirement condition; and
   canceling the retransmission request to the second terminal device when the network status information fails to satisfy the network requirement condition.

2. The method according to claim 1, further comprising:
   determining whether a first network state of the network that is indicated by the network status information matches a second network state that is required for retransmitting the second data packet;
   determining that the network status information satisfies the network requirement condition when the first network state matches the second network state; and
   determining that the network status information fails to satisfy the network requirement condition when the first network state does not match the second network state.

3. The method according to claim 2, wherein the determining whether the first network state of the network that is indicated by the network status information matches the second network state that is required for retransmitting the second data packet comprises at least one of:
   determining whether a difference between a bandwidth threshold and a bandwidth in use is less than a first preset value;
   determining whether a transmission delay is less than a transmission delay threshold;
   determining whether a packet loss rate is less than a packet loss rate threshold; and
   determining whether a number of consecutive lost packets is less than a second preset value.

4. The method according to claim 1, further comprising:
   analyzing, by the processing circuitry, a signal feature of a media segment in the first data packet; and
   sending, via the interface circuitry, the retransmission request when the network status information satisfies the network requirement condition and the signal feature is indicative of a semantic importance.

5. The method according to claim 1, further comprising:
   extracting, by the processing circuitry, a sequence number index in the first data packet; and
   determining whether the packet loss occurs in the first media based on the sequence number index.

6. The method according to claim 1, further comprising at least one of:
   determining a first network requirement condition to ensure that a first probability for the retransmission request to arrive at the second terminal device within a buffer time is equal to or higher than the probability threshold, the first media being allowed to be buffered at the second terminal device in the buffer time; or
   determining a second network requirement condition to ensure that a second probability to output the second data packet at the second terminal device is equal to or higher than the probability threshold.

7. The method according to claim 1, further comprising:
   collecting offline network data;
   extracting at least one network parameter for representing a network feature from the offline network data;
   constructing a network model based on the at least one network parameter;
   determining a first de-jittering policy based on the network model;
   modifying, by the processing circuitry, the first de-jittering policy based on a feature parameter for evaluating a call quality of the media call to obtain a second de-jittering policy;
   obtaining a de-jittering parameter based on the network status information and the second de-jittering policy; and
   setting, at the first terminal device, a capacity of a buffer that is used to for buffering transmission data during the media call based on the de-jitter parameter to ensure a delay of the media call meet an expectation.

8. The method according to claim 7, wherein the modifying the first de-jittering policy based on the feature parameter for evaluating the call quality of the media call, to obtain the second de-jittering policy comprises:
obtaining at least one of a signal content and an auditory perception result of the media call; and
modifying the first de-jittering policy based on the at least one of the signal content and the auditory perception result of the media call.

9. The method according to claim 1, further comprising:
obtaining, by the processing circuitry of the first terminal device, based on the first media, a far-end signal that is sent by the second terminal device during the media call;
superimposing, by the processing circuitry, an ultrasonic signal on the far-end signal to obtain a mixed signal;
playing, via a speaker, the mixed signal;
obtaining, by the processing circuitry of the first terminal device, a near-end signal that is generated by a microphone;
determining a first signal segment in the mixed signal and a second signal segment in the near-end signal based on the ultrasonic signal;
calculating a correlation value between the first signal segment and the second signal segment; and
determining that the media call is in a both-speaking state when the correlation value is less than a preset correlation value threshold.

10. The method according to claim 9, further comprising:
superimposing the ultrasonic signal that is encoded with data on the far-end signal to obtain the mixed signal;
determining, in the near-end signal, the second signal segment that carries specific data in a frequency range corresponding to the ultrasonic signal; and
determining, in the mixed signal, the first signal segment that is superimposed with the ultrasonic signal that is encoded with the specific data.

11. An apparatus, comprising:
interface circuitry configured to transmit and receive signals carrying media data to/from a network during a media call with another apparatus; and
processing circuitry configured to:
detect, in response to a success reception of a first data packet of first media that is send by the other apparatus during the media call, whether a packet loss occurs in the first media;
obtain network status information of the network when a packet loss of a second data packet of the first media is detected;
determine a probability threshold in association with a retransmission request to the other apparatus for retransmitting the second data packet;
determine based on the probability threshold, a network requirement condition for the retransmission request;
send, via the interface circuitry, the retransmission request to the other apparatus when the network status information satisfies the network requirement condition; and
cancel the retransmission request to the other apparatus when the network status information fails to satisfy the network requirement condition.

12. The apparatus according to claim 11, wherein the processing circuitry is configured to:
determine whether a first network state of the network that is indicated by the network status information matches a second network state that is required for retransmitting the second data packet;
determine that the network status information satisfies the network requirement condition when the first network state matches the second network state; and
determine that the network status information fails to satisfy the network requirement condition when the first network state does not match the second network state.

13. The apparatus according to claim 12, wherein the processing circuitry is configured to determine at least one of:
whether a difference between a bandwidth threshold and a bandwidth in use is less than a first preset value;
whether a transmission delay is less than a transmission delay threshold;
whether a packet loss rate is less than a packet loss rate threshold; and
whether a number of consecutive lost packets is less than a second preset value.

14. The apparatus according to claim 11, wherein the processing circuitry is configured to:
analyze a signal feature of a media segment in the first data packet; and
send, via the interface circuitry, the retransmission request when the network status information satisfies the network requirement condition and the signal feature is indicative of a semantic importance.

15. The apparatus according to claim 11, wherein the processing circuitry is configured to:
determine a first network requirement condition to ensure that a first probability for the retransmission request to arrive at the other apparatus within a buffer time is equal to or higher than the probability threshold, the first media being allowed to be buffered at the other apparatus in the buffer time; or
determine a second network requirement condition to ensure that a second probability to output the second data packet at the other apparatus is equal to or higher than the probability threshold.

16. The apparatus according to claim 11, wherein the processing circuitry is configured to:
collect offline network data;
extract at least one network parameter for representing a network feature from the offline network data;
construct a network model based on the at least one network parameter;
determine a first de-jittering policy based on the network model;
modify the first de-jittering policy based on a feature parameter for evaluating a call quality of the media call to obtain a second de-jittering policy;
obtain a de-jittering parameter based on the network status information and the second de-jittering policy; and
set a capacity of a buffer that is used to for buffering transmission data during the media call based on the de-jitter parameter to ensure a delay of the media call meet an expectation.

17. The apparatus according to claim 16, wherein the processing circuitry is configured to:
obtain at least one of a signal content and an auditory perception result of the media call; and
modify the first de-jittering policy based on the at least one of the signal content and the auditory perception result of the media call.

18. The apparatus according to claim 11, wherein the processing circuitry is configured to:

obtain, based on the first media, a far-end signal that is sent by the other apparatus during the media call;

superimpose an ultrasonic signal on the far-end signal to obtain a mixed signal;

play, via a speaker, the mixed signal;

obtain a near-end signal that is generated by a microphone;

determine a first signal segment in the mixed signal and a second signal segment in the near-end signal based on the ultrasonic signal;

calculate a correlation value between the first signal segment and the second signal segment; and determine that the media call is in a both-speaking state when the correlation value is less than a preset correlation value threshold.

19. The apparatus according to claim 18, wherein the processing circuitry is configured to:

superimpose the ultrasonic signal that is encoded with data on the far-end signal to obtain the mixed signal;

determine, in the near-end signal, the second signal segment that carries specific data in a frequency range corresponding to the ultrasonic signal; and determine, in the mixed signal, the first signal segment that is superimposed with the ultrasonic signal that is encoded with the specific data.

20. A non-transitory computer-readable medium storing instructions which when executed by a computer cause the computer to perform:

detecting, by the computer that conducts a media call with another computer via a network and in response to a success reception of a first data packet of first media that is send by the other computer during the media call, whether a packet loss occurs in the first media;

obtaining network status information of the network when a packet loss of a second data packet of the first media is detected;

determining a probability threshold in association with a retransmission request to the other computer for retransmitting the second data packet;

determining based on the probability threshold, a network requirement condition for the retransmission request;

sending the retransmission request to the other computer when the network status information satisfies the network requirement condition; and canceling the retransmission request to the other computer when the network status information fails to satisfy the network requirement condition.

* * * * *